United States Patent
Ueno et al.

(10) Patent No.: US 8,638,397 B2
(45) Date of Patent: Jan. 28, 2014

(54) REMOTE CONTROL APPARATUS, ELECTRIC APPARATUS AND COMMUNICATION SYSTEM

(75) Inventors: Masatoshi Ueno, Kanagawa (JP); Kenichi Kabasawa, Saitama (JP); Akihiro Kikuchi, Kanagawa (JP); Takashi Tsurumoto, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/812,424

(22) PCT Filed: Oct. 16, 2008

(86) PCT No.: PCT/JP2008/068742
§ 371 (c)(1),
(2), (4) Date: Jul. 9, 2010

(87) PCT Pub. No.: WO2009/090781
PCT Pub. Date: Jul. 23, 2009

(65) Prior Publication Data
US 2010/0283917 A1    Nov. 11, 2010

(30) Foreign Application Priority Data
Jan. 18, 2008  (JP) ................ P2008-009768

(51) Int. Cl.
*H04N 5/44*   (2011.01)
(52) U.S. Cl.
USPC ... 348/734; 348/730; 348/E5.096; 340/12.22; 340/426.13; 340/815.16
(58) Field of Classification Search
USPC ............................. 348/734, 730
See application file for complete search history.

(56) References Cited

U.S. PATENT DOCUMENTS

| 6,111,677 | A  | * | 8/2000 | Shintani et al. ............... 398/126 |
| 7,142,127 | B2 | * | 11/2006 | Hayes et al. ............... 340/12.28 |
| 2002/0043557 | A1 | * | 4/2002 | Mizoguchi et al. ........... 235/375 |
| 2003/0194200 | A1 | * | 10/2003 | Yuen et al. ....................... 386/46 |

(Continued)

FOREIGN PATENT DOCUMENTS

| JP | 07-247588 | 9/1995 |
| JP | 09-162818 | 6/1997 |

(Continued)

OTHER PUBLICATIONS

International Search Report dated Jan. 9, 2009, for corresponding Patent Application PCT/JP2008/068742.

(Continued)

*Primary Examiner* — Jefferey Harold
*Assistant Examiner* — Omer Khalid
(74) *Attorney, Agent, or Firm* — K&L Gates LLP

(57) ABSTRACT

A communication system is provided which implements more comfortable user operation where an electric apparatus which is remotely controlled by a remote controller (remote control apparatus) carries out processing operation in which an information recording medium is used. Remote controller data, remote controller controlling commands and reader/writer commands are placed into and transmitted by command data cmdDATA in packets of the same format. Further, reader/writer command data rwDATA and a reader/writer communication footer (parity for an error check and so forth) rwFT which have a longer data length are divided and placed divisionally into and transmitted together with the command data cmdDATA in communication packets. The transmitted data are received and merged.

17 Claims, 23 Drawing Sheets (A)

(B)

(C)

(56) References Cited

U.S. PATENT DOCUMENTS

| | | |
|---|---|---|
| 2004/0056984 A1 | 3/2004 | Hayes et al. |
| 2006/0012488 A1* | 1/2006 | Hilbrink et al. .......... 340/825.69 |
| 2006/0197676 A1* | 9/2006 | Smith ....................... 340/825.69 |
| 2008/0088474 A1* | 4/2008 | Hardacker et al. ....... 340/825.72 |

FOREIGN PATENT DOCUMENTS

| | | |
|---|---|---|
| JP | 2001-067412 | 3/2001 |
| JP | 2001-186579 | 7/2001 |
| JP | 2002-027576 | 1/2002 |
| JP | 2002-268691 | 9/2002 |
| JP | 2002-291067 | 10/2002 |
| JP | 2003-304584 | 10/2003 |
| JP | 2005-027167 | 1/2005 |
| JP | 2006-203831 | 8/2006 |
| WO | 2005/107185 | 11/2005 |

OTHER PUBLICATIONS

Japanese Patent Office, Notice of reasons for refusal issued in connection with Japanese Patent Application No. 2008-009768, dated Oct. 23, 2012. (3 pages).

* cited by examiner

| BYTE | (1) | (2) | (3) | (4) | (5) | (6) | (7) | (m) |
|---|---|---|---|---|---|---|---|---|
| | 00h | * | * | * | * | * | | * |
| | VERSION 1 BYTE | FRAME (NWL) 1 BYTE | FRAME 1 BYTE | CONTROL 1 BYTE | LENGTH 1 BYTE | CODE 1 BYTE | CATEGORY DEPENDENT PART VARIABLE LENGTH (BYTE SEQUENCE) | |

(B)

| BYTE | (6) | (7) | (m) |
|---|---|---|---|
| | * | * | * |
| | CODE | COMMAND | ARGUMENT |
| | ENTIRE DATA | | |

REMOTE CONTROL APPARATUS, ELECTRIC APPARATUS AND COMMUNICATION SYSTEM

CROSS REFERENCE TO RELATED APPLICATIONS

The present application is a National Stage of International Application No. PCT/JP2008/068742 filed on Oct. 16, 2008 and which claims priority to Japanese Patent Application No. 2008-009768 filed on Jan. 18, 2008, the entire contents of which are being incorporated herein by reference.

BACKGROUND

This present disclosure relates to a remote control apparatus and an electric apparatus for use with a communication system which includes an electric apparatus and a remote control apparatus which carries out radio communication with the electric apparatus, and a communication system.

Conventionally, a television receiver which can be connected to the Internet is available. For example, a technique is known wherein a signal including URL (Uniform Resource Locator) information of a network service relating to a television broadcasting program is multiplexed with and transmitted together with a television image signal and a television broadcasting receiver for receiving the signal establishes a connection to an access point corresponding to the URL through the Internet to receive data and outputs and displays a corresponding homepage to and on a CRT (Cathode Ray Tube) (refer to Japanese Patent Laid-Open No. Hei 9-162818).

Meanwhile, another technique is known wherein a television receiver which can be connected to the Internet uses information recorded on an information recording medium such as an IC (Integrated Circuit) card to carry out various data processes on the Internet (refer to Japanese Patent Laid-Open No. 2001-67412).

In such a television receiver which can be connected to the Internet as described above, an IC card is brought to a position in the proximity of a reader/writer built in or externally connected to a television apparatus body, and information which is read out from and is to be written into the IC card is transferred through the Internet. For example, where a user downloads and enjoys a content such as a movie or a playing game, an IC card is brought to a position in the proximity of the reader/writer and information recorded in the IC card is sent through the television receiver to pay a purchase price of the content. On the other hand, when the user carries out a normal operation for a television receiver such as sound volume adjustment or channel changeover, an operation instruction is inputted to a remote control apparatus (remote controller) placed at a location spaced by a predetermined distance from the television receiver and is sent to the television receiver.

In this instance, although a normal operation instruction to the television receiver is inputted by operation of the remote controller, where an IC card is applied to the television receiver for purchase of a content or the like, the user must bring the IC card to the television receiver, and this is not good in convenience in use to the user.

Thus, it seems a possible idea to provide a remote control apparatus with a reader/writer which carries out reading out and writing of information from and into an information recording medium such as an IC card in order that a processing operation, in which the information recording medium is used, for payment of a price or the like through the Internet communication can be carried out using the remote control apparatus at hand at a position spaced away from a television receiver.

Incidentally, it may be a possible idea to communicate, between such a remote control apparatus (remote controller) and a television receiver which is a remotely controlled electric apparatus as described hereinabove, not only a remote control instruction but also a signal other than the remote control instruction (information which is read out from and is to be written into an IC card and so forth). In this instance, it is preferable that transmission and reception which include no waste in a communication path and a format and is simple and appropriate in processing can be carried out.

SUMMARY

It is an object to provide a remote control apparatus, an electric apparatus and a communication system wherein, in a process carried out by applying an information recording medium such as an IC card to an electric apparatus which is controlled by a remote control apparatus, the communication between the remote control apparatus and the electric apparatus is made appropriate to implement more comfortable user operation.

In order to solve the subject described above, according to an embodiment, there is provided a remote control apparatus which carries out radio communication with an electric apparatus, including a reader/writer adapted to carry out reading out and writing of information from and into or on an information recording medium, and transmission/reception means adapted to carry out transmission and reception of a signal to and from the electric apparatus, the transmission/reception means transmitting and receiving an operation instruction to the electric apparatus, a control instruction to the remote control apparatus, information to be written into or on the information recording medium and information read out from the information recording medium to and from the electric apparatus using packets of the same format.

Further, according to an embodiment, there is provided an electric apparatus which carries out radio communication with a remote control apparatus having a reader/writer adapted to carry out reading out and writing of information from and into or on an information recording medium and is controlled by the remote control apparatus, including transmission/reception means for carrying out transmission and reception of a signal to and from the remote control apparatus by the radio communication, the transmission/reception means transmitting and receiving an operation instruction to the electric apparatus, a control instruction to the remote control apparatus, information to be written into or on the information recording medium and information read out from the information recording medium to and from the remote control apparatus using packets of the same format.

According to a further embodiment, there is provided a communication system which includes an electric apparatus and a remote control apparatus which carries out radio communication with the electric apparatus, wherein the remote control apparatus includes a reader/writer adapted to carry out reading out and writing of information from and into or on an information recording medium, and first transmission/reception means adapted to carry out transmission and reception of a signal to and from the electric apparatus by the radio communication, and the electric apparatus includes second transmission/reception means for carrying out transmission and reception of a signal to and from the remote control apparatus by the radio communication, the first and second transmission/reception means transmitting and receiving an operation instruction to the electric apparatus, a control instruction to the remote control apparatus, information to be written into or on the information recording medium and information read out from the information recording medium to and from the electric apparatus using packets of the same format.

According to the embodiment, an operation instruction to the electric apparatus, a control instruction to the remote control apparatus, information to be written into or on the information recording medium and information read out from the information recording medium are placed on and transmitted with packets of the same format. By standardizing and transmitting the packets on the communication path, standardization and coexistence in an appropriate form can be achieved.

Additional features and advantages are described herein, and will be apparent from, the following Detailed Description and the figures.

BRIEF DESCRIPTION OF THE FIGURES

FIG. 11 is diagrammatic views illustrating an example of a format of a packet transferred between the television receiver and the remote control apparatus in the communication system according to the embodiment.

DETAILED DESCRIPTION

A description will be given below of the preferred embodiments with reference to accompanying drawings.

Figure 1:
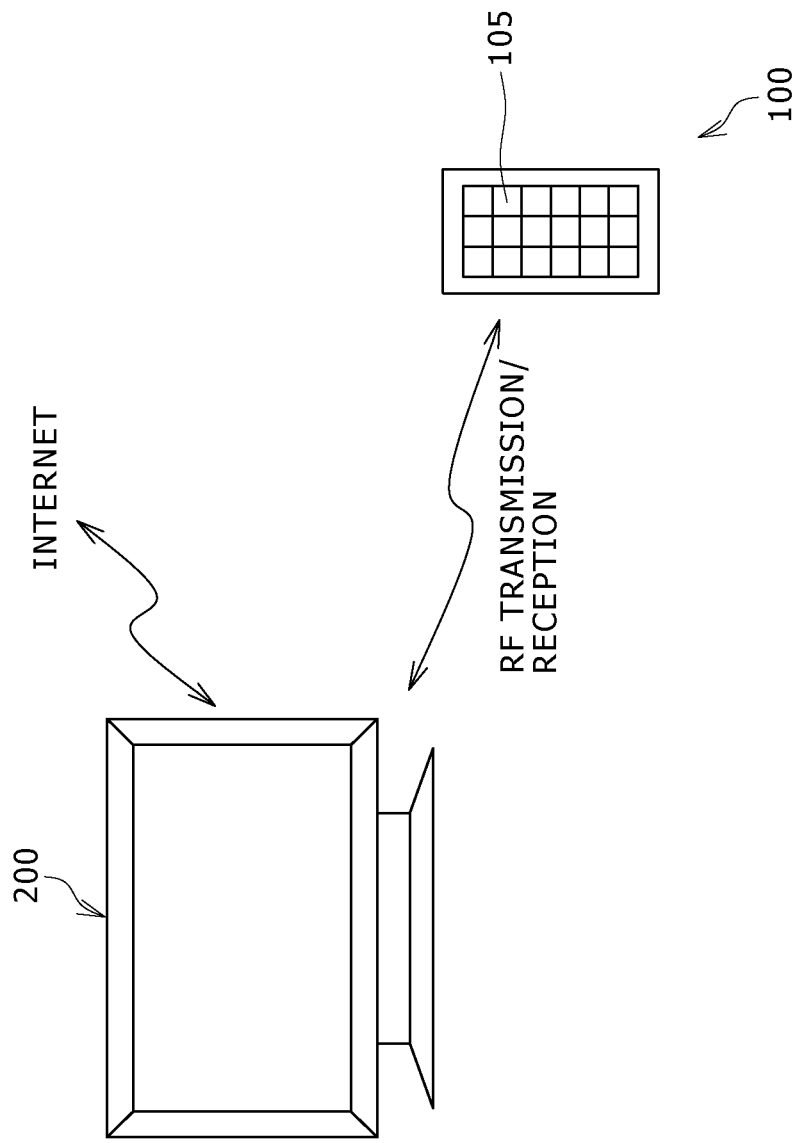
FIG. 1 is a schematic view showing a configuration of a communication system which includes a remote control apparatus to which an embodiment is applied.

FIG. 1 shows a configuration of a communication system 1 to which an embodiment is applied. Referring to FIG. 1, the communication system 1 includes a remote controlling apparatus (hereinafter referred to as remote controller) 100, and a television receiver 200 which is an example of an electric apparatus which communicates with the remote controller 100 by radio communication.

The remote controller 100 includes a key operation section on which operation keys for inputting an operation signal based on an operation of the television receiver 200 by a user are arrayed, and a reader/writer for reading out and writing information from and into an IC card (not shown). The television receiver 200 has a function as an ordinary television broadcast receiver and a function of establishing a connection to the Internet. The television receiver 200 can download a content such as a movie, an animation, a drama, a sports game, a playing game and so forth provided by a service provider through the Internet and reproduce the content.

As a short-distance radio communication method to be applied to the communication system 1, a communication method is available which has a maximum data transfer rate of 250 kbps and a maximum transmission distance of 30 m and allows a large number of apparatus to be connected to one network and besides is low in power consumption. This short-distance radio communication method is applied to remote control of a domestic appliance and so forth, and the IEEE (Institute of Electrical and Electronic Engineers) 802.15.4 is used as the interface for a physical layer and a carrier frequency band of the 2.4 GHz band same as that of the IEEE 802.11b of the radio LAN (Local Area Network) standards is divided into and used with 16 channels in Japan. It is to be noted that, in the United States, the 915 MHz band can be used, and in Europe, the 868 MHz band can be used.

The remote controller 100 and the television receiver 200 carry out transfer of signals by bidirectional short-distance radio communication using an RF (radio frequency) signal of the carrier frequency of 2.4 GHz by the IEEE 802.15.4 communication method.

The IC card incorporates an IC chip which includes a rewritable semiconductor memory such as an EEPROM (Erasable Programmable Read Only Memory), a CPU (Central Processing Unit) and so forth, and can carry out complicated data processing. The IC card from and into which information can be read out and written by the remote controller 100 is formed from a contactless type IC card from and into which information can be read out and written without the necessity for contacting the same with the reader/writer of the remote controller 100. The IC card thus utilizes radio waves oscillated from the reader/writer to carry out transmission and reception of a signal to and from the remote controller 100.

Into and from the IC card from and into which information is read out and written by the remote controller 100, information such as an electronic money which is processed for accounting upon purchase of a content or a personal identification number or a password for permitting accessing to an electric apparatus is written and read out.

Figure 2:
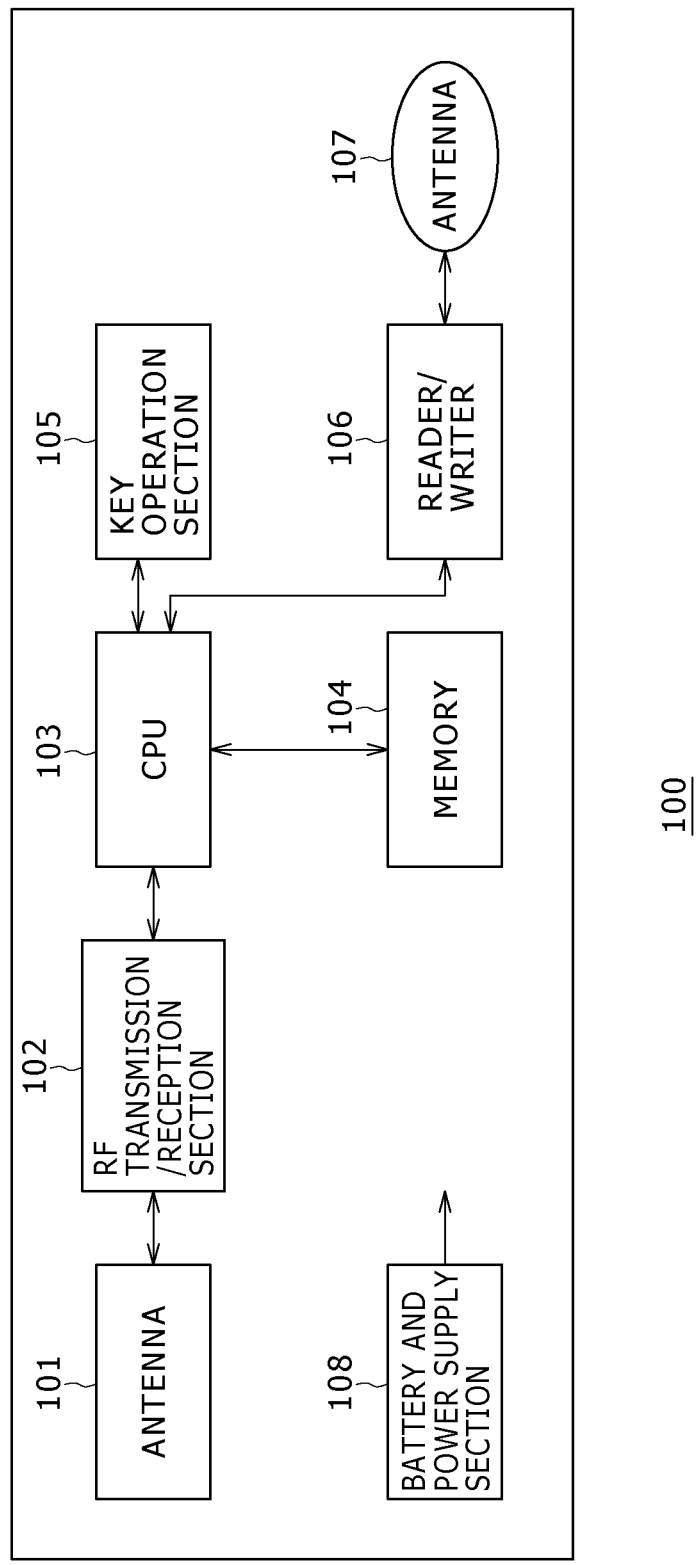
FIG. 2 is a block diagram showing a configuration of the remote control apparatus according to the embodiment.

FIG. 2 shows a configuration of the remote controller 100. Referring to FIG. 2, the remote controller 100 includes an antenna 101 for communicating with the television receiver 200 by radio communication, an RF transmission/reception section 102 for transmitting and receiving an RF signal through the antenna 101, a CPU 103, a memory 104 connected to the CPU 103, a key operation section 105, a reader/writer 106 for reading out and writing information from and into an IC card, an antenna 107 for carrying out electromagnetic interaction with the IC card, and a battery and power supply section 108 for supplying power to the components mentioned.

The reader/writer 106 carries out reading out and writing of information from and into the IC card using a technique of RFID (Radio Frequency Identification). In particular, if current flows to the antenna 107, then an alternating magnetic field is generated in the antenna 107, and if the IC card moved to the proximity of a card information reading section of the reader/writer 106 placed in the magnetic field, then an AC voltage is induced in an antenna coil which the IC card has. This AC voltage is converted into a DC voltage in the IC card, and the IC chip operates with the DC voltage. Further, when electric current flows through the antenna of the IC card, a magnetic field is generated and has an influence on the antenna 107. The reader/writer 106 carries out amplitude shift keying (ASK), frequency shift keying (FSK), phase shift keying (PSK) or the like for the carrier communicated with the IC card to carry out communication with the IC card. The reader/writer 106 uses such an electromagnetic induction method of the electromagnetic wave frequency of 13.56 MHz of the RFID as described above to establish magnetic coupling between the antenna 107 and the antenna of the IC card to carry out transfer of a signal to and from the IC card.

The key operation section 105 has various operation keys arrayed thereon for inputting various operation commands to the television receiver 200 based on an operation thereof by the user such as, for example, a channel selection key or keys, a sound volume key or keys and a determination key. Some of the operation keys are used also as keys necessary for processing in which information in the IC card is used.

The memory 104 includes a RAM (Random Access Memory), a ROM (Read Only Memory) and so forth.

The CPU 103 reads out a program stored in the ROM of the memory 104 and develops the program on the RAM of the memory 104 to control general signal processing of the remote controller 100.

The RF transmission/reception section 102 carries out short-distance radio communication using an RF signal of the carrier frequency of 2.4 GHz by the IEEE 802.15.4 through the antenna 101 to transfer a signal.

The RF transmission/reception section 102 transmits an ordinary operation instruction for sound volume adjustment, channel changeover or the like to the television receiver 200 by unidirectional short-distance radio communication to the television receiver 200 and transfers information to be read out from and written into the IC card by bidirectional short-distance radio communication under the control of the CPU 103.

The battery and power supply section 108 includes a battery for driving the remote controller 100 and a power supply for supplying current for allowing the reader/writer 106 to carry out reading out and writing of information from and into the IC card.

In the short-distance radio communication, since the RF signal is non-directional, the remote controller 100 can communicate with the television receiver 200 even if an obstacle exists therearound. Further, even if the amount of data to be read out from or written into the IC card is great, the remote controller 100 can transfer the data at a high speed.

Figure 3:
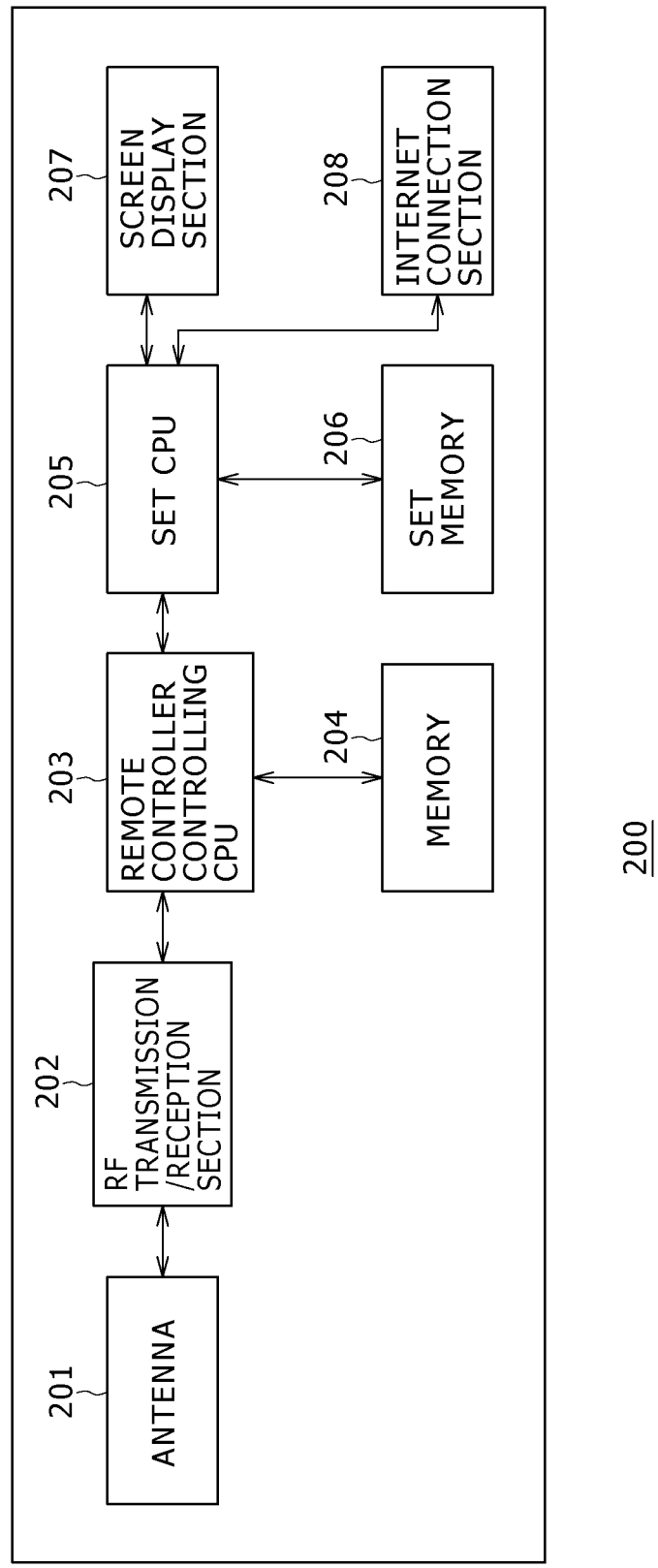
FIG. 3 is a block diagram showing a configuration of a television receiver which can be remotely controlled by the remote control apparatus according to the embodiment.

FIG. 3 shows a configuration of the television receiver 200. Referring to FIG. 3, the television receiver 200 includes an antenna 201 for communicating with the remote controller 100 by radio communication, an RF transmission/reception section 202 for transmitting and receiving an RF signal through the antenna 201, a remote controller controlling CPU 203 for controlling the remote controller 100, a memory 204 connected to the remote controller controlling CPU 203, a set CPU 205, a set memory 206 connected to the set CPU 205, a screen display section 207, and an Internet connection section 208 connected to the Internet through a communication line.

The RF transmission/reception section 202 transmits and receives a signal to and from the remote controller 100 by short-distance radio communication using an RF signal of the carrier frequency of 2.4 GHz by the IEEE 802.15.4 communication method.

The screen display section 207 includes, where it is, for example, an LCD (Liquid Crystal Display) apparatus, an liquid crystal panel, a backlight and so forth, and displays a television program, a content acquired through the Internet, a selection screen for a remote controller operation and so forth.

The Internet connection section 208 is connected to the Internet through a communication circuit for a broadband or the like such that it can download a content of a movie, sports, a drama, a playing game or the like from a server under the control of the set CPU 205. It is to be noted that the Internet connection section 208 may be provided in a separate housing provided on the rear face of the television receiver 200 and connected by an HDMI (High Definition Multimedia Interface) cable or the like.

The set memory 206 includes a RAM, a ROM and so forth.

The set CPU 205 reads out a program stored in the ROM of the set memory 206, develops the program on the RAM of the set memory 206 and executes the program to control signal processing of the television receiver 200 as a whole. As a particular example, the set CPU 205 carries out data processing on the Internet through the Internet connection section 208, control of image processing of an image to be displayed by the screen display section 207 and so forth. Further, the set CPU 205 acquires information processed on the Internet from the server through the Internet connection section 208 and transmits the information to the remote controller controlling CPU 203.

The memory 204 includes a RAM, a ROM and so forth.

The remote controller controlling CPU 203 reads out and develops a program stored in the ROM of the memory 204 on the RAM of the memory 204 to control transmission and reception of a signal to and from the remote controller 100 carried out by the RF transmission/reception section 202.

The remote controller controlling CPU 203 conveys information from the server acquired from the set CPU 205 through the remote controller 100 by the short-distance radio communication described hereinabove and reads out and writes information from and into the IC card through the CPU 103 of the remote controller 100. In other words, reading out and writing of information from and into the IC card carried out by the reader/writer 106 of the remote controller 100 are controlled with a command received by the television receiver 200.

It is to be noted that the television receiver 200 may further include a memory such as a HDD (Hard Disk Drive) which has a large storage capacity and allows rewriting such that a moving picture content desired by the user can be recorded into the memory.

Now, communication operation between the remote controller 100 and the television receiver 200 in the communication system 1 is described.

If the user operates any of the operation keys arrayed on the key operation section 105 of the remote controller 100, then the CPU 103 decides that an operation instruction is inputted and outputs a corresponding command to the television receiver 200 through the RF transmission/reception section 102 and the antenna 101.

In the television receiver 200, the remote controller controlling CPU 203 discriminates the command acquired through the antenna 201 and the RF transmission/reception section 202 and carries out a control process corresponding to the command.

Where the user intends to purchase a content of a movie, an animation, a drama, a sports game, a playing game and so forth from the Internet, the user would carry out a necessary operation using the remote controller 100 while observing an operation screen image displayed on the television receiver 200 to select and determine a content to be purchased. The user would determine a method of payment using an IC card, and when the purchase price is to be paid, the remote controller controlling CPU 203 of the television receiver 200 transmits information that communication should be carried out with the IC card to the remote controller 100 through the RF transmission/reception section 202 and the antenna 201 by the short-distance radio communication described above. The CPU 103 of the remote controller 100 switches on the power supply of the reader/writer 106 to cause the antenna 107 to generate electromagnetic waves necessary for reading out and writing of the IC card to carry out reading out of information stored in the IC card. The information read out from the IC card is transmitted to the television receiver 200 through the RF transmission/reception section 102 and the antenna 101.

The television receiver 200 transmits the information read out from the IC card to the corresponding server through the Internet. The remote controller controlling CPU 203 receives the information from the set CPU 205 of the television receiver 200 which receives a reply from the server and conveys the information from the server acquired by the set CPU 205 through the remote controller 100 by the short-distance radio communication through the RF transmission/reception section 202 to carry out reading out and writing of information from and into the IC card through the CPU 103 of the remote controller 100.

If such a procedure as described above is repeated several times until the payment process of the price using the IC card is completed and reading out and writing of information from and into the IC card become unnecessary, then the remote controller controlling CPU 203 of the television receiver 200 conveys information representing this to the CPU 103 of the remote controller 100 and the power supply of the reader/writer 106 is switched off.

On the other hand, where the user carries out an ordinary operation such as sound volume adjustment, channel changeover or the like for the television receiver 200, the CPU 103 of the remote controller 100 carries out a process only of transmitting an operation command corresponding to the inputting operation of the key operation section 105 by the user to the television receiver 200 through the RF transmission/reception section 102 and the antenna 101.

Thereupon, the remote controller controlling CPU 203 of the television receiver 200 only carries out control corresponding to the operation command received from the remote controller 100, but it is not always necessary for the remote controller controlling CPU 203 to transmit a response signal to the remote controller 100.

Accordingly, the power supply of the reader/writer 106 provided in the remote controller 100 remains in an off state and has no relationship to the operation in this instance.

As described above, in the communication system 1, since the remote controller 100 includes a reader/writer which uses the RFIF communication method to carry out reading out and writing of information from and into the IC card, an operation for a process in which the IC card is used can be carried out at a position spaced away from the television receiver 200.

Further, in the communication system 1, since the same communication method is used as the communication method in ordinary operation from the remote controller 100 to the television receiver 200 and the communication method for transmission and reception of information to and from the IC card, it is possible to prevent increase of the number of parts and increase of the cost by such increase of the number of parts without provision of a plurality of communication paths for different communication methods and to implement miniaturization of the apparatus.

Furthermore, in the communication system 1, since the power supply of the reader/writer 106 is in an off state during an ordinary key operation such as an operation for transmission of an operation command but is switched on only when reading out or writing of information from or into the IC card is required, it is possible to reduce the consumption on a battery.

It is to be noted that, while, in the embodiment described above, the communication system 1 includes the television receiver 200 as an electric apparatus, it may include any electric apparatus which receives an operation command from a remote controller.

Now, arrangement and so forth of the components of the remote controller 100 having the configuration described above are described in detail.

Figure 4:
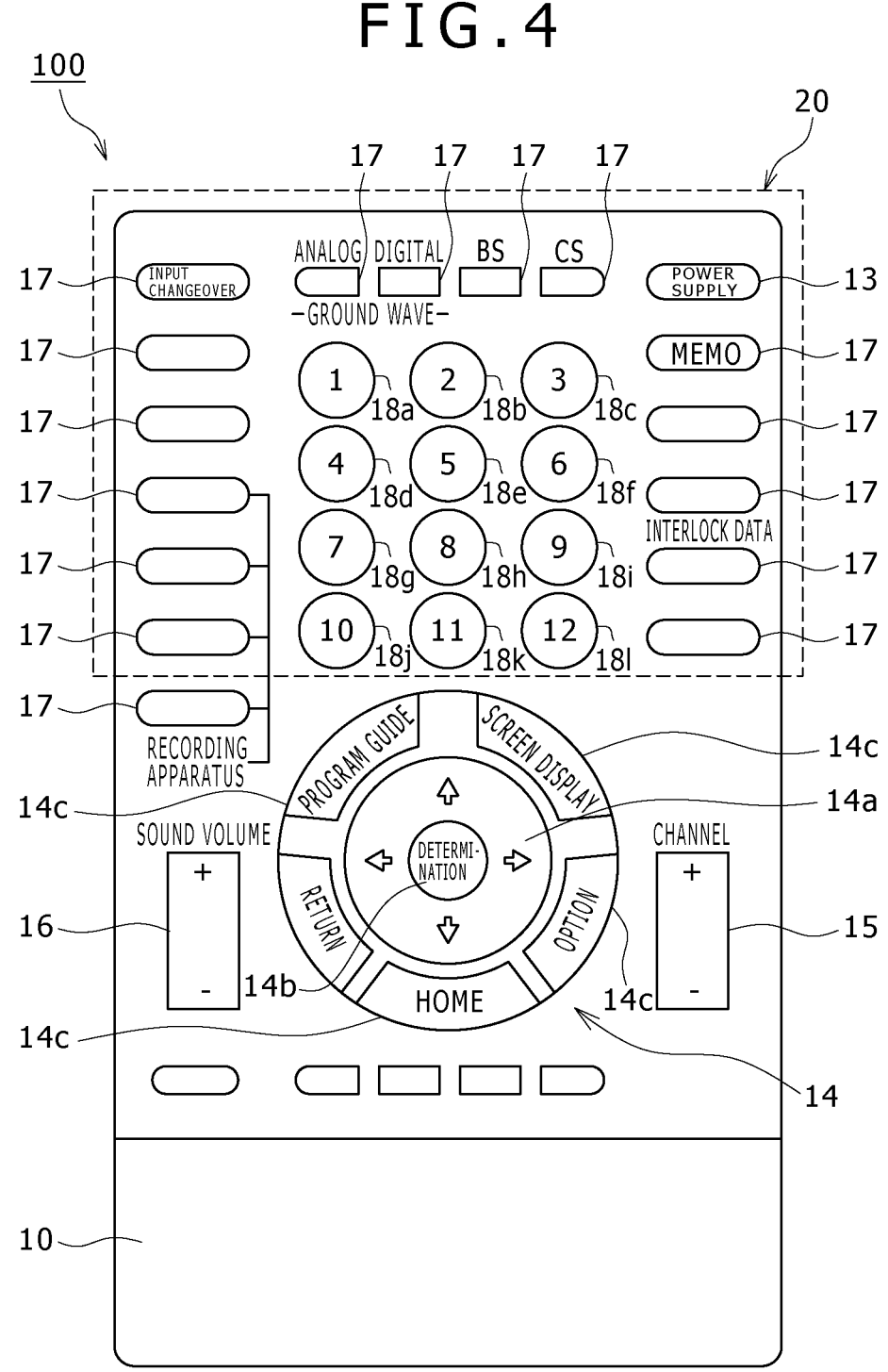
FIG. 4 is a front elevational view of the remote control apparatus according to the embodiment.

FIG. 4 schematically shows an example of a front elevation of the remote controller 100 according to the present embodiment. Meanwhile, FIG. 5 schematically shows an internal configuration of the remote controller 100.

Figure 5:
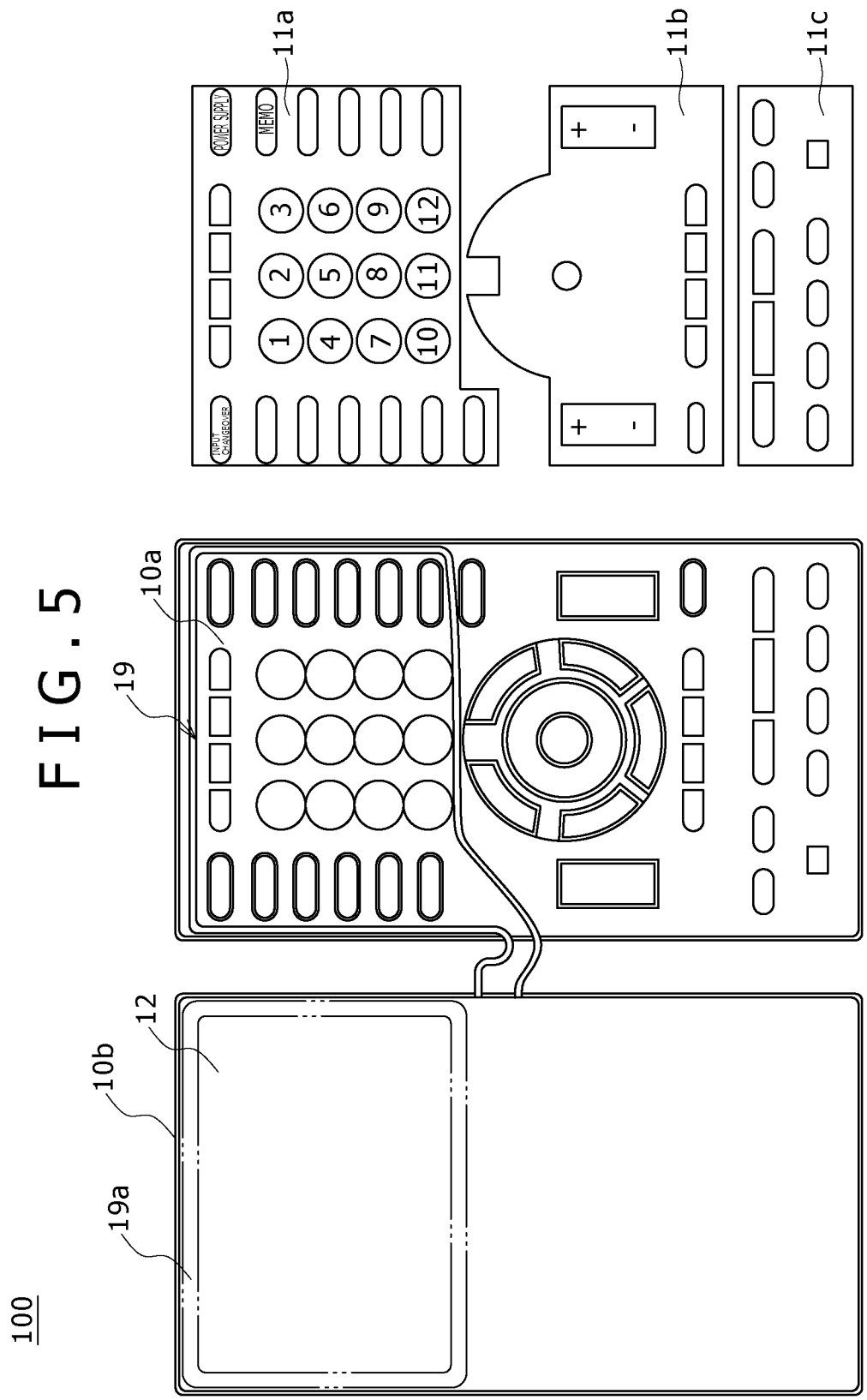
FIG. 5 is a schematic view showing an internal configuration of the remote control apparatus according to the embodiment.

Referring to FIGS. 4 and 5, the remote controller 100 includes a box-shaped housing 10 including a front face cover 10a and a rear face cover 10b, operation key members 11a to 11c formed from a rubber material or the like and forming the key operation section 105, and a board 12 disposed on the housing 10 and attached to the rear face cover 10b.

The front face cover 10a has a hole formed therein through which projections of the operation key members 11a to 11c to be operated by the user extend. The rear face cover 10b has an attaching portion not shown provided in the inside thereof such that the board 12 is attached to the rear face cover 10b through the attaching portion and accommodated in the rear face cover 10b. Further, the rear face cover 10b has a battery accommodating portion not shown provided thereon for accommodating a dry cell for the power supply. The battery accommodating portion is covered with a rear lid which forms part of the rear face of the housing 10, and when the dry cell is to be exchanged, engagement between a pawl portion of the rear lid and the rear face of the housing is canceled thereby to allow the rear lid to be opened.

The operation key members 11a to 11c have a power supply key 13, selection keys 14a to 14c, an up/down channel selection key 15, a sound volume adjustment key 16, function keys 17, and numeral keys 18a to 18l. The power supply key 13 is provided to control on/off changeover of the power supply of the television receiver 200. The selection keys 14a to 14c include a ring-shaped direction key 14a having "←," "↑," "→" and "↓" marks indicated thereon for being operated in order to move a cursor displayed on the screen display section 207 of the television receiver 200 based on a guide displayed on the screen display section 207, a circular determination key 14b provided at a central position, and various display selection keys 14c for displaying a screen image of a program guide or the like. The up/down channel selection key 15 is used to increase or decrease the channel number for channel selection, and the sound volume adjustment key 16 is provided for adjustment of the sound volume. The numeral keys 18a to 18l individually have numerals from "1" to "12" for channel selection arrayed at a substantially central location of the remote controller 100.

For example, when the user wants to receive distribution of a content of a movie, an animation, a drama, a sports game, a playing game and so forth from a server of the Internet, the selection keys 14a to 14c are used to selectively determine a content or the like based on a guide displayed on the display screen of the television receiver 200 or in a like case. In particular, if a content selection screen image which includes a table of purchasable contents distributed through the Internet is displayed on the display screen of the television receiver 200, then the user would operate the direction key 14a disposed at a central portion of the remote controller 100 to move the cursor to a display position of the desired content displayed on the display screen. Then, the user would depress the determination key 14b at the displayed position of the desired content to determine the desired content to be distributed. Then, after a screen image for a purchase procedure is displayed, a purchase procedure of the content is entered online. Thereupon, if some change such as change of the content is required, then the selection key 14c on which "return" is indicated can be depressed to restore the content selection screen. In this manner, it is necessary to operate a selection key 14 shown in FIG. 4, for example, in selection of a service or in a content purchase procedure through the Internet.

It is to be noted that the selection keys 14a to 14c are used not only upon provision of a service through the Internet but may naturally be provided as an operation system which is used in ordinary television operations of a television receiver.

The up/down channel selection key 15 and the sound volume adjustment key 16 are operation keys having indications of "+" and "−" marks thereon. If the "+" key is depressed, then the up/down channel selection key 15 can be operated so as to increase the channel number or the sound volume adjustment key 16 can be operated so as to increase the sound volume. On the other hand, if the "−" key is depressed, the opposite operations to the operations described above can be carried out. It is to be noted that, when reading out and writing of information from and into the IC card are to be carried out, the up/down channel selection key 15 and the sound volume adjustment key 16 of the remote controller 100 can be used as operation keys necessary for reading and writing processes of information. Details are hereinafter described.

Further, the numeral keys 18a to 18l are operation keys for direct channel selection, and the numbers indicated on the numeral keys 18a to 18l individually correspond to channel numbers. Thus, the user would operate one of the numeral keys 18a to 18l which corresponds to a desired channel number to change the channel of the television broadcast to be received by the television receiver 200. The location of the remote controller 100 at which the numeral keys 18a to 18l are disposed overlaps with a card reading section 20 of the IC card, and the antenna 107 of the reader/writer 106 is disposed on the same board face on which the numeral keys 18a to 18l are disposed. Details are hereinafter described.

The other function keys 17 include, for example, a screen changeover key for changing over the display screen image to a service provider selection screen image for receiving a VOD (Video On Demand) service, an input changeover key, a broadcast changeover key for selecting an analog broadcast or a digital broadcast, a recording key, a recording reservation key and so forth. However, the function keys 17 are not limited to those mentioned but are not required essentially.

In the remote controller 100 according to the embodiment, the key operation section 105 is formed by forming projections on the operation key members 11a to 11c including such various operation keys as described above from a resin material or the like such that they can be depressed and attaching the operation key members 11a to 11c to the front face cover 10a which has holes formed therein such that the operation keys can be fitted therein. It is to be noted that the functions of the operation keys are not limited to those described above but are not essentially required. Further, naturally the types of the operation keys and the key arrangement on the remote controller surface are not limited to those described hereinabove, but various operation keys can be disposed on the remote controller surface.

It is to be noted that, in the present embodiment, the state of the remote controller 100 when FIG. 4 which shows a front elevation of the remote controller 100 is viewed squarely is hereinafter referred to as front direction of the remote controller 100. It is to be noted that, when the user operates the remote controller 100, the front direction of the remote controller 100 need not necessarily be directed toward the television receiver 200, but, since an RF signal is used for communication between the remote controller 100 and the television receiver 200 as described above, it is possible to carry out radio communication with the television receiver 200 even if the remote controller 100 is directed in the opposite direction to the front direction.

The board 12 is attached to the rear face cover 10b which is a component of the housing 10 and includes an antenna 101 for communicating with the television receiver 200, an RF transmission/reception section 102 for transmitting and receiving an RF signal, a CPU 103 for controlling the remote controller 100, a memory 104, a circuit board of the reader/writer 106 for carrying out reading out and writing of information from and into the IC card, and an antenna 107 for generating and feeding a voltage for operating the IC chip in the IC card to carry out communication with the IC card.

Figure 6:
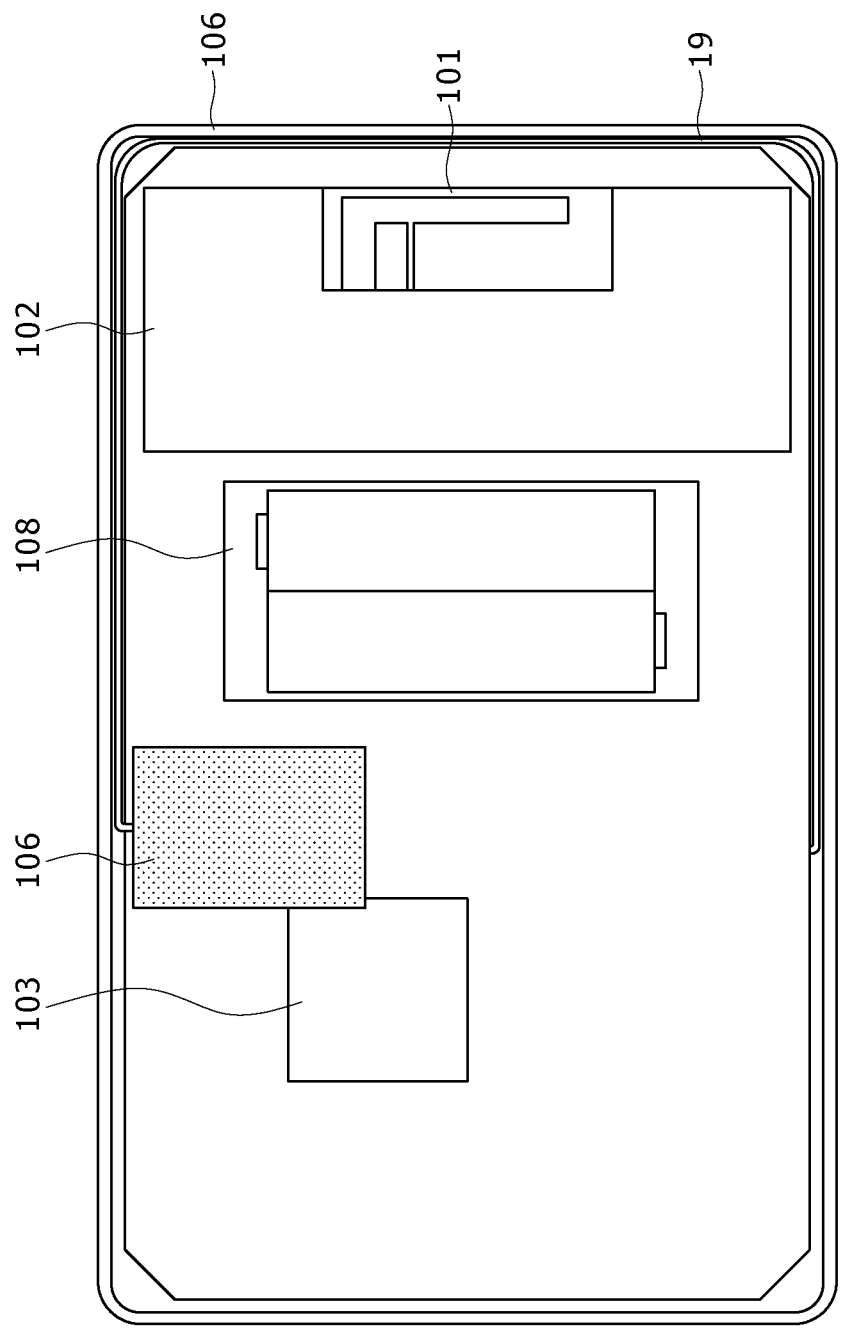
FIG. 6 is a schematic view showing an arrangement configuration on a board of the remote control apparatus according to the embodiment.

FIG. 6 schematically shows an arrangement configuration of the components on the board 12 of the remote controller 100 of the present embodiment. Referring to FIG. 6, the RF transmission/reception section 102 and the antenna 101 for communicating with the television receiver 200 are disposed at an end portion of the remote controller 100 in the front direction, and the circuit board of the reader/writer 106 for controlling reading out and writing of information from and into the IC card is disposed at a substantially central portion of the remote controller 100. Meanwhile, the CPU 103 for controlling the remote controller 100 itself is disposed at a rear portion of the remote controller 100 with respect to the circuit board of the reader/writer 106. Further, on the remote controller 100, a loop antenna 19 formed in a loop shape from a lead wire is disposed as the antenna 107 of the reader/writer 106 in such a manner as to surround the location of the board at which the numeral keys 18a to 18l for direct channel selection are disposed. Furthermore, on the remote controller 100, a battery serving as the power supply is disposed in a spaced relationship from the loop antenna 19 on the inner side of the loop antenna 19 in the form of a loop which corresponds to the antenna 107 of the reader/writer 106. It is to be noted that the arrangement configuration on the board 12 is not limited to that described above.

The loop antenna 19 generates an alternating magnetic field for supplying power to and carrying out reading out and writing of information from and into an information recording medium such as an IC card. The loop antenna 19 is connected to the circuit board of the reader/writer 106 formed on the board 12 and functions as the antenna 107 of the reader/writer 106. A signal received by the loop antenna 19 is transmitted to the CPU of the reader/writer 106, and a current signal produced under the control of the CPU of the reader/writer 106 is supplied to the loop antenna 19 to carry out reading out and writing of information from and into the IC card.

Here, on the remote controller 100, the numeral keys 18a to 18l and the function keys 17 are disposed on the inner side of the loop antenna 19 provided at the end of the board in such a manner as to surround the board 12 as described hereinabove (refer to FIG. 5 or 6). Accordingly, the location at which the loop antenna 19 is formed is used as the card reading section 20 for carrying out reading out and writing of information from and into the IC card, and by positioning the IC card in the proximity of the card reading section 20 at which a magnetic field is generated by the loop antenna 19, reading out and writing of information are carried out by the reader/writer 106. Then, the location described serves as an operation section of the numeral keys 18a to 18l and so forth.

In this manner, on the remote controller 100, by forming the loop antenna 19 in such a manner that the lead wires pass the board end at an outer peripheral portion of the board 12, the operation keys can be disposed on the inner side of the loop antenna 19 and can be disposed on the same plane as that of the card reading section 20.

It is to be noted that, while, in the embodiment described above, a loop antenna is formed at an outer peripheral portion of the board 12 in such a manner as to be surrounded by the lead wires, also where a pattern formed from a copper foil or the like is formed at a location indicated virtually by an alternate long and short dashes line in FIG. 5, an effect similar to that where a loop antenna is formed from a lead wire described hereinabove can be achieved. Further, in order to prevent deterioration of the antenna performance, more preferably the loop antenna 19 or 19a formed from a lead wire or a pattern is disposed in a spaced relationship by a distance as great as possible from any other pattern or electronic part.

Figure 7:
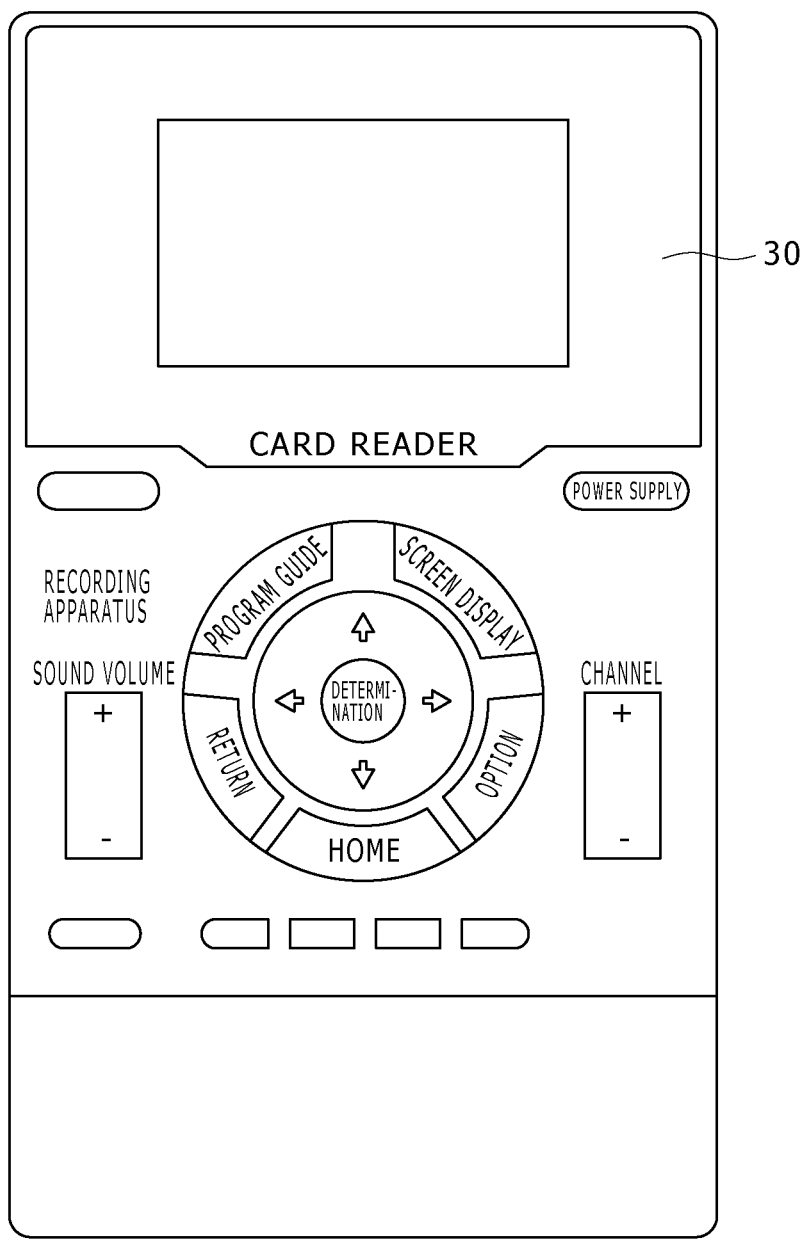
FIG. 7 is a front elevational view of a remote control apparatus which does not include numeral keys.

In this manner, where the loop antenna 19 is disposed in such a manner as described hereinabove and the operation keys are disposed such that they overlap with the card reading section 20 when they are viewed in an orthogonal projection from above in the front direction of the remote controller 100, the surface of the body of the remote controller 100 can be utilized effectively. Where the remote controller 100 is compared with such a remote controller, for example, as shown in FIG. 7 wherein it includes a card reading/writing section 30 but does not include numeric keys, easier remote controlling operation to the user can be anticipated.

Further, the remote controller 100 provides good convenience in use since the body thereof can be prevented from increasing in size, different from an alternative case wherein a card reading section and numeric keys are provided at different positions from each other. Further, since the loop antenna and the operation keys are disposed on the same board, the size of the board can be suppressed small and the fabrication cost of the board can be suppressed.

Further, since the remote controller 100 is configured such that the loop antenna 19 is formed from a lead wire or a pattern at an outer peripheral portion of the board 12 in such a manner as to surround the board 12 as described above such that information can be read out from and written into an IC card, a battery which forms the battery and power supply section 108 can be disposed on the inner side of the formed location of the loop antenna 19 without much disturbing electromagnetic waves generated from the antenna until it contacts with the loop antenna 19. Consequently, the necessity for providing a space for disposition of a battery at a different position is eliminated, and the size of the remote controller can be reduced further. It is to be noted that, in this instance, more preferably the battery disposed on the inner side of the formed location of the antenna 107 which surrounds an outer peripheral portion of the board 12 is disposed at a location spaced by a remote absolute distance from the antenna, that is, at a central position of the antenna 107.

It is to be noted that the battery which forms the battery and power supply section 108 is not necessarily disposed at the position described above, that is, on the inner side of the formed location of the loop antenna 19, but may naturally be disposed at a spaced position on the outer side of the loop antenna 19.

Further, since the loop antenna 19 of the remote controller 100 of the present embodiment is provided at the end of the board 12 in such a manner as to surround the board 12, such a situation that the magnetic field is obstructed by a metal member disposed in the board is eliminated, and the range of the magnetic field generated from the loop antenna 19 extends to the rear face side (rear face cover 10b side) of the remote controller 100, and not only reading out and writing of information from and into the IC card can be carried out from the front face side (operation key arrangement side) of the remote controller 100, but also it becomes possible to carry out reading out and writing of information from and into the IC card from the rear face side of the remote controller 100. This makes it possible to carry out an accounting process, an electronic settlement process or the like by holding up the card reading section 20 of the remote controller 100 from the rear face side of the IC card placed on a non-metal material table also from the rear face side of the remote controller 100. It is to be noted that, in this instance, an electronic part made of a metal which disturbs a magnetic field generated from the loop antenna 19 is not disposed below the loop antenna 19, that is, on the rear face side of the body of the remote controller 100.

Figure 8:
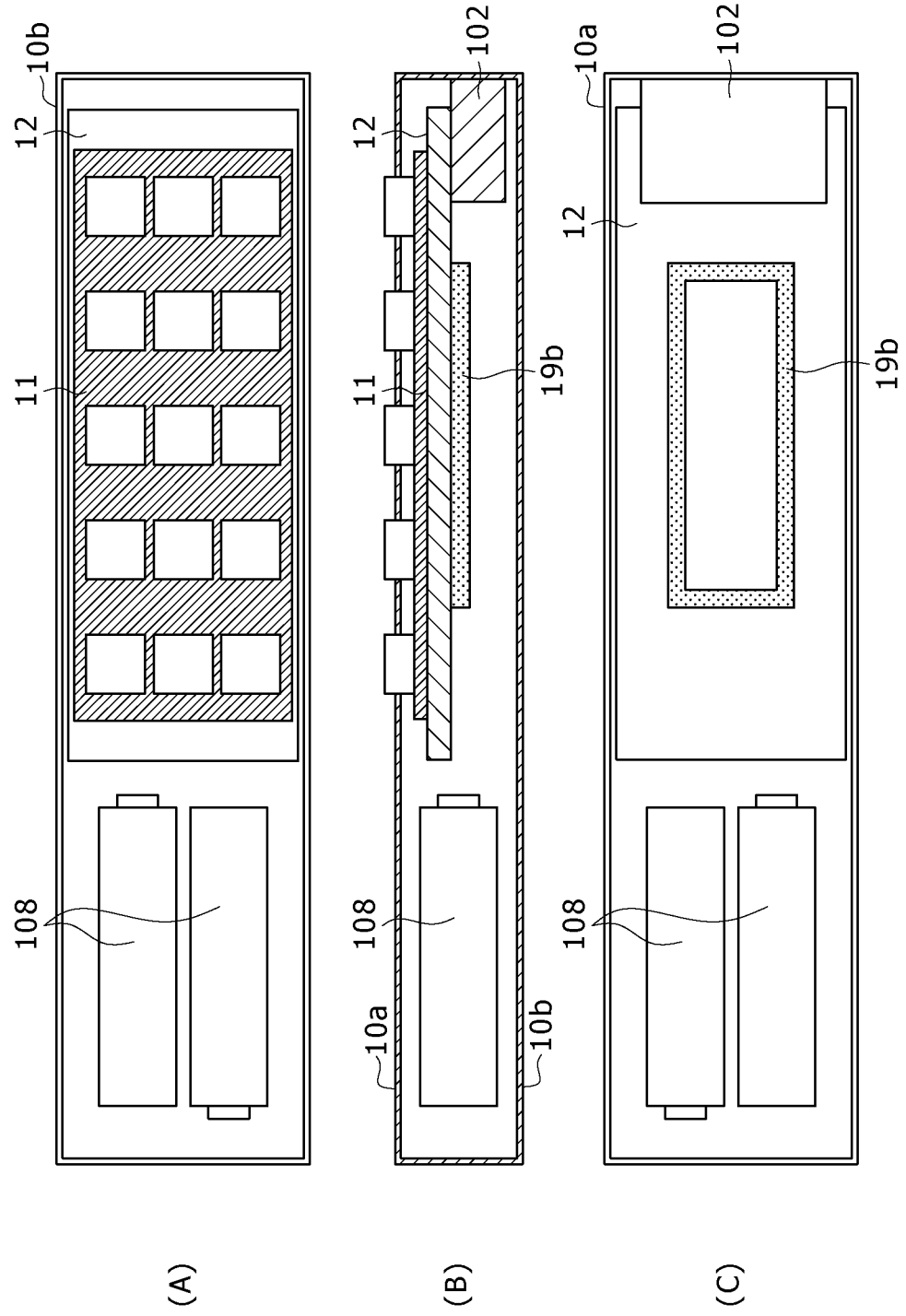
FIG. 8 is a schematic view showing an internal configuration of another remote control apparatus to which an embodiment of the present invention is applied: (A) is an orthogonally projected view from the front face side, (B) is a schematic sectional view and (C) is a schematic orthogonally projected view from the rear face side, respectively.

It is to be noted that the loop antenna may otherwise be formed like a loop antenna 19b shown in FIG. 8. FIG. 8 shows an internal configuration of the remote controller 100 according to another embodiment of the present invention, and particularly (A) of FIG. 8 shows a view of the remote controller 100 orthogonally projected from the front face side with the front face cover 10a removed; (B) of FIG. 8 shows a schematic section of the remote controller 100; and (C) of FIG. 8 shows the remote controller 100 orthogonally projected from the rear face side with the rear face cover 10b removed. More particularly, in the remote controller 100 of the present embodiment, a double-sided board having operation keys arrayed on a front face thereof has the loop antenna 19b formed in a pattern on a rear face thereof. The loop antenna 19b forms the card reading section 20, and the operation keys are disposed such that, when they are orthogonally projected from above in the front direction of the remote controller 100, at least one of them overlaps with the card reading section 20. In this instance, the card reading section 20 is formed on the rear face side, that is, on the rear face cover 10b side, of the remote controller 100, and if the user positions the card reading section 20 on the rear face side of the remote controller 100 with respect to the IC card, reading out and writing of information from and into the IC card are carried out by the reader/writer 106.

Further, if the material and arrangement or wiring of parts on the board 12 are taken into consideration, then reading out and writing of information from and into the IC card can be carried out also from the front face side of the remote controller 100.

By disposing the double-sided board formed from the board 12 on which the operation keys are arrayed and which has the loop antenna 19b formed in a pattern on the rear face thereof in the housing 10 of the remote controller 100 and disposing the operation keys such that at least one of the operation keys and the card reading section 20 overlap with each other in such a manner as described above, the front face of the remote controller 100 can be utilized effectively and a sufficient number of keys and the card reading section 20 can be provided without decreasing the number of operation keys. Further, the user can operate the remote controller 100 by positioning the card reading section 20 on the rear face side of the remote controller 100 with respect to the IC card. Consequently, not all of the operation keys provided on the front face of the remote controller 100 are hidden by the IC card, and also operations necessary upon reading out and writing of the IC card can be carried out simply. It is to be noted that the loop antenna may be formed on a separate board and disposed in multi-layers with a board on which the operation keys are arrayed. Further, not a pattern may be formed as the loop antenna, but the loop antenna may be formed from a lead wire which is provided on the rear face of the board for the operation keys.

In this instance, if the battery which forms the battery and power supply section 108 is disposed in a spaced relationship from the loop antenna at a position different from the board at which the battery does not overlap with the board when it is orthogonally projected from above in the front direction of the remote controller 100, then the influence of a metal portion of the battery on the loop antenna can be reduced.

Now, a reading out/writing operation of information from and into the IC card in the remote controller 100 including the reader/writer 106 by the user is described taking a case wherein a content of a movie, an animation, a drama, a sports game, a playing game and so forth is purchased from a service provider of the Internet as an example.

When the user intends to purchase a content of a movie, an animation or the like from a service provider of the Internet, the user would carry out necessary operations for the remote controller 100 while observing a table of contents or an operation screen image displayed on the television receiver 200. In particular, the user would operate a selection key 14 such as, for example, the direction key 14a having the "←," "↑," "→" and "↓" marks indicated thereon, to select a content to be purchased and then depress the determination key 14b to determine the purchase. Then, when the user determines a method of payment for the content using an IC card and tries to pay the price, the reader/writer 106 of the remote controller 100 carries out a reading out process of information stored in the IC card and a writing operation of information into the IC card. Thereupon, the user would carry out the operations by holding up the IC card over the card reading section 20 provided on the remote controller 100.

In this manner, the user would carry out a purchasing operation of a content by operating the selection keys 14 while holding up the IC card over the card reading section 20 of the remote controller 100.

The information read out from the IC card is sent to the television receiver 200 through the RF transmission/reception section 102 and the antenna 101 and is then sent from the television receiver 200 to the server through the Internet. The CPU 203 of the television receiver 200 receives a reply from the server and sends the information from the server to the remote controller 100 by the short-distance radio communication, and the CPU 103 of the remote controller 100 carries out reading out and writing of the information from and into the IC card. Then, the processes described above are repeated several times until the content purchasing process is completed.

Conventionally, in such a purchasing procedure of a content of a movie or the like distributed through the Internet as described above, the user operates an IC card so as to be positioned in the proximity of a card reading/writing section of a reader/writer provided on a television receiver or a reader/writer connected to a television receiver by a USB (Universal Serial Bus) or the like to carry out reading of information stored in the IC card and so forth. Therefore, although channel control or the like of the television receiver can be carried out by an operation of the remote controller at a remote place, when reading out and writing of information from and into the IC card become required in a purchasing procedure of a content or the like, the IC card must be moved to an installation place of the television receiver and operated there.

In the remote controller 100 of the embodiment described hereinabove with reference to FIG. 2, since the reader/writer 106 for reading out and writing of information from and into the IC card is provided in the inside of the remote controller 100, the user can carry out operations for reading out and writing processes of information from and into the IC card by the reader/writer 106 by holding up the IC card over the card reading section 20 of the remote controller 100 by hand similarly to operations for switching on/off of the power supply, channel selection and so forth of the television receiver 200. Consequently, simpler and agreeable user operations can be implemented.

Further, since the remote controller 100 is configured such that the numeral keys 18a to 18l having the indications of the numbers of "1" to "12" are disposed at a place same as that of the board on the inner side of the location at which the loop antenna 19 is formed, that is, at the same place as that of the card reading section 20 for executing reading out and writing processes of information from and into the IC card, when the IC card is held up over the card reading section 20 upon reading and writing of the IC card upon electronic settlement or the like, the numeral keys 18a to 18l are hidden by the IC card. As described hereinabove, upon reading out and writing of information from and into the IC card, the user would principally use the direction key 14*a* for selecting a content or the like, the determination key 14*b* for determining purchase of the content and so forth from among the operation keys of the remote controller 100 to carry out an accounting procedure. Accordingly, upon reading out and writing of information from and into the IC card, the frequency in which the numeral keys 18*a* to 18*l* which are hidden by the IC card when the IC card is held up are used is low, and such a situation that the operation of the remote controller 100 becomes inconvenient is eliminated.

In this manner, in the remote controller 100 according to the present embodiment, even where the numeral keys 18*a* to 18*l* are disposed on the inner side of the location at which the loop antenna 19 of the reader/writer 106 is formed, the operation keys necessary upon reading out and writing of information from and into the IC card can be operated freely. In particular, since the operation keys which are necessary upon reading out and writing of information from and into the IC card by the reader/writer 106 such as the direction key 14*a* and so forth are disposed at a position at which they are not hidden by the IC card even if the IC card is held up over the card reading section 20, the convenience in use by the user is not deteriorated.

On the other hand, when, for example, content purchase price setting, purchase quantity setting or like setting is carried out upon reading out and writing of information from and into the IC card, it may become necessary to operate the numeral keys 18*a* to 18*l* which are hidden by the IC card when the IC card is held up over the card reading section 20. In such an instance as just described, if the user moves the IC card away from the card reading section 20 to stop the positioning of the IC card in the proximity of the card reading section 20 and then tries to depress the numeral keys 18*a* to 18*l* then the magnetic field generated from the loop antenna 19 becomes ineffective upon the IC card, and the reading out and writing of information from and into the IC card by the reader/writer 106 are not carried out regularly any more. This may give rise to an unexpected trouble in the reading out and writing processes of information from and into the IC card in which electronic money information and so forth are stored.

Therefore, upon reading out and writing of information from and into the IC card by the reader/writer 106, the CPU 103 of the remote controller 100 controls the operation keys disposed on the remote controller 100 so as to alter the functions allocated to them so that the user can carry out all operations necessary upon reading out and writing of information from and into the IC card using the alternative keys having the altered functions.

In particular, when the CPU 103 of the remote controller 100 recognizes upon reading out and writing of information from and into the IC card that the reader/writer 106 is placed into an on state, for example, the "+"/"−" key portions of the up/down channel selection key 15 are automatically allocated to different functions of increasing/decreasing the amount of money while the "+"/"−" key portions of the sound volume adjustment key 16 are automatically allocated to functions of operating increasing/decreasing of the quantity of goods to be purchased. Then, if the CPU 103 recognizes that the reader/writer 106 is placed into an off state, then it controls the operation keys to cancel the changed functions of them so that the operation keys may thereafter carry out the respective operation functions. Consequently, even if the numeral keys 18*a* to 18*l* which are hidden by the IC card when the IC card is held up over the card reading section 20 are not operated, it is possible, for example, to set the amount of money for purchase or set the quantity of items to be purchased by operating the operation keys which are not hidden by the IC card and have the respectively altered functions.

Since the remote controller 100 controls so that the functions of the operation keys are changed upon reading out and writing of information from and into the IC card by the reader/writer 106, the functions of those operation keys whose operation is disabled by the IC card when the IC card is held up over the card reading section 20 can be executed by the alternative keys. Further, since the changing process of the operation key functions is automatically decided and executed by the CPU 103 of the remote controller 100, the operation process can be operated simply without imposing a cumbersome operation such as to use a mode key to change over the functions or to depress, while a shift key is depressed, an operation key simultaneously to change the function of the operation key upon the user.

Since the remote controller 100 can communicate with the television receiver 200 by bidirectional radio communication, when the function of an operation key is altered in such a manner as described above, upon reading out and writing of information from and into the IC card by the reader/writer 106, for example, the CPU 103 of the remote controller 100 may carry out such control as to send a command for displaying a guidance for guiding an operation method of the remote controller 100 as a screen image to the television receiver 200. This makes it possible for the user to carry out operations in accordance with the guidance by simple operations, and the user can eliminate such labor as to confirm an operation key whose function is altered while referring to an instruction manual.

Further, the remote controller 100 may include an LED which indicates, upon reading out and writing of information from and into the IC card, that the function of an operation key is altered. In this instance, since the function of the operation key may be changed over at a timing same as that of turning on or off of the reader/writer 106, if the CPU 103 of the remote controller 100 detects turning on or off of the reader/writer 106, then turning on or off of the LED can be controlled. Further, the turning on indication of the LED may serve also as an indication representing that the reader/writer 106 is operating.

Furthermore, since the remote controller 100 can communicate with the television receiver 200 by bidirectional radio communication and besides can grasp also turning on and off of the reader/writer 106, the changed over state of the operation key may be displayed on the screen of the television receiver 200.

Now, a data format of transfer data communicated by short-distance radio communication using an RF signal between a remote controller and a device which is controlled from the remote controller and may be an electric apparatus such as a television receiver is described.

Between the television receiver 200 and the remote controller 100 described hereinabove with reference to FIGS. 1 to 3, the communication method in an ordinary remote controller operation and the communication method in transfer of information to and from the IC card are the same. For example, short-distance radio communication which uses an RF signal of the carrier frequency of 2.4 GHz by the IEEE 802.15.4 communication method. Further, between the television receiver 200 and the remote controller 100, such data are transmitted and received using packets of the same format.

More particularly, remote controller data, remote controller controlling commands and reader/writer commands are transmitted through packets of the same format. Here, the remote controller data are command data, that is, operation instructions to an electric apparatus, transmitted by the remote controller 100 and received by the television receiver 200 which is a device to be operated from the remote controller. The remote controller controlling commands are commands, that is, control commands to a remote controlling apparatus, used for setting, confirmation and so forth of a reader/writer function which the remote controller 100 has, and are data transferred by both of the remote controller 100 and the television receiver 200 as well as data reply data to which commands are transferred by both of the remote controller 100 and the television receiver 200. The reader/writer commands are data transmitted from the television receiver 200, which is a device to be operated from the remote controller 100, and received by the remote controller 100, and reply data to the commands are transmitted from the remote controller 100 and received by the television receiver 200 which is operated from the remote controller 100. The reader/writer commands are command data for transmitting and receiving information to be written into and read out from an information recording medium such as an IC card which utilizes such RFID as described hereinabove where information is read out and written into the information recording medium.

In particular, the remote controller 100 sends remote controller data, remote controller controlling commands and reply data to such commands, and reply data to the reader/writer commands and receives remote controller controlling commands and reader/writer commands. The television receiver 200 which is a control target device to be controlled from the remote controller transmits remote controller controlling commands and reply data to them and reader/writer commands, and receives remote controller data, remote controller controlling commands and reply data to them, and reply data to reader/writer commands.

Here, the reader/writer command generally has a great data length and may possibly become longer than the length of a packet which can be transmitted at a time by RF communication. Therefore, transmission/reception of the reader/writer command is carried out using a format which allows division of a packet and merging of packets. Where division or merging is carried out, the data relating to the division to be placed into the RF communication header or the command header is only data which indicates whether or not the data is the last of division. As regards a reader/writer command, since retransmission is not carried out, there is no possibility that replacement of an order number may occur, and there is no necessity to carry out such management as to apply a packet ID. Further, where a parity is included in the reader/writer communication footer, even if data miss occurs during division, such data fault can be confirmed, and therefore, data transmission which eliminates complicated processing and surplus data transfer can be achieved.

Figure 9:
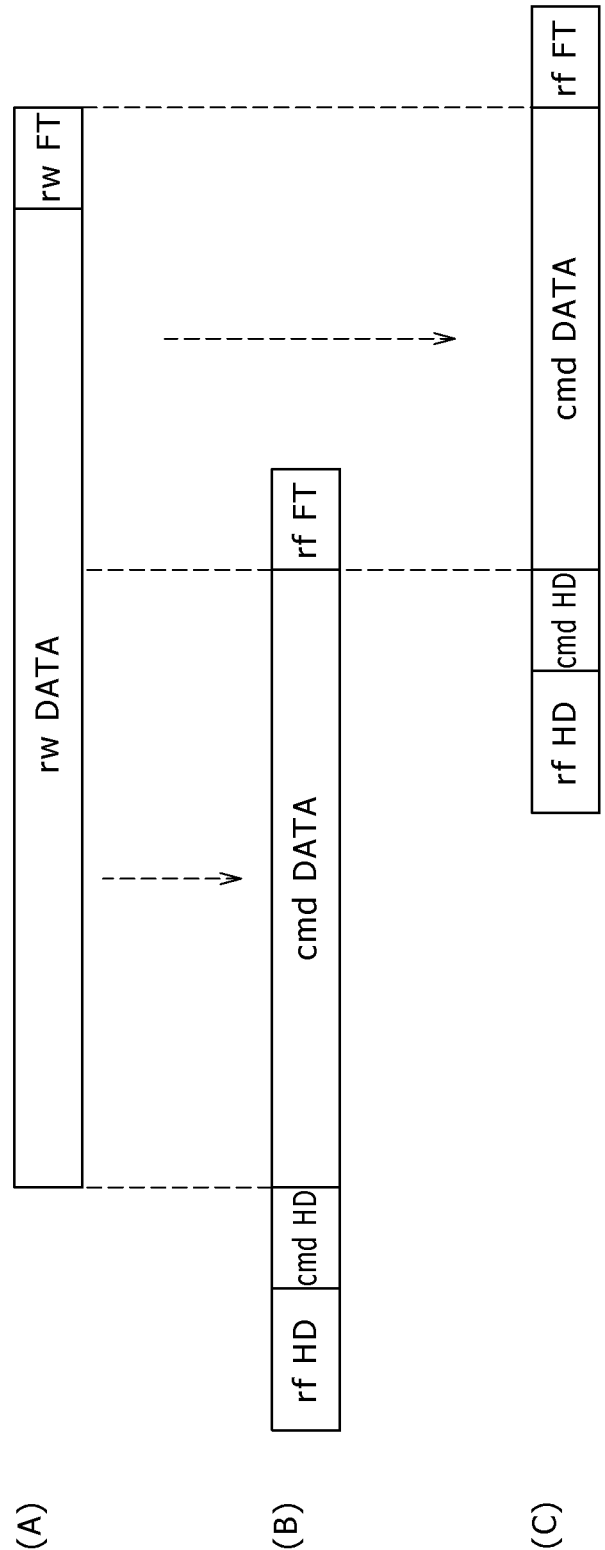
FIG. 9 is diagrammatic views illustrating an example of a format of a packet transferred in the communication system according to the embodiment.

In the example of FIG. 9, it can be seen that the total length of the reader/writer command data rwDATA and the reader/writer communication footer rwFT (parity for an error check and so forth) illustrated in (A) is longer than the length of the command data cmdDATA in the packet for RF communication illustrated in (B) and (C). In particular, in the example of FIG. 9, the reader/writer command data rwDATA and the reader/writer communication footer rwFT illustrated in (A) are divided into two parts, which are placed into the command data cmdDATA in two packets for RF communication illustrated in (B) and (C).

The remote controller and the device which is controlled by the remote controller in the present embodiment do not retransmit a remote controller controlling command. This is because, since it is not appropriate to use a communication path which provides unstable communication to enforce accessing for card settlement of accounts or the like for which the security is required and besides, where the communication is unstable, it is appropriate to notify the user of the reader/writer function from the beginning that the communication is unstable, it is not advantageous to rescue a remote controller controlling command by retransmission.

Further, the remote controller according to the present embodiment does not carry out retransmission management of a reader/writer command. Since a reader/writer command is generally greater than remote controller data, complicated buffer management for retransmission and memory compression by packet management based on an ID are avoided. Further, a reader/writer command has a determined directionality, and since the reader/writer command to be transmitted from the remote controller is limited only to reply data, the necessity for retransmission is low. Further, when the communication state becomes worse, since there is the possibility that retransmission of the reader/writer command from the remote controller overlaps with retransmission of a command from the device which is controlled by the remote controller which is the transmission side of a command and has a high allowance in its memory, the management can be prevented from being complicated.

Figure 10:
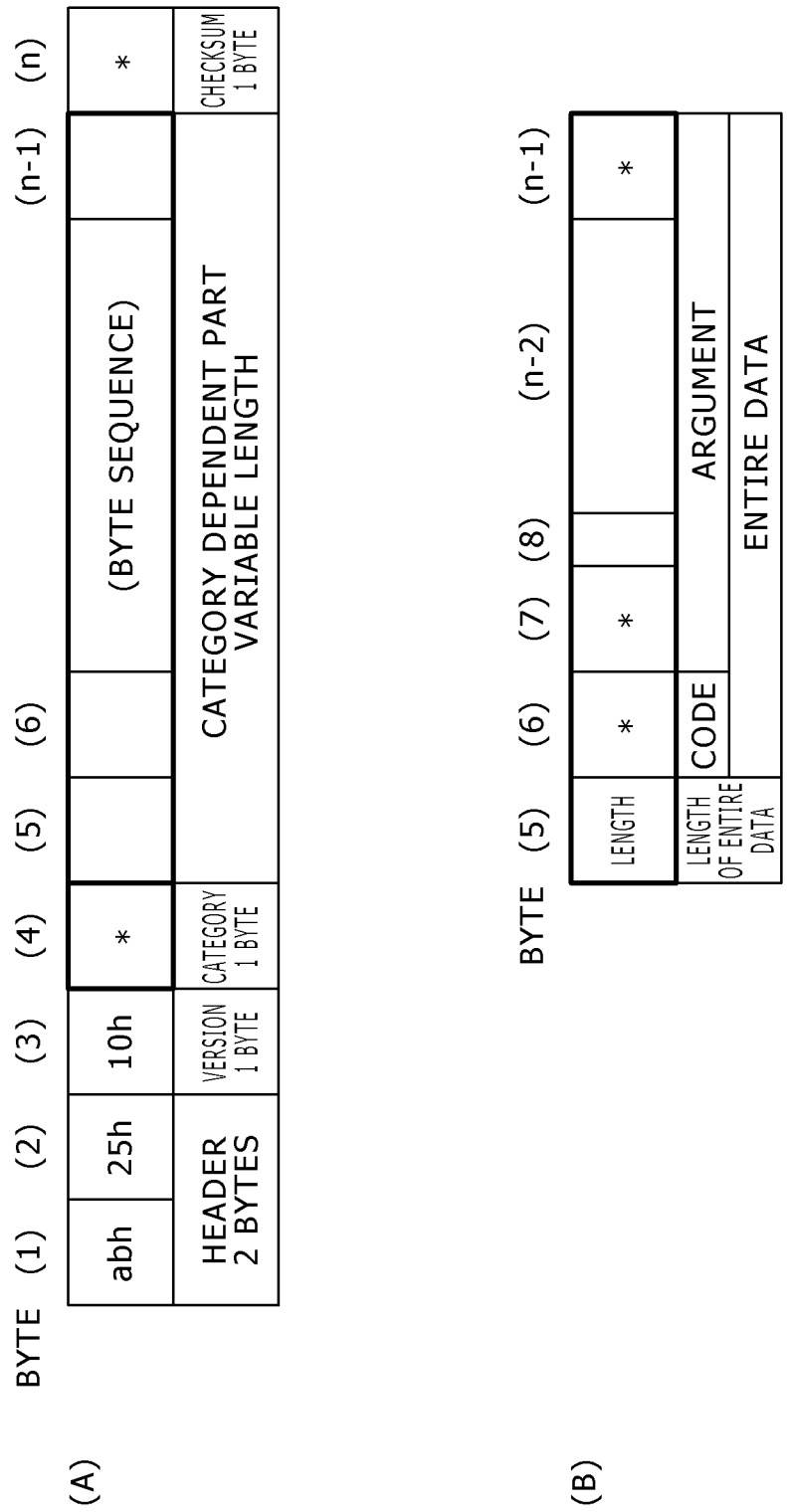
FIG. 10 is diagrammatic views illustrating an example of a format of a packet transferred within the television receiver according to the embodiment.

Now, a particular example of the data format for packet transmission described above is described with reference to FIGS. 10 and 11. FIG. 10 illustrates an example of the data format of signals transferred between the set CPU 205 and the remote controller controlling CPU 203 in the television receiver 200 which is a device to be controlled by the remote controller. Meanwhile, FIG. 11 illustrates an example of the data format of signals transferred between the remote controller controlling CPU 203 in the television receiver 200 and the CPU 103 in the remote controller 100.

(A) of FIG. 10 illustrates a particular example of the data format of a packet itself transferred between the set CPU 205 and the remote controller controlling CPU 203 in the television receiver 200. Of the packet illustrated in (A) of FIG. 10, two bytes from the top are used for the header, and one byte next to the two bytes is used for the version. In the example described, the header always is "abh, 25h" (h represents a hexadecimal number), and while the version is "10h," the version is not limited to this. The fourth byte from the top of the packet of (A) of FIG. 10 represents the category, and when it is "e4h," it represents a command from the set CPU 205 to the remote controller controlling CPU 203, but when it is "e5h," it represents a response from the remote controller controlling CPU 203 to the set CPU 205. The fifth to (n−1)th bytes are determined in response to the category, and the byte number or length is variable. The fifth to (n−1)th bytes are illustrated in (B) of FIG. 10. The last or nth byte of the packet of (A) of FIG. 10 is a check sum (parity) of the data from the first to (n−1)th bytes of the packet.

(B) of FIG. 10 illustrates the fifth to (n−1)th bytes extracted from the packet of (A) of FIG. 10. Referring to (B) of FIG. 10, the top byte (fifth byte of the original packet) illustrated represents the length, that is, the data length, from the 6th to (n−1)th bytes of the packet and can represent 01h (1 byte) to FFh (255 bytes). The next byte (sixth byte of the original packet) is a code representative of a data category, and the succeeding data, that is, the 7th byte to the (n−1)th byte of the original packet, are data of the data category. The data category may be reader/writer command data, remote controller controlling command data or the like. It is to be noted that the 7th to (n−1)th bytes of the packet of (A) of FIG. 10 correspond to the reader/writer command data rwDATA and the reader/writer communication footer rwFT described hereinabove with reference to FIG. 9.

(A) of FIG. 11 illustrates a particular example of the data format of a main portion of a packet transferred between the remote controller controlling CPU 203 of the television receiver 200 and the CPU 103 of the remote controller 100, and (B) of FIG. 11 illustrates the sixth to last mth bytes extracted from the packet of (A) of FIG. 11.

The first to sixth bytes of the packet illustrated in (A) of FIG. 11 are used as header information, and for example, the fourth byte represents control data representing the continuity and so forth of the packet. The fifth byte represents the data length from the succeeding sixth byte to the mth byte, and the sixth byte represents a code indicative of a data category. For example, the control data of the fourth byte may represent, when it is "21h," that a following packet exists, but when it is "22h," that the packet is the last packet, that is, that no following packet exists. The information of the data length of the fifth byte can represent 01h (1 byte) to 62h (98 bytes), and the maximum data length is smaller than 255 bytes which are a maximum length of the packet illustrated in (A) of FIG. 10. Therefore, when the data length from the sixth byte to the (m−1)th byte of the packet of (A) of FIG. 10 exceeds 98 bytes, the packet is divided and distributed into a plurality of packets having the format illustrated in (A) of FIG. 11. The information of the data category of the sixth byte of the packet illustrated in (A) of FIG. 11 may be a copy of the sixth byte of the packet of (A) of FIG. 10. It is to be noted that the command data cmdDATA of FIG. 9 corresponds to data from the seventh byte to the mth byte of the packet of (A) of FIG. 11, and the portion from the first byte to the sixth byte of the packet corresponds to the command header cmdHD illustrated in FIG. 9.

(B) of FIG. 11 illustrates the sixth byte to the last mth byte extracted from the packet of (A) of FIG. 11. Referring to (B) of FIG. 11, the top byte illustrated, that is, the sixth byte of the original packet of (A) of FIG. 11, represents a data category. The one byte of the data category is allocated, for example, with the higher order 4 bits thereof, to a command code representative of a type of a command such as a remote controller controlling command, a reader/writer command or data for a remote controller, and with the lower order 4 bits thereof, to such a remote controller ID for identifying a remote controller as hereinafter described. If the data category represents that the succeeding data represents a remote controller controlling command, then the next byte, that is, the seventh byte of the original packet, represents a type of the command. The type of the command in this instance may be such a remote controller confirmation command, a remote controller power confirmation command, an on-state continuation command, or the like.

Therefore, in the present embodiment, a plurality of different remote controllers can be used for a device which is controlled from a remote controller, such as, for example, for a television receiver, and in order to identify the remote controllers, apparatus identification information, that is, a remote controller ID, is added to the commands described hereinabove. In particular, for example, part of the lower order 4 bits of the sixth byte, that is, the data command, of the packet illustrated in (A) of FIG. 11, is used. The apparatus identification information is allocated separately from a unique ID of each remote controller and is at least added to and transferred together with a command to the reader/writer. The apparatus identification information may be allocated, for example, when a television receiver communicates with a remote controller after mutual authentication, that is, pairing, between the television receiver and the remote controller.

Popular infrared remote controllers are in most cases configured such that, only when a button or the like is operated, the power supply is made available and a command is transmitted as an infrared signal to a control object apparatus such as a television receiver and, after the transmission comes to an end, the power supply is interrupted. However, in such an RF communication remote controller as in the present embodiment, it is necessary for the power supply to be normally available in order to receive transmission data from the television receiver. However, where the power supply is normally kept in an on state, the power consumption increases, and therefore, appropriate power saving control is required. In this regard, not only power saving control of the remote controller itself is significant, but where the remote controller has a reader/writer, power saving control of the reader/writer is significant because the reader/writer exhibits particularly high power consumption.

In the following, allocation of apparatus identification information where a plurality of remote controllers are used for a device such as a television receiver which is controlled by a remote controller is described. Then, power saving control of a remote controller itself is described, whereafter power saving control of a reader/writer where a remote controller includes the reader/writer is described.

Figure 12:
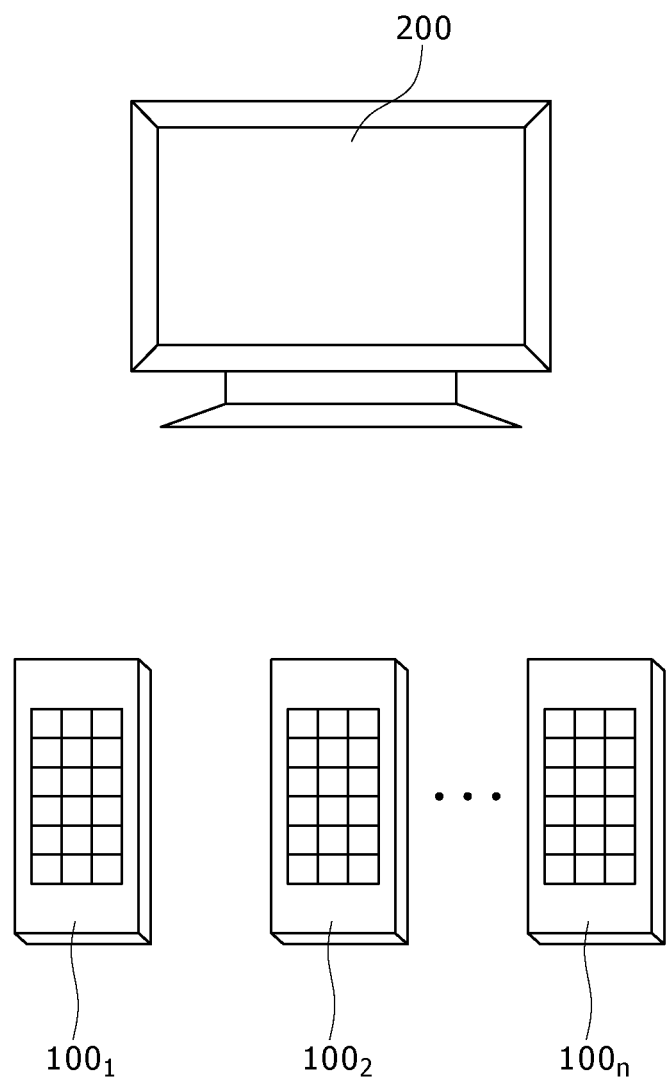
FIG. 12 is a schematic view showing a configuration of another communication system to which the embodiment is applied.

FIG. 12 illustrates another communication system 1 to which an embodiment is applied. Referring to FIG. 12, the communication system 1 includes a television receiver 200 and a plurality of remote controllers $100_1, 100_2, \ldots, 100_n$ which carry out short-distance radio communication with the television receiver 200 using an RF signal of a carrier frequency of 2.4 GHz in accordance with the IEEE 802.15.4 communication method described hereinabove. It is to be noted that the remote controllers $100_1, 100_2, \ldots, 100_n$ have a configuration same as that of the remote controller 100 described hereinabove, and like components of the remote controllers $100_1, 100_2, \ldots, 100_n$ to those of the remote controller 100 are denoted by like reference characters to which corresponding suffixes are added, for example, like CPUs $103_1, 103_2, \ldots, 103_n$ corresponding to the CPU 103 of the remote controller 100. However, the configuration of the remote controllers $100_1, 100_2, \ldots, 100_n$ is not limited to this, but they may have a different configuration which does not include, for example, a reader/writer.

In this instance, in order to recognize the remote controllers $100_1, 100_2, \ldots, 100_n$ individually, the communication system 1 carries out a process of allocating an ID or apparatus identification information to each of the remote controllers $100_1, 100_2, \ldots, 100_n$.

Figure 13:
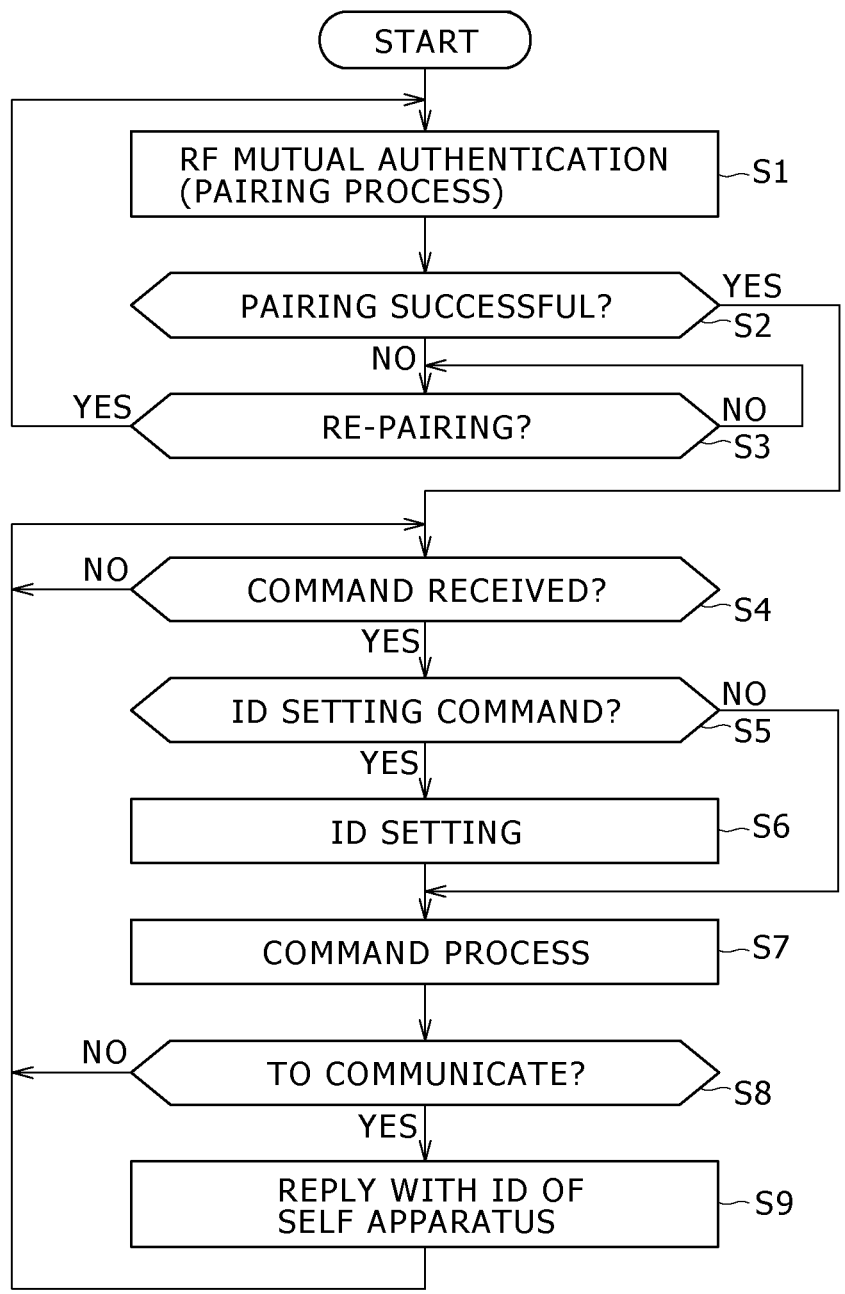
FIG. 13 is a flow chart illustrating processing operation of a remote control apparatus according to the embodiment.
Figure 14:
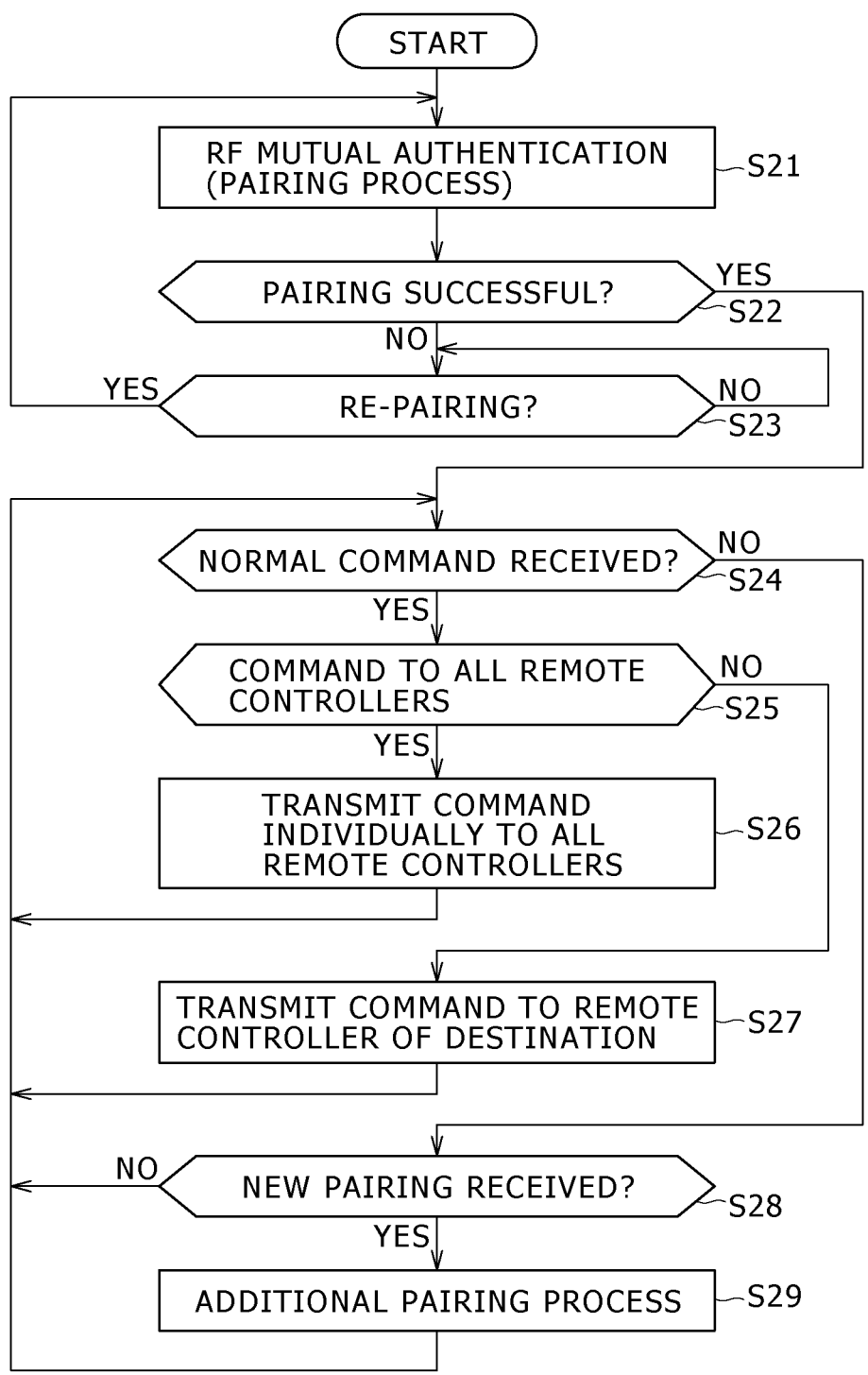
FIG. 14 is a flow chart illustrating processing operation of a television receiver according to the embodiment.
Figure 15:
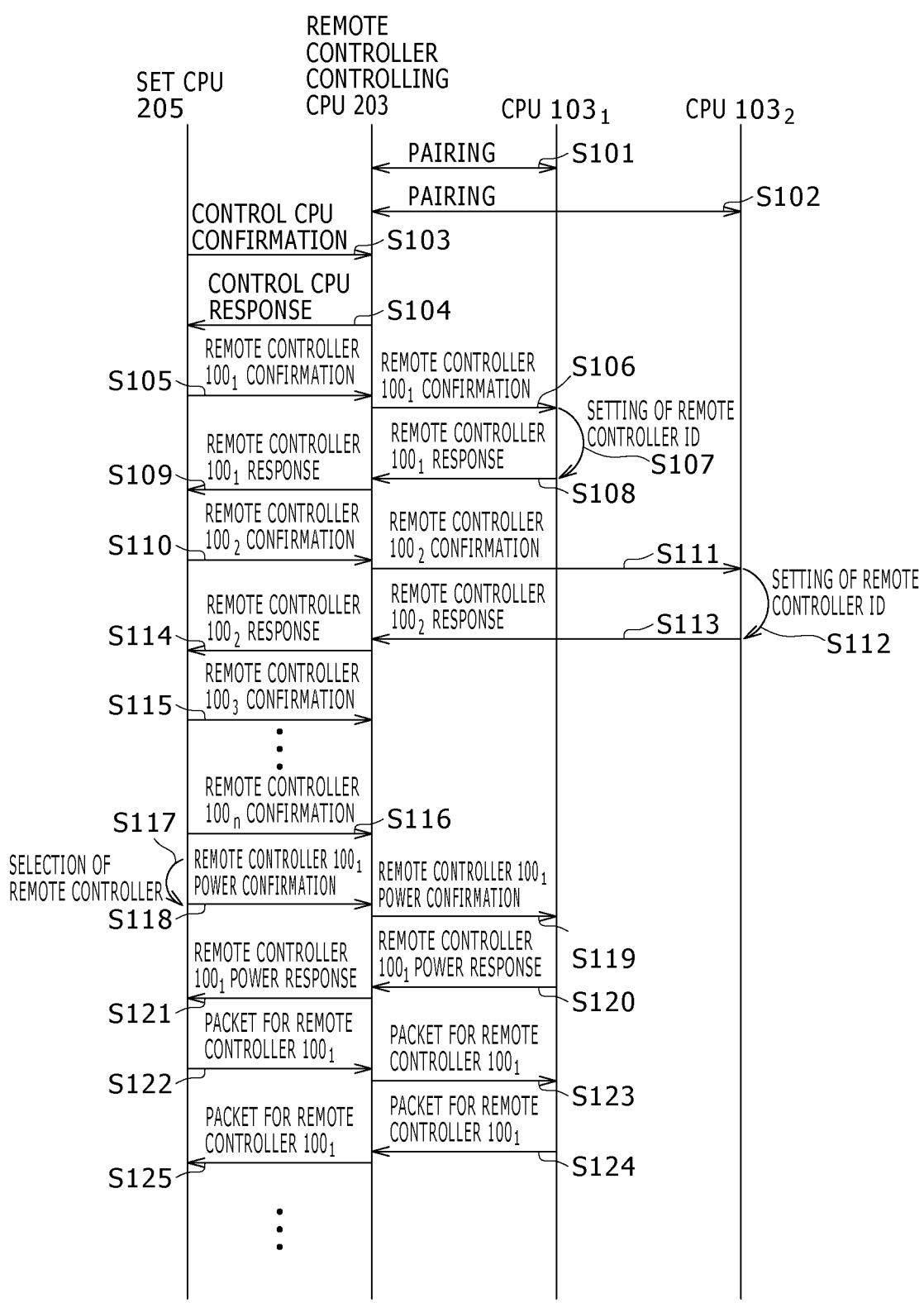
FIG. 15 is a sequence diagram illustrating data transfer carried out by the remote control apparatus and the television receiver according to the embodiment.
Figure 16:
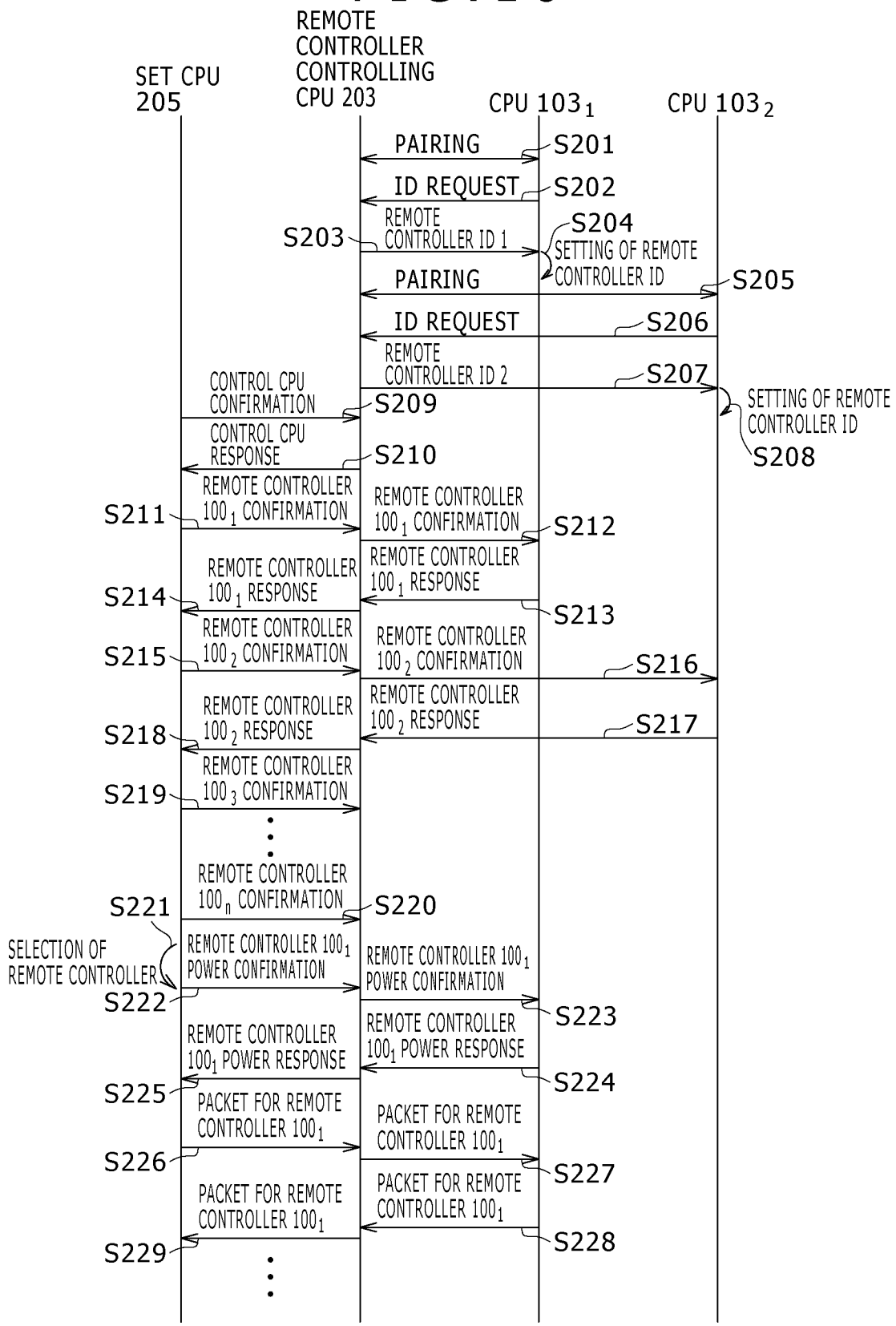
FIG. 16 is a sequence diagram illustrating data transfer carried out by the remote control apparatus and the television receiver according to the embodiment.

In the following, processing operation of an ID setting operation for allocating an ID to each of the remote controllers $100_1, 100_2, \ldots, 100_n$ in the communication system 1 is described. In the ID setting process, the remote controllers $100_1, 100_2, \ldots, 100_n$ carry out such processing operations as illustrated in FIG. 13, and the television receiver 200 carries out such processing operations as illustrated in FIG. 14. Further, the television receiver 200 and the remote controllers $100_1, 100_2, \ldots, 100_n$ carry out such data transfer as illustrated in FIGS. 15 and 16.

In the ID setting process, when the power supply to any of the remote controllers $100_1, 100_2, \ldots, 100_n$ is made available, particularly when a battery is mounted, the remote controller and an electric apparatus such as a television receiver which is a device to be controlled from the remote controller carry out mutual authentication. The mutual authentication may otherwise be executed at an arbitrary timing by the user.

Referring to FIGS. 13 and 14, any of the CPU $103_1$ of the remote controller $100_1$, the CPU $103_2$ of the remote controller $100_2$, ..., and the CPU $103_n$ of the remote controller $100_n$ and the remote controller controlling CPU 203 of the television receiver 200 start, at step S1 and step S21, respectively, mutual authentication for short-distance radio communication using an RF signal of the carrier frequency of 2.4 GHz in accordance with the IEEE 802.15.4 communication method. In particular, any of the CPU $103_1$ of the remote controller $100_1$, the CPU $103_2$ of the remote controller $100_2$, ..., and the CPU $103_n$ of the remote controller $100_n$ and the remote controller controlling CPU 203 of the television receiver 200 transfer a unique ID formed, for example, from a MAC ID, an IP (Internet Protocol) address or the like owned thereby and added to a packet for a command for mutual authentication at steps S1 and S21, respectively.

At steps S2 and S22, any of the CPU $103_1$ of the remote controller $100_1$, the CPU $103_2$ of the remote controller $100_2$, ..., and the CPU $103_n$ of the remote controller $100_n$ and the remote controller controlling CPU 203 of the television receiver 200 decide whether or not the unique ID of the opposite party is received to recognize the opposite party. If the opposite party is recognized, then it is decided that the mutual authentication results in success, and the processing individually advances to steps S4 and S24. On the other hand, if it is decided at step S2 that any of the CPU $103_1$ of the remote controller $100_1$, the CPU $103_2$ of the remote controller $100_2$, ..., and the CPU $103_n$ of the remote controller $100_n$ cannot receive a unique ID from the television receiver 200 and fails in mutual authentication, then the processing advances to step S3. Meanwhile, if the remote controller controlling CPU 203 of the television receiver 200 fails to receive a unique ID from any of the remote controllers $100_1$, $100_2$, ..., $100_n$ and fails in mutual authentication at step S22, then the processing advances to step S23.

At step S3, the CPU of that one of the remote controllers $100_1$, $100_2$, ..., $100_n$ from which the television receiver 200 fails to receive the unique ID decides whether or not it should carry out mutual authentication with the television receiver 200 again. Then, if mutual authentication should be carried out again, then the processing returns to step S1.

At step S23, the remote controller controlling CPU 203 of the television receiver 200 decides whether or not mutual authentication should be carried out again. If mutual authentication should be carried out again, then the processing returns to step S21. It is to be noted that any remote controller which has information of an electric apparatus with which mutual authentication has been carried out successfully when the power supply thereto is made available omits the processes at steps S1 to S3. Similarly, where the television receiver 200 has information of a remote controller, with which mutual authentication has been carried out successfully, stored in the memory thereof, it omits the processes at steps S21 to S23.

The remote controller controlling CPU 203 of the television receiver 200 produces a table not shown, for example, in a region of the memory 204, and sets simplified apparatus identification information beginning with, for example, 0 for identifying a remote controller with which mutual authentication results in success to the remote controller. Consequently, the CPU 103 can manage the set apparatus identification information in an associated relationship with the unique ID of the remote controller.

At step S24, the remote controller controlling CPU 203 of the television receiver 200 decides whether or not some command (normal command) is received from the set CPU 205 or the like. If it is decided that some command is received, then the processing advances to step S25, but if it is decided that no command is received, then the processing advances to step S28. Here, as an example of the command in the setting process of apparatus identification information, an apparatus identification information setting command, a command for remote controller confirmation prior to reading out or writing from or into the reader/writer of the remote controller or a like command may be used. For example, when a remote controller confirmation command is to be transmitted to a remote controller, simplified apparatus identification information, for example, beginning with 0 may be allocated to the remote controller where the remote controller is a mutually authenticated remote controller.

At step S25, the remote controller controlling CPU 203 of the television receiver 200 decides whether or not the received command is destined for all of the remote controllers $100_1$, $100_2$, ..., $100_n$. If it is decided that the command should be transmitted to all of the remote controllers $100_1$, $100_2$, ..., $100_n$, then the processing advances to step S26. On the other hand, if it is decided that the command should be transmitted to some of the remote controllers $100_1$, $100_2$, ..., $100_n$, then the processing advances to step S27.

At step S26, the remote controller controlling CPU 203 of the television receiver 200 transmits the command in order to all of the remote controllers $100_1$, $100_2$, ..., $100_n$, whereafter the processing returns to step S24.

At step S27, the remote controller controlling CPU 203 of the television receiver 200 transmits the command to a remote controller or controllers of a particular destination or destinations, thereafter the processing returns to step S24.

In the present embodiment, at step S26 or S27, the remote controller controlling CPU 203 may transmit the command with the simplified apparatus identification information added thereto to the pertaining remote controllers.

At step S4, any of the CPU $103_1$ of the remote controller $100_1$, the CPU $103_2$ of the remote controller $100_2$, ..., and the CPU $103_n$ of the remote controller $100_n$ decides whether or not a command is received from the television receiver 200. If it is decided at step S4 that any of the CPU $103_1$ of the remote controller $100_1$, the CPU $103_2$ of the remote controller $100_2$, ..., and the CPU $103_n$ of the remote controller $100_n$ receives a command from the television receiver 200, then the processing advances to step S5. However, if it is decided that no command is received from the television receiver 200, then the process at step S4 is repeated.

At step S5, the CPU of that one of the remote controllers $100_1$, $100_2$, ..., $100_n$ which receives a command from the television receiver 200 decides whether or not the command received from the television receiver 200 is a command for ID setting. If it is decided that the received command is for an ID setting process, then the processing advances to step S6, but if it is decided that the received command is not for an ID setting process, then the processing advances to step S7. The command for ID setting has the above-described apparatus identification information added thereto.

At step S6, the CPU of that one of the remote controllers $100_1$, $100_2$, ..., $100_n$ which receives the command to which apparatus identification information is added from the television receiver 200 sets an ID to itself based on the command.

At step S7, the CPU of that one of the remote controllers $100_1$, $100_2$, ..., $100_n$ which receives the command to which the apparatus identification information is added from the television receiver 200 carries out data processing based on the received command.

At step S8, the CPU $103_1$ of the remote controller $100_1$ decides whether or not it is necessary to send a reply to the television receiver 200. If the CPU $103_1$ of the remote controller $100_1$ decides at step S8 that it is necessary to send a reply to the television receiver 200, then the processing advances to step S9, but if the CPU $103_1$ of the remote controller $100_1$ decides that it is not necessary to send a reply to the television receiver 200, then the processing returns to step S4.

At step S9, the CPU $103_1$ of the remote controller $100_1$ transmits the command with the apparatus identification information added thereto to the television receiver 200, whereafter the processing returns to step S4.

At step S28, the remote controller controlling CPU 203 of the television receiver 200 decides whether or not a command for carrying out mutual authentication is received. If it is decided that a command for carrying out mutual authentication is received newly, then the processing advances to step S29, but if it is decided that the command for carrying out mutual authentication is not received, then the processing returns to step S24.

At step S29, the remote controller controlling CPU 203 of the television receiver 200 carries out mutual authentication newly with the remote controller, and thereafter, the processing returns to step S24.

Further, in the present embodiment, the set CPU 205 may issue a command for requesting for reading out and writing of information from and into the reader/writer to the remote controller which includes the reader/writer in accordance with a program such that the remote controller controlling CPU 203 may receive the command. In this instance, upon starting of communication with the remote controller which includes the reader/writer, the remote controller controlling CPU 203 transmits a command for requesting for reading out and writing of information from and into the reader/writer to the remote controller at step S26 or S27. When the remote controller which includes the reader/writer receives the command for requesting for reading out and writing of information from and into the reader/writer, it adds the apparatus identification information allocated to the remote controller itself from the television receiver 200 and sends the resulting command to the television receiver 200. Consequently, it is possible for the television receiver 200 to distinctly use the reader/writer function of a plurality of remote controllers, that is, the remote controllers $100_1, 100_2, \ldots, 100_n$.

In the following, an example of the ID setting process carried out between the television receiver 200 and the remote controllers $100_1$ and $100_2$ is described in detail with reference to FIG. 15.

At step S101, the remote controller controlling CPU 203 of the television receiver 200 carries out mutual authentication with the CPU $103_1$ of the remote controller $100_1$. If the remote controller controlling CPU 203 receives a unique ID from the CPU $103_1$ at this step S101, then it sets simplified apparatus identification information different from the unique ID to the CPU $103_1$ and manages the simplified apparatus identification information in an associated relationship with the unique ID of the CPU $103_1$ using the table of the memory 204.

At step S102, the remote controller controlling CPU 203 of the television receiver 200 carries out mutual authentication with the CPU $103_2$ of the remote controller $100_2$. If the remote controller controlling CPU 203 receives a unique ID from the CPU $103_2$ at this step S102, then it sets simplified apparatus identification information different from the unique ID to the CPU $103_2$ and manages the simplified apparatus identification information in an associated relationship with the unique ID of the CPU $103_2$ using the table of the memory 204.

At step S103, the set CPU 205 of the television receiver 200 sends a command for confirming the remote controller controlling CPU 203, that is, a remote controller controlling CPU 203 confirmation command, to the remote controller controlling CPU 203.

At step S104, the remote controller controlling CPU 203 sends a response command for responding to the remote controller controlling CPU 203 confirmation command, that is, a remote controller controlling CPU 203 response command, to the set CPU 205.

At step S105, the set CPU 205 sends a command for confirming the CPU $103_1$, that is, a remote controller $100_1$ confirmation command, to the remote controller controlling CPU 203. For this confirmation command, for example, a function confirmation command for inquiring the remote controller $100_1$ above whether or not it has various functions such as a reader/writer function may be used.

At step S106, the remote controller controlling CPU 203 transmits the remote controller $100_1$ confirmation command added to the apparatus identification information of the remote controller $100_1$ to the CPU $103_1$ of the remote controller $100_1$.

At step S107, the CPU $103_1$ of the remote controller $100_1$ receives the remote controller $100_1$ confirmation command to which the apparatus identification information is added from the remote controller controlling CPU 203, and stores the apparatus identification information, for example, into the memory $104_1$ and carries out setting of apparatus identification information of the remote controller $100_1$ itself, that is, remote controller ID setting.

At step S108, the CPU $103_1$ sends a response command to the remote controller $100_1$ confirmation command, that is, a remote controller $100_1$ response command, to the remote controller controlling CPU 203 of the television receiver 200. The remote controller controlling CPU 203 adds the apparatus identification information of the remote controller $100_1$ added to the confirmation command sent from the remote controller controlling CPU 203 to the response command and sends the resulting information to the remote controller controlling CPU 203 of the television receiver 200. This response command may be, for example, a function response command which includes information regarding whether or not the remote controller $100_1$ has various functions such as the reader/writer function.

At step S109, the remote controller controlling CPU 203 sends the remote controller $100_1$ response command to the set CPU 205.

At step S110, the set CPU 205 sends a command for confirming the remote controller $100_2$, that is, a remote controller $100_2$ confirmation command, to the remote controller controlling CPU 203.

At step S111, the remote controller controlling CPU 203 sends the remote controller $100_2$ confirmation command to which the apparatus identification information of the remote controller $100_2$ is added to the CPU $103_2$ of the remote controller $100_2$.

At step S112, the CPU $103_2$ of the remote controller $100_2$ receives the remote controller $100_2$ confirmation command from the remote controller controlling CPU 203 and stores the apparatus identification information added to the remote controller $100_2$ confirmation command into the memory $104_2$ to set the apparatus identification information to the CPU $103_2$ itself.

At step S113, the CPU $103_2$ transmits a response command to the remote controller $100_2$ confirmation command, that is, a remote controller $100_2$ response command, to the remote controller controlling CPU 203 of the television receiver 200.

At step S114, the remote controller controlling CPU 203 transmits the remote controller $100_2$ response command to the set CPU 205.

At step S115, the set CPU 205 transmits a command for confirming the remote controller $100_3$, that is, a remote controller $100_3$ confirmation command, to the remote controller controlling CPU 203.

Similarly, at step S116, the set CPU 205 transmits a command for confirming the remote controller $100_n$, that is, a remote controller $100_n$ confirmation command, to the remote controller controlling CPU 203.

At step S117, the set CPU 205 of the television receiver 200 selects the remote controller $100_1$ from among the remote controllers $100_1$ to $100_n$.

At step S118, the set CPU 205 sends a command for confirming the power of the remote controller $100_1$, that is, a remote controller $100_1$ power confirmation command, to the remote controller controlling CPU 203.

At step S119, the remote controller controlling CPU 203 sends the remote controller $100_1$ power confirmation command to the CPU $103_1$ of the remote controller $100_1$.

At step S120, the CPU $103_1$ transmits a response command to the remote controller $100_1$ power confirmation command, that is, a remote controller $100_1$ power response command, to the remote controller controlling CPU 203 of the television receiver 200.

At step S121, the remote controller controlling CPU 203 sends the remote controller $100_1$ power response command to the set CPU 205.

At step S122, the set CPU 205 sends a data packet for the remote controller $100_1$, that is, a remote controller $100_1$ packet, to the remote controller controlling CPU 203.

At step S123, the remote controller controlling CPU 203 sends the remote controller $100_1$ packet for the remote controller $100_1$ to the CPU $103_1$ of the remote controller $100_1$.

At step S124, the CPU $103_1$ sends the remote controller $100_1$ packet to the remote controller controlling CPU 203.

At step S125, the remote controller controlling CPU 203 sends the remote controller $100_1$ packet to the set CPU 205.

It is to be noted that, in this ID setting process, different from the example described above, such command transfer as, for example, illustrated in FIG. 16, may be carried out instead.

Referring to FIG. 16, at step S201, the remote controller controlling CPU 203 of the television receiver 200 carries out mutual authentication with the CPU $103_1$ of the remote controller $100_1$. If the remote controller controlling CPU 203 receives a unique ID of the remote controller $100_1$ at step S201, then it sets the apparatus identification information described above to the remote controller $100_1$ and manages the apparatus identification information in an associated relationship with the unique ID of the remote controller $100_1$ using the table of the memory 204.

At step S202, the CPU $103_1$ of the remote controller $100_1$ issues a command for requesting the remote controller controlling CPU 203 of the television receiver 200 to set apparatus identification information to the remote controller $100_1$, that is, an ID request command, and sends the ID request command to the remote controller controlling CPU 203.

At step S203, the remote controller controlling CPU 203 of the television receiver 200 sends the ID request command to which the apparatus identification information set to the remote controller $100_1$ is added together with the unique ID of the remote controller $100_1$ to the CPU $103_1$ of the remote controller $100_1$.

At step S204, the CPU $103_1$ of the remote controller $100_1$ receives the ID request command to which the apparatus identification information and the unique ID are added from the remote controller controlling CPU 203, and stores the apparatus identification information added to the ID request command into the memory $104_1$ to set the apparatus identification information to the remote controller $100_1$ itself.

At step S205, the remote controller controlling CPU 203 of the television receiver 200 carries out mutual authentication with the CPU $103_2$ of the remote controller $100_2$. When the remote controller controlling CPU 203 receives the unique ID from the remote controller $100_2$ at this step S205, it sets the apparatus identification information to the remote controller $100_2$ and manages the apparatus identification information in an associated relationship with the unique ID of the remote controller $100_2$ using the table of the memory 204.

At step S206, the CPU $103_2$ of the remote controller $100_2$ issues an ID request command for requesting the remote controller controlling CPU 203 of the television receiver 200 to set the apparatus identification information to the remote controller $100_2$ and sends the ID request command to the remote controller controlling CPU 203.

At step S207, the remote controller controlling CPU 203 of the television receiver 200 sends the ID request command to which the apparatus identification information set to the remote controller $100_2$ is added together with the unique ID of the remote controller $100_1$ to the CPU $103_2$ of the remote controller 100.

At step S208, the CPU $103_2$ of the remote controller $100_2$ receives the ID request command to which the apparatus identification information and the unique ID are added from the remote controller controlling CPU 203 and stores the apparatus identification information added to the ID request command into the memory $104_2$ to set the apparatus identification information to the remote controller $100_2$ itself.

At step S209, the set CPU 205 of the television receiver 200 sends a command for confirming the remote controller controlling CPU 203, that is, a remote controller controlling CPU 203 confirmation command, to the remote controller controlling CPU 203.

At step S210, the remote controller controlling CPU 203 of the television receiver 200 sends a response command for responding to the received confirmation command, that is, a remote controller controlling CPU 203 response command, to the set CPU 205.

At step S211, the set CPU 205 transmits a command for confirming the remote controller $100_1$, that is, a remote controller $100_1$ confirmation command, to the remote controller controlling CPU 203.

At step S212, the remote controller controlling CPU 203 of the television receiver 200 sends the remote controller $100_1$ confirmation command to the CPU $103_1$ of the remote controller $100_1$.

At step S213, the CPU $103_1$ of the remote controller $100_1$ sends a command for responding to the remote controller $100_1$ confirmation command, that is, a remote controller $100_1$ response command, to the remote controller controlling CPU 203 of the television receiver 200.

At step S214, the remote controller controlling CPU 203 of the television receiver 200 transmits the remote controller $100_1$ response command to the set CPU 205.

At step S215, the set CPU 205 sends a command for confirming the remote controller $100_2$, that is, a remote controller $100_2$ confirmation command, to the remote controller controlling CPU 203.

At step S216, the remote controller controlling CPU 203 sends the remote controller $100_2$ confirmation command to the CPU $103_2$ of the remote controller $100_2$.

At step S217, the CPU $103_2$ of the remote controller $100_2$ sends a command for responding to the remote controller $100_2$ confirmation command, that is, a remote controller $100_2$ response command, to the remote controller controlling CPU 203 of the television receiver 200.

At step S218, the remote controller controlling CPU 203 of the television receiver 200 sends the remote controller $100_2$ response command to the set CPU 205.

At step S219, the set CPU 205 of the television receiver 200 sends a command for confirming the remote controller $100_3$, that is, a remote controller $100_3$ confirmation command, to the remote controller controlling CPU 203.

At step S220, the set CPU 205 of the television receiver 200 sends a command for confirming the remote controller $100_n$, that is, a remote controller $100_n$ confirmation command, to the remote controller controlling CPU 203.

At step S221, the set CPU 205 of the television receiver 200 selects the remote controller $100_1$ from among the remote controllers $100_1, 100_2, \ldots, 100_n$.

At step S222, the set CPU 205 of the television receiver 200 sends a command for confirming the power of the remote controller $100_1$, that is, a remote controller $100_1$ power confirmation command, to the remote controller controlling CPU 203.

At step S223, the remote controller controlling CPU 203 of the television receiver 200 transmits the remote controller $100_1$ power confirmation command to the CPU $103_1$ of the remote controller $100_1$.

At step S224, the CPU $103_1$ of the remote controller $100_1$ transmits a command for responding to the remote controller $100_1$ power confirmation command, that is, a remote controller $100_1$ power response command, to the remote controller controlling CPU 203 of the television receiver 200.

At step S225, the remote controller controlling CPU 203 of the television receiver 200 sends the remote controller $100_1$ power response command to the set CPU 205.

At step S226, the set CPU 205 transmits a data packet for the remote controller $100_1$, that is, a remote controller $100_1$ packet, to the remote controller controlling CPU 203.

At step S227, the remote controller controlling CPU 203 transmits the remote controller $100_1$ packet to the CPU $103_1$ of the remote controller $100_1$.

At step S228, the CPU $103_1$ sends the remote controller $100_1$ packet to the remote controller controlling CPU 203.

At step S229, the remote controller controlling CPU 203 sends the remote controller $100_1$ packet to the set CPU 205.

In this manner, in the present embodiment, since an apparatus identification ID used for identification by the television receiver 200 and separate from a unique ID is set to each of a plurality of remote controllers, even if the plural remote controllers are used simultaneously, it is possible to use functions of, for example, reader/writers distinctly from one another.

Further, in the present embodiment, since an apparatus identification ID is allocated to each of the remote controllers when the power supply to the remote controllers is made available or when mutual authentication in communication with the television receiver comes to an end, the apparatus identification ID can be set with certainty.

Further, in the present embodiment, since each remote controller sends a command for requesting the television receiver 200 to allocate an apparatus identification ID, the apparatus identification ID can be set with certainty.

Further, in the present embodiment, since the television receiver 200 sends, when it issues a request for communication with a reader/writer provided in each remote controller, a command to all of those remote controllers with which the television receiver 200 can communicate and each of the remote controllers with which the television receiver 200 can communicate adds the apparatus identification ID allocated thereto to the command and sends the resulting command as a reply, the television receiver 200 can identify the plural remote controllers with certainty.

As described hereinabove, since the remote controller 100 is driven by supply of power from the battery and power supply section 108 and includes the reader/writer 106 which consumes a large amount of power in generation of electromagnetic waves, the power consumption of the remote controller 100 is very high.

The remote controller 100 according to the present embodiment can be controlled so as to enter a low power consumption mode to enable low power consumption driving so that the power consumption can be suppressed low.

In the following, low power consumption control of the remote controller 100 according to the present embodiment is described first in regard to processing operation for placing the remote controller CPU 103 itself into a low power consumption state and then in regard to processing operation for setting the reader/writer 106 of the remote controller 100 into a low power consumption state.

As described hereinabove, since the remote controller 100 is driven by supply of power from the battery and power supply section 108, the power consumption can be suppressed low by enabling low power consumption driving. Normally, a characteristic of a remote controller is utilized to carry out a process of suppressing power consumption by setting the remote controller such that it operates only when an operation key thereof is depressed but is set to a low power consumption state in any other case. However, such a process as just described is not favorable for a remote controller like the remote controller 100 according to the present embodiment which includes the built-in reader/writer 106 for carrying out reading out and writing processing of information from and into an information recording medium such as an IC card. In particular, since, from a characteristic of the reader/writer 106, the timing at which a command is sent is known only to the electric apparatus side such as the television receiver 200 controlled by the remote controller 100 if the remote controller 100 enters a low power consumption state based on a decision of itself, then the remote controller 100 cannot receive a command sent from the television receiver 200 or the reading out or writing process of information from or into the IC card by the reader/writer 106 may be interrupted and result in failure. This may possibly give rise to an unintended trouble in an accounting process or the like.

Therefore, the remote controller 100 according to the present embodiment solves the problem described above by the following countermeasure. In particular, when an operation key provided on the remote controller 100 is operated, when an RF signal is received, that is, when a command is received from the television receiver, and when a command is received from the reader/writer 106, a timer provided for placing the remote controller CPU 103 into a low power consumption state is started or reset, and a normal power state is maintained until a fixed interval of time passes.

In the following, an optimum driving control process for setting a remote controller which includes a built-in reader/writer or has a function of receiving a command from a television receiver to a low power consumption state is described with reference to FIGS. 17 to 21. It is to be noted that, while it is assumed that the remote controller described particularly below has a reader/writer function in addition to a function for receiving a command from a television receiver, the driving control process into a low power consumption state described above can be applied not only to a remote controller which additionally has a reader/writer function but also, for example, to a remote controller which has a function of displaying information on a liquid crystal display screen provided on the remote controller in accordance with a command from a television receiver, to a remote controller which can receive a sound command from a television receiver and generate sub-voice or to a like remote controller.

The reader/writer 106 provided in the remote controller 100 according to the present embodiment must be maintained in a command reception standby state so that it can receive a command transmitted from an electric apparatus such as the television receiver 200 and must continue to generate a magnetic field from the antenna after starting till ending of reading and writing of information in order to carry out communication for reading and writing of information from and into an information recording medium such as an IC card. Therefore, the power consumption of the reader/writer 106 is very high, and therefore, when the reader/writer 106 is not used, preferably the reader/writer 106 remains set to a low power consumption state. More preferably, not only in an ordinary operation process such as a channel selection process but also when the remote controller 100 itself is not used, the remote controller CPU 103 itself is set to a low power consumption state to suppress the power consumption thereby to suppress the consumption of the power supplied from the battery and power supply section 108 to the reader/writer 106 and hence to suppress the power consumption by the reader/writer 106.

Generally, the user operates an operation key provided on the key operation section 105 of the remote controller 100 to control an electric apparatus such as the television receiver 200 and use a reader/writer function of carrying out reading out and writing of information into and from an information recording medium such as, for example, an IC card. Accordingly, if a signal based on an operation key input of the remote controller 100 is not inputted, then none of command reception from the television receiver 200 and command reception from the reader/writer 106 occurs. Therefore, until an operation key input is carried out, the RF transmission/reception section 102 or the remote controller CPU 103 itself of the remote controller 100 is placed into a low power consumption state, and in response to an operation key input, the remote controller CPU 103 is placed into a normal power state and a timer for placing the remote controller CPU 103 into a low power consumption state is reset. This is described particularly below with reference to FIG. 17.

At step S31, the remote controller CPU 103 starts setting for placing the remote controller CPU 103 itself into a low power consumption state. It is to be noted that the low power consumption state of the remote controller CPU 103 is carried out using a known technique. By setting the remote controller CPU 103 itself into the low power consumption state in this manner, the power consumption when the remote controller 100 is not used can be reduced.

Then at step S32, the remote controller CPU 103 decides whether or not it receives a signal input based on an operation key input, that is, based on depression of a key provided on the key operation section 105 of the remote controller 100. The operation key input includes not only, for example, an input from an operation key provided specifically for executing the reader/writer function but also operation key inputs by an ordinary operation of the remote controller 100, that is, an operation key input of a channel changeover key for a television broadcasting program to be received by the television receiver 200 such as the numeral keys 18a to 18l shown in FIG. 4, an operation key input of a sound volume adjustment key for adjusting the sound volume such as the sound volume adjustment key 16 shown in FIG. 4 and a like operation key input.

If the remote controller CPU 103 receives a signal input based on an operation key input at step S32, then the processing advances to step S33, at which the remote controller CPU 103 controls the power state so as to end the low power consumption state of the remote controller CPU 103 itself and now enter the normal operation state. On the other hand, if the remote controller CPU 103 does not receive any signal input based on an operation key input, then the remote controller CPU 103 maintains the low power consumption state of the remote controller CPU 103 itself. In other words, the processing operation at step S32 is carried out repetitively until the remote controller CPU 103 decides that it receives a signal input based on an operation key input, and the signal input based on an operation key input serves as a trigger for starting the normal power state. It is to be noted that, even if the power state is controlled so as to change from the low power consumption state to the normal power state in response to an operation key input in this manner, since, if there is no input of an operation key of the remote controller 100 by the user, a command is not received from the television receiver 200, there is no problem.

Since the remote controller CPU 103 ends the low power consumption state of the remote controller CPU 103 itself in response to a signal input based on an operation key input at step S33, the low power consumption of the remote controller CPU 103 itself is ended and the remote controller 100 is set to the normal power state. Then at step S34, a timer for counting a predetermined period of time for placing the remote controller CPU 103 to a low power consumption state and a time number counter not shown which is hereinafter described are reset.

In this manner, the remote controller 100 according to the present embodiment includes a timer for placing the remote controller CPU 103 itself into a low power consumption state after lapse of a predetermined period of time. Thus, the remote controller 100 does not enter a low power consumption state immediately after an operation key input is received but enters a low power consumption state after the predetermined interval of time elapses, and to this end, the timer is reset first and then starts counting. This process prevents such a situation that the remote controller CPU 103 enters the low power consumption state immediately after an operation key is operated for inputting and cannot regularly receive a command sent from the television receiver 200 or the reader/writer 106. Then, within the predetermined period of time, the normal power state is maintained so that the remote controller 100 can normally receive a command such as a power confirmation command or a function confirmation command sent from the television receiver 200 or the reader/writer 106.

Then at step S35, the remote controller CPU 103 decides whether or not the timer for entering the low power consumption state reaches predetermined set time. Then, if the remote controller CPU 103 decides time-up of the preset time, then it carries out setting for placing the remote controller CPU 103 itself into the low power consumption state. Consequently, when the particular key input is an operation by which a command reception process from the television receiver 200 is not carried out such as when the particular key input is, for example, a channel changeover key input of the television broadcasting, the remote controller CPU 103 can enter the low power consumption state immediately after the predetermined period of time set to the timer elapses. Consequently, the power consumption of the remote controller 100 can be reduced effectively.

On the other hand, if the timer for placing the remote controller CPU 103 into the low power consumption state is not in a time-up state at step S35, then the remote controller 100 decides at step S36 whether or not a signal input based on an operation key input is received. Then, if it is decided that an operation key input to the remote controller 100 is received, then the processing advances to step S37, at which the remote controller CPU 103 executes a process of resetting the timer in the count-up state. In other words, the timer starts its counting from the beginning again. Thus, in such a case that the user carries out a plurality of operations in accordance with an instruction of the display screen of the television receiver 200 and the remote controller 100 thereafter receives a command from the television receiver 200, the normal power state is maintained after the first key input till the command reception so that the command can be received regularly.

On the other hand, if it is decided that a key input to the remote controller 100 is not carried out for the remote controller 100, then the processing advances to step S38, at which it is decided whether or not a command is received.

If it is decided at step S38 that a command is received, then the processing advances to step S39, at which the timer for placing the remote controller CPU 103, which is in the count-up state, into the low power consumption state is reset. On the other hand, if it is decided at step S38 that no command is received, then the timer is not reset and the processing advances to step S41. Here, the command reception at step S38 is described. The command in this instance includes not only a command received from the television receiver 200 through the RF transmission/reception section 102 such as a power confirmation command or a reader/writer packet transmission command but also a reply command or the like from the reader/writer 106.

Then, if the remote controller CPU 103 decides at step S38 that it receives a command from the set CPU 205 of the television receiver 200 through the remote controller controlling CPU 203 or from the reader/writer 106 and then the timer is reset at step S39, then the processing advances to step S40.

At step S40, the remote controller CPU 103 processes the received command. After the command is processed at step S40, the processing advances to step S41. It is to be noted that the command process in this instance includes, for example, a data process in accordance with a command for a function setting process or the like for the reader/writer 106, a process for converting the received command data into data suitable for transmission and a like process.

Then at step S41, the remote controller CPU 103 decides where or not a command is sent to the reader/writer 106 or to the remote controller controlling CPU 203 of the television receiver 200. Then, if the remote controller CPU 103 decides that a command is not transmitted, then the processing returns to step S35, at which it is decided again whether or not the timer for placing the remote controller CPU 103 into the low power consumption state exhibits a time-up state, and the flow of processes described above is repeated.

On the other hand, if the remote controller CPU 103 decides at step S41 that a command is sent, then the processing advances to step S42, at which the time number counter of command transmission is updated.

This command transmission time number counter is incremented by one every time the remote controller CPU 103 sends a command to count the command transmission time number by which the remote controller CPU 103 transmits a command. Thus, an updating process of the command transmission time number counter is carried out at step S42. It is to be noted that the command transmission time number counter is reset when a command is transmitted regularly and an ACK or a reply command to the command transmission is received from the transmission destination of the command.

In this manner, at step S42, based on command transmission from the remote controller CPU 103 at step S41, the command transmission time number counter is updated by being incremented by +1 every time transmission is carried out. This time number counter has an upper limit value determined in advance, and it is decided at step S43 whether or not the time number counter which is updated every time command transmission is carried out reaches the predetermined upper limit value.

More particularly, the upper limit value is set, for example, to 32 in advance. If the remote controller CPU 103 transmits a command to the reader/writer 106 at step S41, then the command transmission time number counter is incremented by +1 and is updated thereby at step S42. However, if a reply command to the command transmission is not transmitted from the reader/writer 106 of the transmission destination within a fixed period of time, then the remote controller CPU 103 transmits or re-sends the same command to the reader/writer 106 of the same transmission destination. Then, in response to the re-sending of the command, the command transmission time number counter is further incremented by +1 and updated thereby. Then, this operation process is repeated, if a reply command from the reader/writer 106 of the transmission destination is not received, until the command transmission time number counter counts the value of 32 which is the upper limit determined in advance. Thus, it is decided at step S43 that the time number counter counts more than 32 which is the upper limit value determined in advance.

Then, if it is decided at step S43 that the time number counter counts more than 32 which is the upper limit value, that is, if a reply command is not received in response to the command transmission from the remote controller CPU 103, that is, in response to the re-sending until the time number counter upper limit value is reached, then the remote controller CPU 103 sets so as to place the remote controller CPU 103 itself into the low power consumption state.

On the other hand, if the reader/writer 106 transmits a reply command to the command transmission from the remote controller CPU 103 to the remote controller CPU 103, then the time number counter is reset, and the processing returns to step S35 to repeat the operation processes described above.

By counting the number of times of command transmission from the remote controller CPU 103 and supervising a reply command to the command transmission in this manner, if no reply is received regardless of repetitions of command transmission in such a case that, for example, a wiring line to the reader/writer 106 is broken, that is, if a command is re-sent by a number of times equal to the predetermined upper limit value and yet no reply is received, then the remote controller CPU 103 places itself into the low power consumption state. Consequently, such a situation that the remote controller CPU 103 cannot place itself into the low power consumption state although time passes and the power consumption increases can be prevented.

It is to be noted that, in the particular description given above of the steps S41 to S43, the remote controller CPU 103 sends a command to the reader/writer 106 and supervises a reply command from the reader/writer 106 to the command transmission. However, a similar process can be used also where the remote controller CPU 103 sends a command to the remote controller controlling CPU 203 of the television receiver 200, and in such a case that some fault in RF communication occurs, if a similar process is carried out to control the remote controller CPU 103 so that the remote controller CPU 103 itself is placed into the low power consumption state, then a situation that power consumption continues can be prevented. It is to be noted that, in this instance, the following process may be carried out. In particular, the remote controller CPU 103 issues a command for turning off the RF transmission/reception section 102 and setting the reader/writer 106, which consumes much power, to the low power consumption state. Then, after the remote controller CPU 103 confirms that such setting is correctly carried out successfully, the remote controller CPU 103 is controlled so as to place the remote controller CPU 103 itself into the low power consumption state. Details are hereinafter described.

As described above, the remote controller 100 according to the present embodiment controls such that, when a particular key input is received, when an RF signal is received, that is, when a command is received from the television receiver and when a command from the reader/writer 106 is received, the timer for placing the remote controller CPU 103 into the low power consumption state is reset so that it starts time counting operation such that the RF transmission/reception section 102 is maintained in an on state before a predetermined period of time passes. Consequently, an interface which can be understood easily in that only the remote controller 100 which is actually carrying out its control receives an RF signal and operates can be implemented. Then, after lapse of a predetermined period of time, the remote controller CPU 103 can place itself into the low power consumption state. Consequently, it is possible for the remote controller 100 to receive a command from the television receiver while suppressing power consumption and carry out a reading out and writing process of information from and into an IC card by the reader/writer 106.

Now, processing operation for setting of the remote controller 100 itself to the low power consumption state described above is described with reference to FIG. 18. More specifically, transfer of a command between the various apparatus and components described hereinabove, that is, transfer of a command among the set CPU 205 of the television receiver 200, the remote controller controlling CPU 203 of the television receiver 200, the remote controller CPU 103 of the remote controller 100 and the reader/writer 106 built in the remote controller 100, is described clearly.

Figure 18:
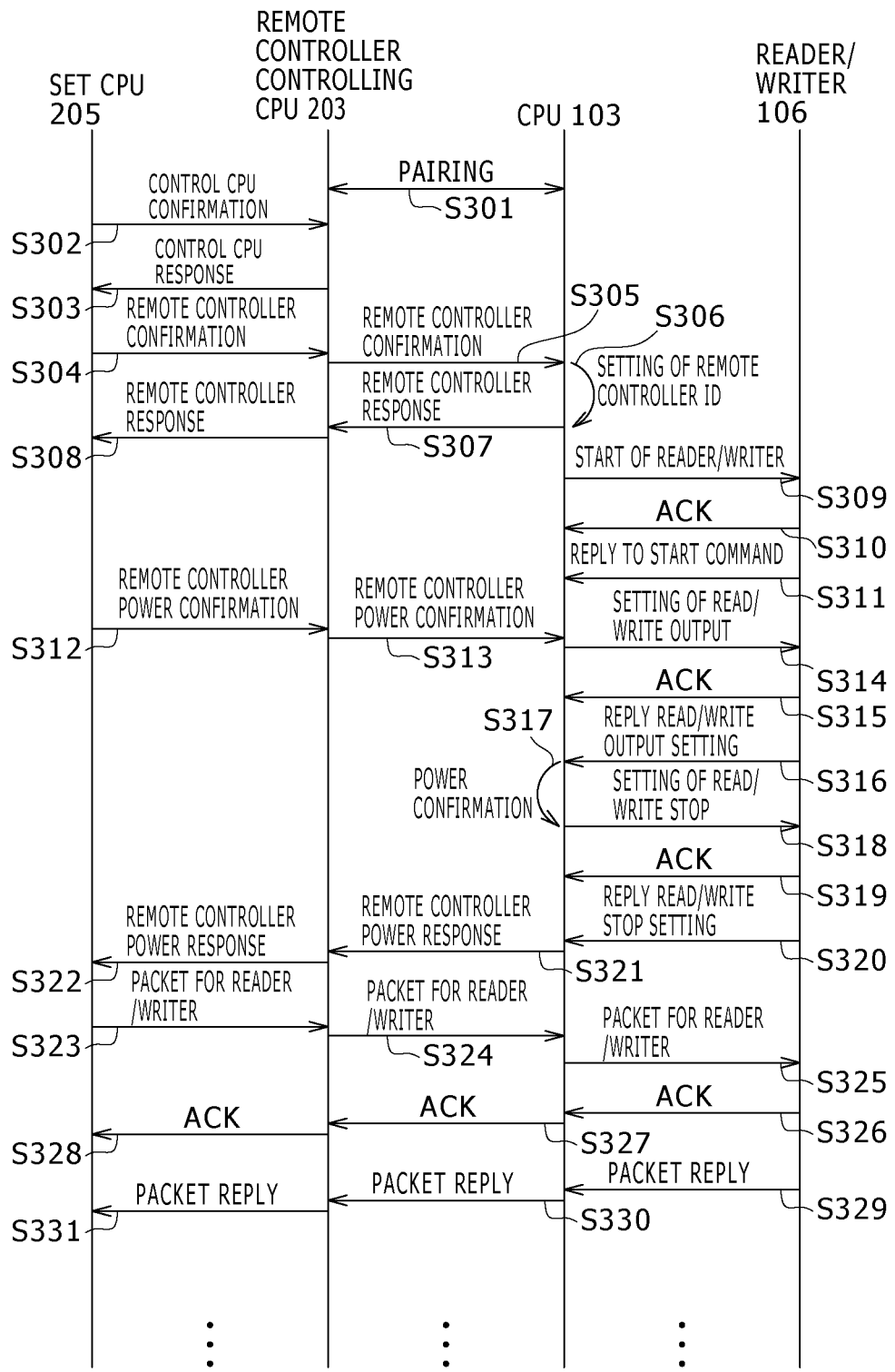
FIG. 18 is a sequence diagram illustrating a flow of command processes between the television receiver and the remote control apparatus.

FIG. 18 illustrates a flow of command processes for executing a basic reader/writer function between the apparatus and the components after a mutual authentication process of the remote controller controlling CPU 203 of the television receiver 200 and the remote controller CPU 103 after a reader/writer packet is transmitted until a packet reply is received.

First, at steps S301 to S308, a mutual authentication process between the television receiver 200 and the remote controller 100 and an ID setting process for the remote controller 100 are carried out. It is to be noted that the processes at steps S301 to S308 correspond to steps S101 to S109 (or step S114) described hereinabove with reference to FIG. 15, and detailed description of the processes at steps S301 to S308 is omitted herein to avoid redundancy since processes at corresponding steps S101 to S109 are such as described hereinabove. Also it is to be noted that, in the processes at steps S304 to S308, it may be confirmed whether or not the remote controller has a reader/writer function.

After the mutual authentication process and the ID setting process at steps S301 to S308 are completed, the remote controller CPU 103 sends a reader/writer starting command to the reader/writer 106 at step S309. This reader/writer starting command is for starting the reader/writer 106 to establish a state wherein all commands sent from the television receiver 200 and the remote controller CPU 103 can be received. However, the reader/writer started by this command does not generate an electromagnetic wave. It is to be noted that, if ID setting is carried out for a plurality of remote controllers by the processes at steps S301 to S308 described hereinabove, all of the remote controllers having a reader/writer function and having IDs allocated thereto start the reader/writers such that they wait in a state wherein they can receive a command. However, at a step hereinafter described, any remote controller to which a remote controller power confirmation command is not sent from the television receiver 200 enters the low power consumption state because the timer provided in the remote controller for placing the reader/writer into the low power consumption state becomes a time-up state.

In this manner, the reader/writer 106 is started by the processes from this step S309 to step S311 described below.

In particular, at step S310, the reader/writer 106 sends an ACK regarding reception of the reader/writer starting command from the remote controller CPU 103 to the remote controller CPU 103. Then, the reader/writer 106 is started based on the reader/writer starting command from the remote controller CPU 103.

At step S311, the reader/writer 106 sends, if it is started regularly, a reply command for replying to the reader/writer starting command, that is, a starting command reply, to the remote controller CPU 103 based on a starting confirmation process. On the other hand, if the reader/writer 106 is not started regularly, then it does not send back a reply command or sends a reply command for replying that the reader/writer 106 is not started regularly. It is to be noted that, if the reader/writer 106 is not started regularly, then a remote controller power confirmation command hereinafter described is sent to a different remote controller which has a different ID allocated thereto and has a reader/writer function and besides issues a reply that it can be started regularly in response to the starting command.

It is confirmed whether or not the reader/writer 106 starts regularly by carrying out the processes at steps S309 to S311 in this manner. It is to be noted that, though not illustrated in FIG. 18, if the reader/writer 106 does not start regularly, then the remote controller CPU 103 may send a command including information of this to the set CPU 205 through the remote controller controlling CPU 203 of the television receiver 200.

Then at step S312, the set CPU 205 of the television receiver 200 sends a command for confirming the power of the remote controller 100, that is, a remote controller 100 power confirmation command, to the remote controller controlling CPU 203. This power confirmation command is for confirming whether or not, when reader/writer packet data is sent thereafter, the remote controller 100 has battery remaining power sufficient to process the data.

At step S313, the remote controller controlling CPU 203 of the television receiver 200 sends the received remote controller 100 power confirmation command to the remote controller 100.

At step S314, the remote controller CPU 103 transmits a read/write output setting command to the reader/writer 106 based on the remote controller 100 power confirmation command received from the remote controller controlling CPU 203. This read/write output setting command is for causing the reader/writer 106 to generate an electromagnetic wave to be used for communication with an electronic information recording medium such as an IC card. At steps S314 to S320, power confirmation response to the received power confirmation command received from the set CPU 205 of the television receiver 200, that is, confirmation of whether or not the remote controller 100 has battery remaining power sufficient for the reader/writer function to carry out a process, is carried out.

In particular, at step S315, the reader/writer 106 sends an ACK regarding read/write output setting command reception from the remote controller CPU 103 to the remote controller CPU 103.

At step S316, the reader/writer 106 generates an electromagnetic wave from the antenna used for communication with an IC card and so forth. Then, the reader/writer 106 sends a reply command to the read/write output setting command, that is, a read/write output setting reply, to the remote controller CPU 103. In particular, the reader/writer 106 sends a reply command including, for example, information of a period of time within which an electronic wave can be generated and some other necessary information to the remote controller CPU 103.

At step S317, the remote controller CPU 103 carries out power confirmation of whether or not an electronic wave can be generated based on the read/write output setting reply command received from the reader/writer 106.

At step S318, the remote controller CPU 103 transmits a read/write stopping setting command to the reader/writer 106.

At step S319, the reader/writer 106 transmits an ACK regarding read/write stopping setting command reception to the remote controller CPU 103.

At step S320, the reader/writer 106 transmits a reply command to the read/write output stopping setting command, that is, a read/write output stopping setting reply command, to the remote controller CPU 103.

At step S321, the remote controller CPU 103 sends a response command to the remote controller 100 power confirmation command, that is, a remote controller 100 power response command, to the remote controller controlling CPU 203 of the television receiver 200 based on the reception of the read/write stopping setting reply command. This response command includes a result of the power confirmation carried out at the preceding step and conveys a result regarding whether or not an electromagnetic wave necessary to execute a reader/writer function can be generated from the reader/writer 106.

At step S322, the remote controller controlling CPU 203 sends the remote controller 100 power response command to the set CPU 205 of the television receiver 200.

In this manner, at steps S312 to S322, the remote controller 100 carries out read/write output setting based on the remote controller power confirmation command from the set CPU 205 of the television receiver 200 and confirms whether or not it has power sufficient to generate an electromagnetic wave necessary to execute the reader/writer function. Consequently, such a situation that the power is used up during reading/writing processing of information from/into an IC card and the reading/writing of information cannot be ended regularly.

Then, after such power confirmation as described above is carried out, the set CPU 205 sends a reader/writer packet to the remote controller controlling CPU 203 at step S323.

At step S324, the remote controller controlling CPU 203 sends the reader/writer packet received from the set CPU 205 to the remote controller CPU 103 through the RF transmission/reception section 202.

At step S325, the remote controller CPU 103 transmits the reader/writer packet received from the remote controller controlling CPU 203 of the television receiver 200 to the reader/writer 106.

At step S326, the reader/writer 106 sends an ACK regarding the reception of the reader/writer packet to the remote controller CPU 103. Consequently, the ACK is sent from the remote controller CPU 103 to the set CPU 205 through the remote controller controlling CPU 203 of the television receiver 200 at steps S327 and S328.

At step S329, the reader/writer 106 sends a reply command to the received reader/writer packet, that is, a packet reply command, to the remote controller CPU 103.

At step S330, the remote controller CPU 103 sends the packet reply command to the remote controller controlling CPU 203 of the television receiver 200.

At step S331, the remote controller controlling CPU 203 sends the packet reply command to the set CPU 205.

The flow of processes at steps S301 to 331 illustrated in FIG. 18 is a basic flow of processes till the reader/writer packet transmission. Reading/writing processes of information from/into an information recording medium such as an IC card by the reader/writer 106 are carried out through such transfer of commands between the different apparatus and the components as described above.

Now, a flow of command processes until the remote controller CPU 103 is set to the low power consumption state after the reading/writing processes of information from/into an IC card by the reader/writer 106 carried out through such command processes as described above are completed is described with reference to FIG. 19. The procedure illustrated in FIG. 19 includes processes similar to those of the procedure illustrated in FIG. 18, and such similar processes are denoted by like reference characters and overlapping detailed description of them is omitted herein to avoid redundancy.

Figure 19:
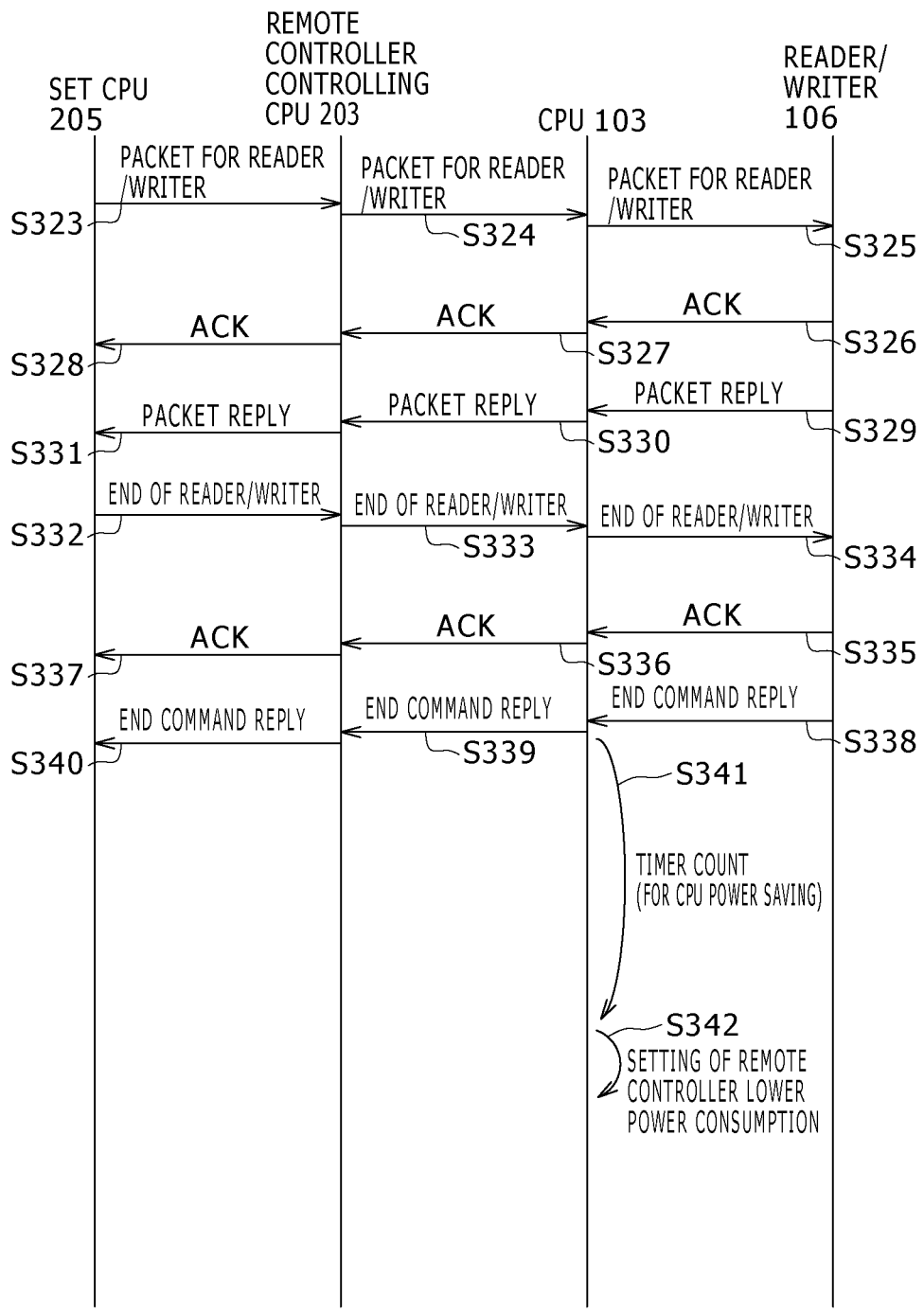
FIG. 19 is a sequence diagram illustrating a flow of command processes for setting the remote controller CPU of the television receiver to a low power consumption state.

Referring to FIG. 19, at steps S323 to S331, reader/writer packet sending is carried out from the set CPU 205 of the television receiver 200 to the reader/writer 106 through the remote controller controlling CPU 203 of the television receiver 200 and the remote controller CPU 103 and packet reply to the reader/writer packet sending is carried out. Thus, if the reading/writing processes of information from and into the IC card such as an accounting process are carried out regularly, then the reader/writer process ends.

At step S332, the set CPU 205 of the television receiver 200 sends a command for ending the reader/writer, that is, a reader/writer ending command, to the remote controller controlling CPU 203 of the television receiver 200.

At step S333, the remote controller controlling CPU 203 sends the received reader/writer ending command to the remote controller CPU 103.

At step S334, the remote controller CPU 103 sends the received reader/writer ending command to the reader/writer 106.

At step S335, the reader/writer 106 sends an ACK regarding the reception of the reader/writer ending command to the remote controller CPU 103. Consequently, the ACK is sent from the remote controller CPU 103 to the set CPU 205 through the remote controller controlling CPU 203 of the television receiver 200 at steps S336 and S337.

At step S338, the reader/writer 106 sends a reply command to the reader/writer ending command to the remote controller CPU 103.

At step S339, the remote controller CPU 103 sends the received reply command to the remote controller controlling CPU 203 of the television receiver 200.

At step S340, the remote controller controlling CPU 203 sends the received reply command to the set CPU 205.

Figure 17:
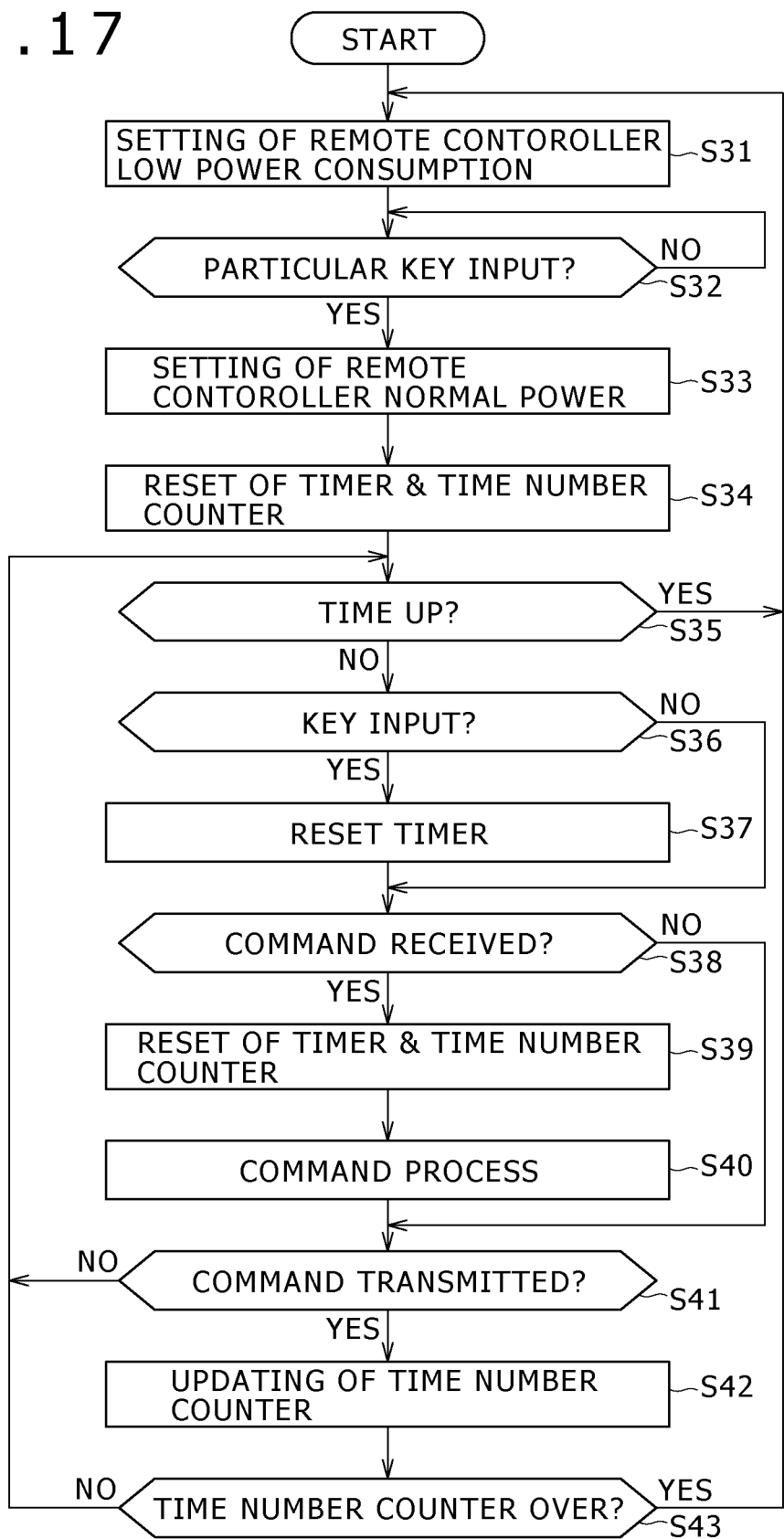
FIG. 17 is a flow chart illustrating a flow of processes for setting a remote controller CPU to a low power consumption state.

Here, when the remote controller CPU 103 receives the reply command to the reader/writer ending command from the reader/writer 106 at step S338, then the count value of the timer of the remote controller 100 for placing the remote controller CPU 103 itself into the low power consumption state is reset at the same time as reception of the command as described hereinabove in connection with the description of the steps S38 and S39 in the flow chart of FIG. 17. Then, while the counting of the time after reset is started from the beginning, the remote controller CPU 103 regularly sends the received reply command to the remote controller controlling CPU 203 of the television receiver 200. In the sequence illustrated in FIG. 19, operation key inputting, command reception from the set CPU 205 of the television receiver 200 through the remote controller controlling CPU 203 or command reception from the reader/writer 106 does not occur after the transmission of the reply command. Therefore, the timer which started counting upon reception of the reply command from the reader/writer 106 by the remote controller CPU 103 described hereinabove continues its counting at step S341. Then, when a predetermined period of time set to the timer elapses, the remote controller CPU 103 places the remote controller CPU 103 itself into the low power consumption state at step S342.

In this manner, if the remote controller CPU 103 of the remote controller 100 according to the present embodiment receives a command from the reader/writer 106 or receives a command from the set CPU 205 of the television receiver 200 through the remote controller controlling CPU 203, then the timer for placing the remote controller CPU 103 into the low power consumption state is reset at this point of time. Therefore, the remote controller CPU 103 can regularly send a reply command or the like to the received command to the remote controller controlling CPU 203 of the television receiver 200 or the reader/writer 106.

Further, where the timer is reset upon reception of a command to prolong the time at which the low power consumption state should be entered in this manner, such a situation that, in such a case that a time interval is caused by command execution of the reader/writer 106 after command transmission till reply command reception particularly like a case wherein the remote controller CPU 103 sends a command received from the remote controller controlling CPU 203 of the television receiver 200, for example, a reader/writer packet, to the reader/writer 106 and the reader/writer 106 executes the command and then the remote controller CPU 103 receives a command sent from the reader/writer 106, for example, a reply command, after the execution of the command, the remote controller CPU 103 is placed into the low power consumption state and consequently is in a sleep state and therefore cannot receive a reply command from the reader/writer 106, resulting in failure to carry out processing normally, can be prevented.

Now, the remote controller CPU 103 in an embodiment of the present invention which not only has functions of turning off the RF transmission/reception section 102 and setting the remote controller CPU 103 itself into a low power consumption state but also has a different function of issuing a command for setting the reader/writer 106 to the low power consumption state is described with reference to FIG. 20.

Processes at steps S350 to S358 illustrated in FIG. 20 correspond to those at steps S323 to S331 described hereinabove with reference to FIGS. 18 and 19, respectively, and transfer of a reader/writer packet and a reply command regarding reading and writing of information from and into an IC card is carried out similarly.

Then at step S359, the set CPU 205 of the television receiver 200 carries out a process of sending a new reader/writer packet to the remote controller controlling CPU 203 of the television receiver 200.

Then at step S360, the remote controller controlling CPU 203 carries out a process of sending the received reader/writer packet to the remote controller CPU 103.

Figure 20:
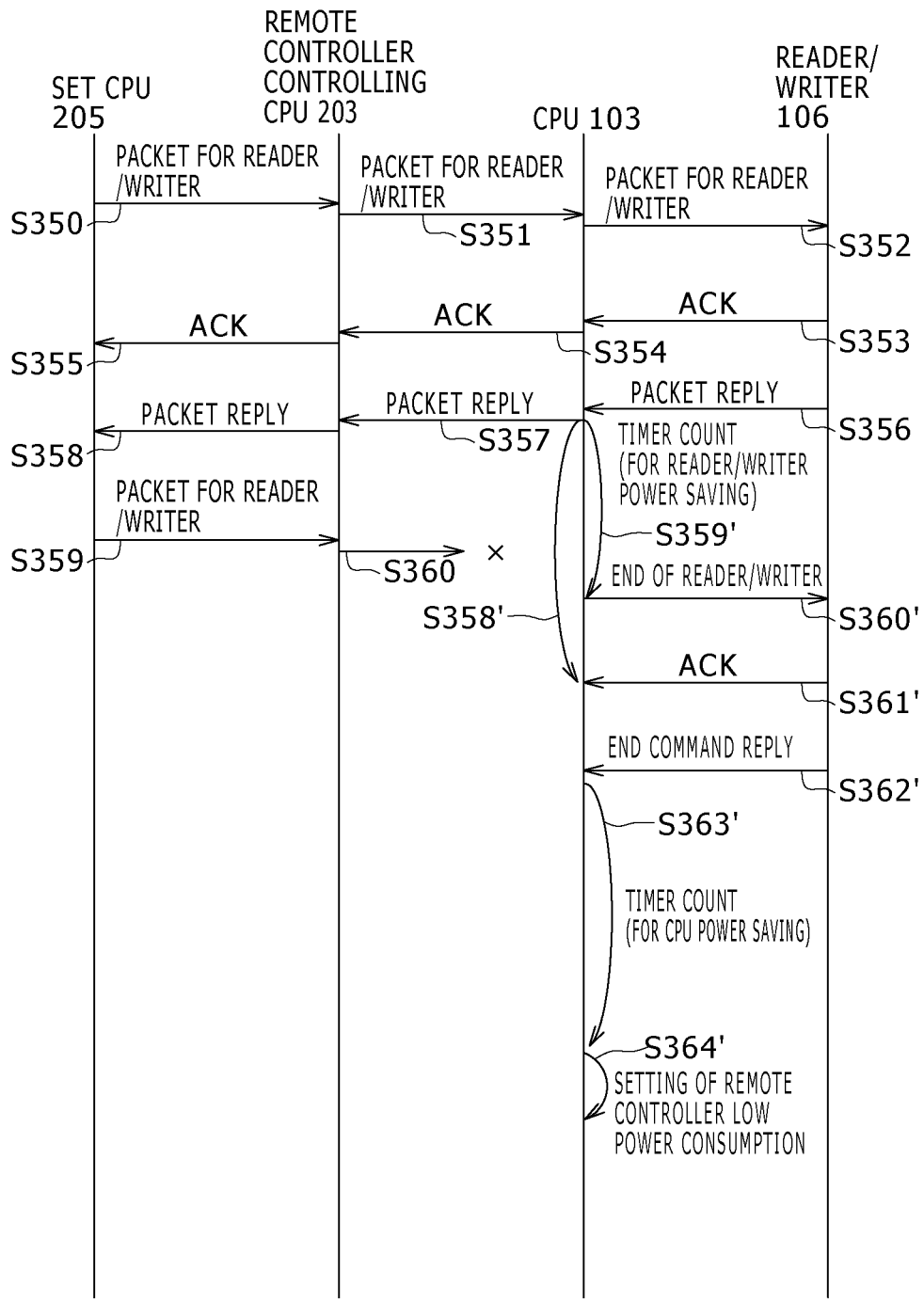
FIG. 20 is a sequence diagram illustrating a flow of processes of a further remote control apparatus which has a function of issuing a command for setting a reader/writer is set to a low power consumption state and to which an embodiment is applied.

However, in the sequence diagram of FIG. 20 of the embodiment, it is illustrated that RF communication between the television receiver 200 and the remote controller 100 is not carried out regularly (RF communication abnormal state), and transmission of a new reader/writer packet from the remote controller controlling CPU 203 of the television receiver 200 to the remote controller CPU 103 is not carried out regularly and a reading/writing process of information from/into the IC card is not carried out by the reader/writer 106. At this time, although the reader/writer 106 maintains the normal power state and continues to generate an electromagnetic wave, communication thereof with the IC card is not carried out. Consequently, only power continues to be consumed because of generation of an electromagnetic wave. Further, since the RF communication abnormal state exists, also a reader/writer ending command from the television receiver 200 cannot be received, and unless the reader/writer 106 enters the low power consumption state, also the remote controller CPU 103 itself cannot enter the low power consumption state. As a result, the reader/writer 106 and the remote controller CPU 103 exhibit high power consumption.

Therefore, in the present embodiment, if a command is not transmitted from the set CPU 205 of the television receiver 200 to the remote controller CPU 103 through the remote controller controlling CPU 203 within a predetermined period of time, then not only the remote controller CPU 103 places the remote controller CPU 103 itself into the low power consumption state, but also a timer is utilized to issue a reader/writer ending command to place the reader/writer 106 into the low power consumption state. Then, after it is confirmed that the reader/writer 106 enters the low power consumption state, the remote controller CPU 103 controls the remote controller CPU 103 itself into the low power consumption state.

In particular, if the reader/writer 106 sends a packet reply to the remote controller CPU 103 at step S356, then the remote controller CPU 103 receives the packet reply from the reader/writer 106 and sends a packet response to the remote controller controlling CPU 203 of the television receiver 200 at step S357.

Thereupon, the remote controller CPU 103 resets, at step S358', the timer for placing the remote controller CPU 103 itself into the low power consumption state to start counting from the beginning as described hereinabove in connection with the processes at steps S38 and S39 of FIG. 17. Further, at step S359', the remote controller CPU 103 carries out a process of starting the timer for placing the reader/writer 106 into the low power consumption state.

Although the timer for placing the reader/writer 106 into the low power consumption state is reset when some command is received, where an abnormal state occurs with RF communication and a command from the television receiver 200 cannot be received as described above, no command is received and the timer is not reset and exhibits a time-up state when a predetermined interval of time elapses.

Then, when the timer enters a time-up state, the remote controller CPU 103 issues a reader/writer ending command to the reader/writer 106 at step S360'.

The reader/writer ending command from the remote controller CPU 103 is received by the reader/writer 106, and the reader/writer 106 transmits an ACK regarding the reception of the reader/writer ending command to the remote controller CPU 103 at step S361'.

When the remote controller CPU 103 receives the ACK from the reader/writer 106 at step S361', the timer for placing the remote controller CPU 103 whose counting was started from the beginning at step S358' into a low power consumption state is reset.

Then at step S362', the reader/writer 106 sends a reply command to the reader/writer ending command to the remote controller CPU 103, and the reader/writer 106 enters the low power consumption state.

Also at this step S362', when the remote controller CPU 103 receives a reply command from the reader/writer 106, the timer for placing the remote controller CPU 103 into the low power consumption state again is reset.

Then at step S363', the timer for placing the remote controller CPU 103 into the low power consumption state continues counting. Then, if the RF communication does not return to a normal state during such continuous counting, then the timer comes to a time-up state, and the remote controller CPU 103 places the remote controller CPU 103 itself into the low power consumption state at step S364'.

If, while the counting at step S363' continues, the RF communication abnormal state is canceled to restore a normal communication state and a command is sent from the set CPU 205 to the remote controller CPU 103 through the remote controller controlling CPU 203, then the timer for placing the remote controller CPU 103 into the low power consumption state is reset in response to the reception of the command by the remote controller CPU 103, and the processing continues.

In this manner, the remote controller CPU 103 of the remote controller 100 according to the present embodiment controls such that, when it receives a reply command or the like from the reader/writer 106, it resets the timer for placing the remote controller CPU 103 itself into the low power consumption state so that the timer counts from the beginning. Further, the remote controller CPU 103 controls such that counting of the timer for placing the reader/writer 106 into the low power consumption state is started. Then, after the predetermined interval of time of the timer for the reader/writer 106 elapses, the remote controller CPU 103 issues a reader/writer ending command to the reader/writer 106 to place the reader/writer 106 into the low power consumption state.

Consequently, where a command is not sent normally from the television receiver 200 to the remote controller CPU 103 and the reader/writer 106 and the remote controller CPU 103 itself cannot be placed into the low power consumption state any more as in a case wherein an abnormal state occurs with RF communication, such a situation that high power is consumed can be prevented.

That low power consumption state setting of the reader/writer 106 is hereinafter described in detail.

Figure 21:
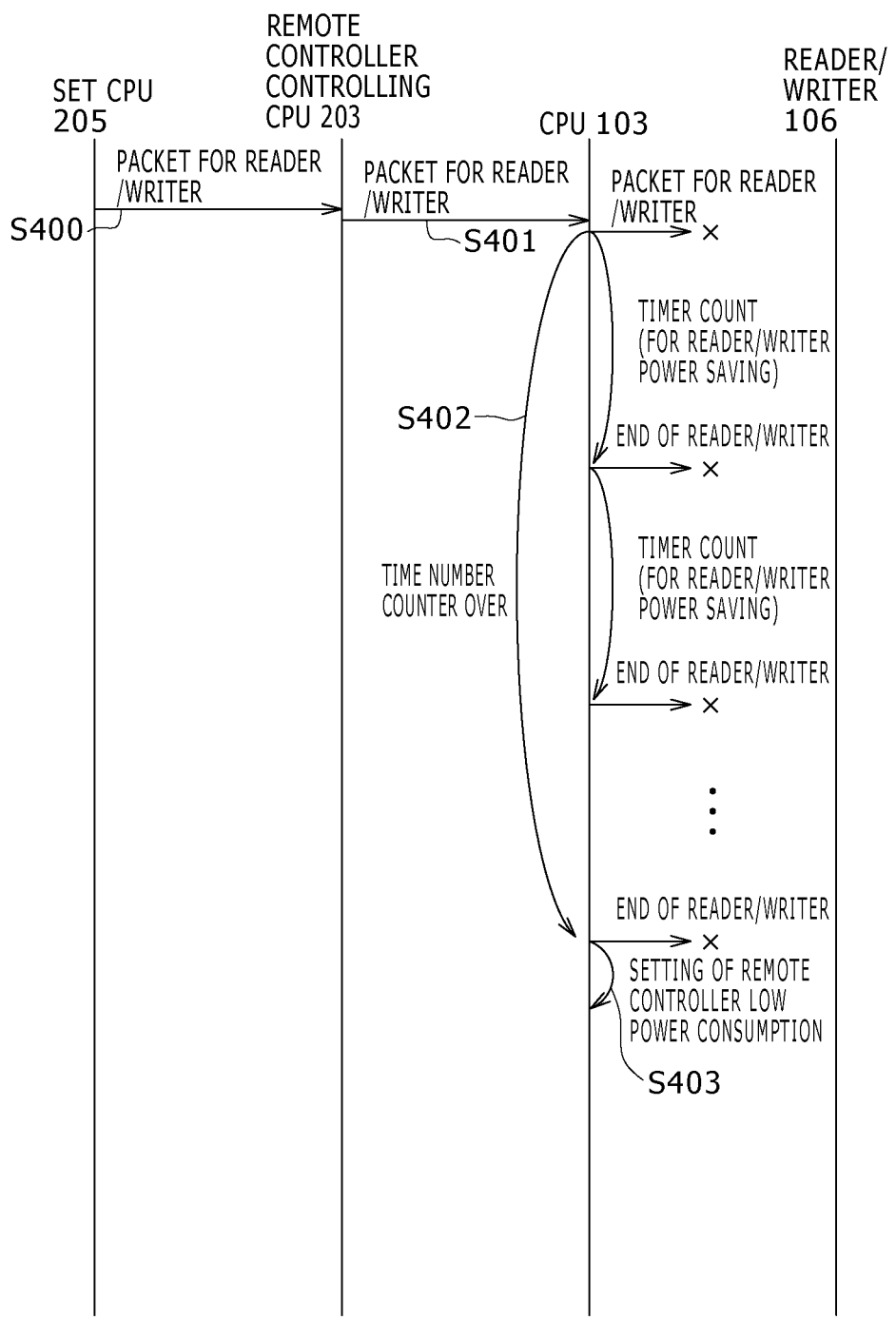
FIG. 21 is a sequence diagram illustrating operation of a command transmission time number counter of the remote controller CPU of the television receiver.

Now, the low power consumption state entering setting process of the remote controller CPU 103 in a state wherein transfer of a command is not carried out regularly like a case wherein a connection to the reader/writer 106 is broken or the like is described with reference to FIG. 21.

Similarly as in FIGS. 18 and 19, the set CPU 205 of the television receiver 200 sends a reader/writer packet to the remote controller controlling CPU 203 of the television receiver 200 at step S400.

At step S401, the remote controller controlling CPU 203 sends the received reader/writer packet to the remote controller CPU 103.

Then at step S402, the remote controller CPU 103 sends the received reader/writer packet to the reader/writer 106.

However, since the connection to the reader/writer 106 is broken or in a like state, the reader/writer packet cannot be transmitted from the remote controller CPU 103 to the reader/writer 106, and naturally any of an ACK regarding reception of the reader/writer packet and a packet reply command is not transmitted from the reader/writer 106.

In such an instance as just described, if the remote controller CPU 103 controls such that it waits reception of a command from the reader/writer 106 until it places the remote controller CPU 103 itself into the low power consumption state, then the remote controller CPU 103 cannot enter the low power consumption state until the connection to the reader/writer 106 is repaired against the break. Therefore, within the period of time, the remote controller CPU 103 remains to consume the power.

Therefore, the remote controller 100 according to the present embodiment has a function of supervising a command from the reader/writer 106 and placing, when the counted number of operation cycles in which a reply to a command is not received becomes higher than a predetermined number, the remote controller CPU 103 into the low power consumption state without waiting a reply result.

In particular, the remote controller CPU 103 of the remote controller 100 according to the present embodiment includes a command sending time number counter for counting the number of times by which a command is sent, and at step S402, every time the remote controller CPU 103 sends a reader/writer packet to the reader/writer 106, the command sending time number counter is updated. Then, if an ACK or a packet reply is not received from the reader/writer 106 within a fixed period of time after the command is sent to the reader/writer 106, then the same command is re-sent to the reader/writer 106 by the remote controller CPU 103. Consequently, the command sending time number counter is incremented by one and updated in response to the re-sending of the command.

In this manner, if a reply from the reader/writer 106 is not received within the fixed period of time after a command is sent to the reader/writer 106 in this manner, then the same command is re-sent to the reader/writer 106 and the command sending time number counter is incremented by one and updated every time. Then, the operation processes are repeated until a reply is received from the reader/writer 106.

An upper limit value is set in advance to the command sending time number counter, and when the counter counts up to the upper limit value, for example, set to 32, then it is decided at step S43 of FIG. 17 described hereinabove that the time number counter is in a time-up state. Then, the processing returns to step S31 in FIG. 17, at which the remote controller CPU 103 places the remote controller CPU 103 itself into the low power consumption state (step S403). It is to be noted that the upper limit value to the command sending time number counter is not limited to 32. Further, if the remote controller 100 successfully receives a regular reply command from the reader/writer 106 before the count value of the command sending time number counter reaches the upper limit value, then the command sending time number counter is reset.

In this manner, in the remote controller 100 according to the present embodiment, if, after a command is sent by the remote controller CPU 103, a reply to the command is not received from the reader/writer 106 within the fixed period of time, then the remote controller CPU 103 re-sends the command and updates the command sending time number counter to count the number of times by which the command is set thereby to supervise a reply from the destination of the command transmission. Then, the remote controller CPU 103 decides whether or not the count value of the command sending time number counter reaches the upper limit value set in advance. Then, if the count value reaches the preset upper limit value, then the remote controller CPU 103 places the remote controller CPU 103 itself into the low power consumption state. Consequently, such a situation that the remote controller CPU 103 continues to wait a reply from the reader/writer 106 and cannot enter the low power consumption state in a state wherein transfer of a command between the remote controller CPU 103 and the reader/writer 106 is not carried out regularly like a case wherein the connection to the reader/writer 106 is broken and consequently the power is consumed seriously can be prevented.

Such control as described is carried out not only when the remote controller CPU 103 sends a command to the reader/writer 106 but fails to receive a command reply from the reader/writer 106 but similar control can be carried out also where the remote controller CPU 103 sends a command to the remote controller controlling CPU 203 of the television receiver 200.

As described above, the remote controller CPU 103 of the remote controller 100 sets the remote controller 100, which is in the low power consumption state, to the normal power state and starts the timer in response to an input of an operation key of the remote controller 100, and the remote controller CPU 103 is not set to the low power consumption state until after a predetermined period of time set to the timer elapses so that the RF transmission/reception section 102 is kept in an on state to permit command reception from the television receiver 200. The operation key of the remote controller 100 and the process of the television receiver 200 are synchronized with each other, and the function of the television receiver 200 starts in response to an operation of the remote controller 100 through an operation key. Therefore, by such control as described above, for example, when the television receiver 200 is controlled by the remote controller 100 and the reader/writer function for carrying out reading out/writing of information from/into an information recording medium such as an IC card is required in a program stored in the memory 204 such as, for example, a ROM of the television receiver 200, such a situation that, when a command such as a power confirmation command or a command for confirming whether or not the reader/writer function is available is issued, the remote controller CPU 103 is in the low power consumption state and cannot receive the command and therefore the remote controller necessary to utilize the reader/writer function cannot be found out or the reader/writer function cannot be utilized can be prevented.

Further, in the remote controller 100 according to the present embodiment, upon RF reception from the television receiver 200, that is, upon command reception from the television receiver 200, and upon command reception from the reader/writer 106, the remote controller CPU 103 resets the timer for placing the remote controller CPU 103 itself into the low power consumption state so as to start counting by the timer from the beginning again. Therefore, for example, when a command is sent from the television receiver 200 to the reader/writer 106 through the remote controller CPU 103, even if an interval of time for execution of the command appears after the command is sent from the remote controller CPU 103 to the reader/writer 106 until the reader/writer 106 executes the command and sends a reply command to the remote controller CPU 103, such a situation that, before the reply command is sent from the reader/writer 106 to the remote controller CPU 103, the remote controller CPU 103 itself is placed into the low power consumption state and fails to receive the reply command regularly and therefore fails to complete its process can be prevented.

Furthermore, in the remote controller 100 according to the present embodiment, a reply to a command from the reader/writer 106 is supervised, and the number of times by which a reply is not received is counted. Then, when the counted time number reaches a predetermined value, the low power consumption state is set without waiting a result from the reader/writer 106. In particular, the remote controller 100 increments the command sending time number counter by +1 every time a command is sent to the reader/writer 106. If the processes are repeated and a reply is not received before the predetermined count number is reached, then the command is re-sent, the command sending time number counter is incremented by one and the operation processes are repeated. Then the remote controller CPU 103 is set to the low power consumption state without waiting a resulting reply from the reader/writer 106 to the command sent therefrom. Consequently, such a situation that the remote controller CPU 103 cannot enter the low power consumption state for whatever long time it waits in a state wherein no reply is obtained from the reader/writer 106 even if a command is sent to the reader/writer 106 like a case wherein the connection to the reader/writer 106 is broken can be prevented. Further, if the CPU 103 of the remote controller 100 successfully receives a regular reply command from the reader/writer 106 during the control described above, the command transmission time number counter is reset. Therefore, when the connection is restored to enable regular operation of the reader/writer 106, such a situation that issuance of a command to the reader/writer 106 is stopped can be prevented.

The control process of the remote controller 100 according to the present embodiment for setting the remote controller CPU 103 itself into the low power consumption state is such as described above. By the control process, it is possible to reduce the power consumption of the remote controller 100 which is driven by a battery provided in the battery and power supply section 108 and has a limit to the driving time thereof from the life of the battery and to allow the remote controller 100 to regularly carry out processing of the function of receiving a command or the like from the television receiver 200 and controlling the reader/writer 106 or the like based on the command.

A remote controller which includes a reader/writer like the remote controller 100 according to the present embodiment described above should not originally include the reader/writer because, since the reader/writer generates an electromagnetic wave, it consumes a large amount of power and this decreases the life of the battery provided in the battery and power supply section 108. Further, in the remote controller 100, even if the remote controller CPU 103 itself can be controlled to the low power consumption state efficiently as described above, if the reader/writer 106 remains in the normal power state, then the remote controller CPU 103 itself cannot be placed into the low power consumption state, and a great amount of power still continues to be consumed.

Therefore, in the remote controller 100 according to the present embodiment, in order to efficiently control the reader/writer 106 to the low power consumption state, the reader/writer 106 is set to the low power consumption state when the power supply provided by the battery is made available.

Further, since the remote controller 100 uses an RF signal for communication, it may possibly enter a communication disabled state abruptly. Therefore, the remote controller 100 of the present embodiment carries out control of supervising the communication state and carrying out a suitable process in accordance with the communication state.

Figure 22:
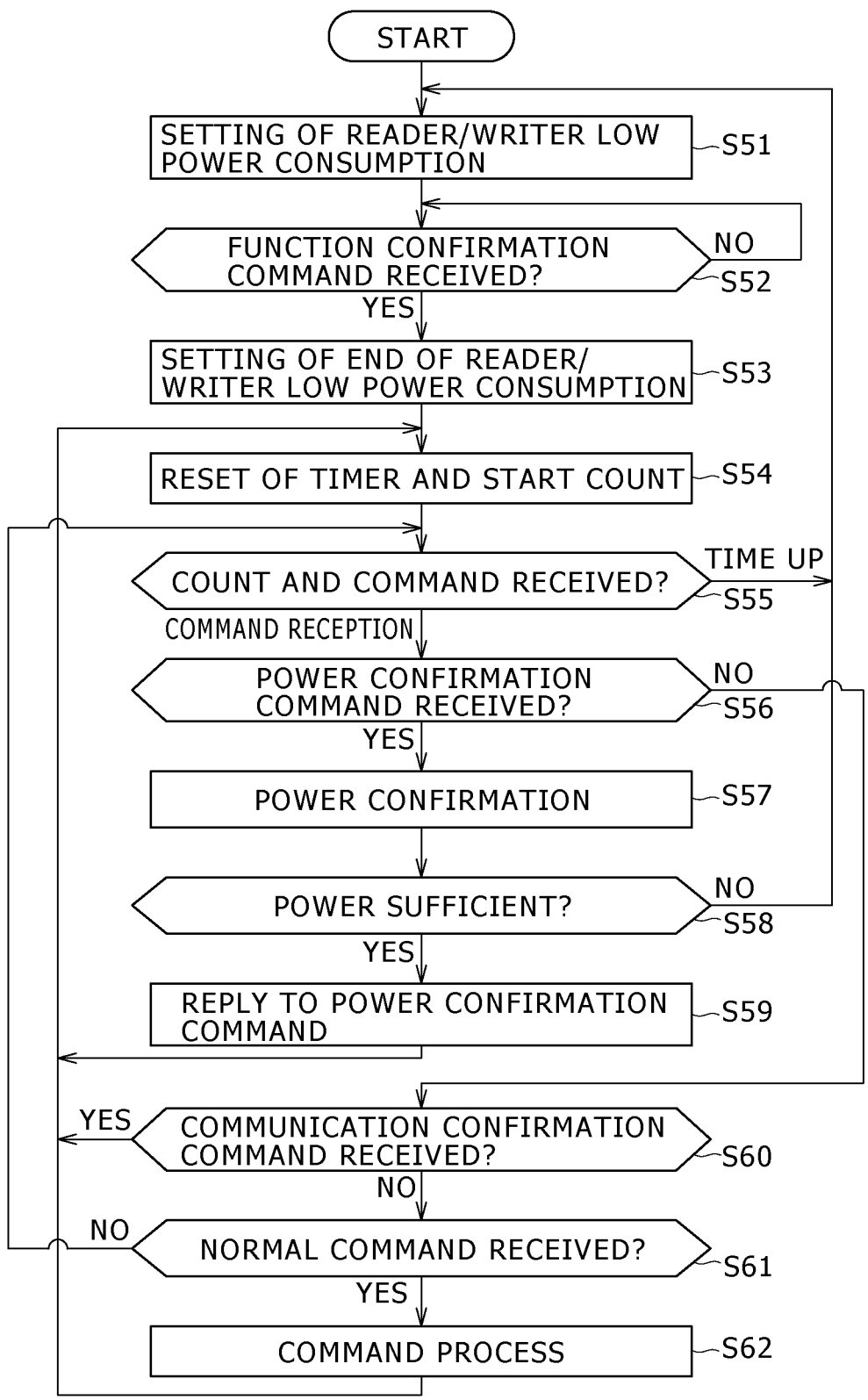
FIG. 22 is a flow chart illustrating processing operation of the remote control apparatus in a low power consumption setting process.
Figure 23:
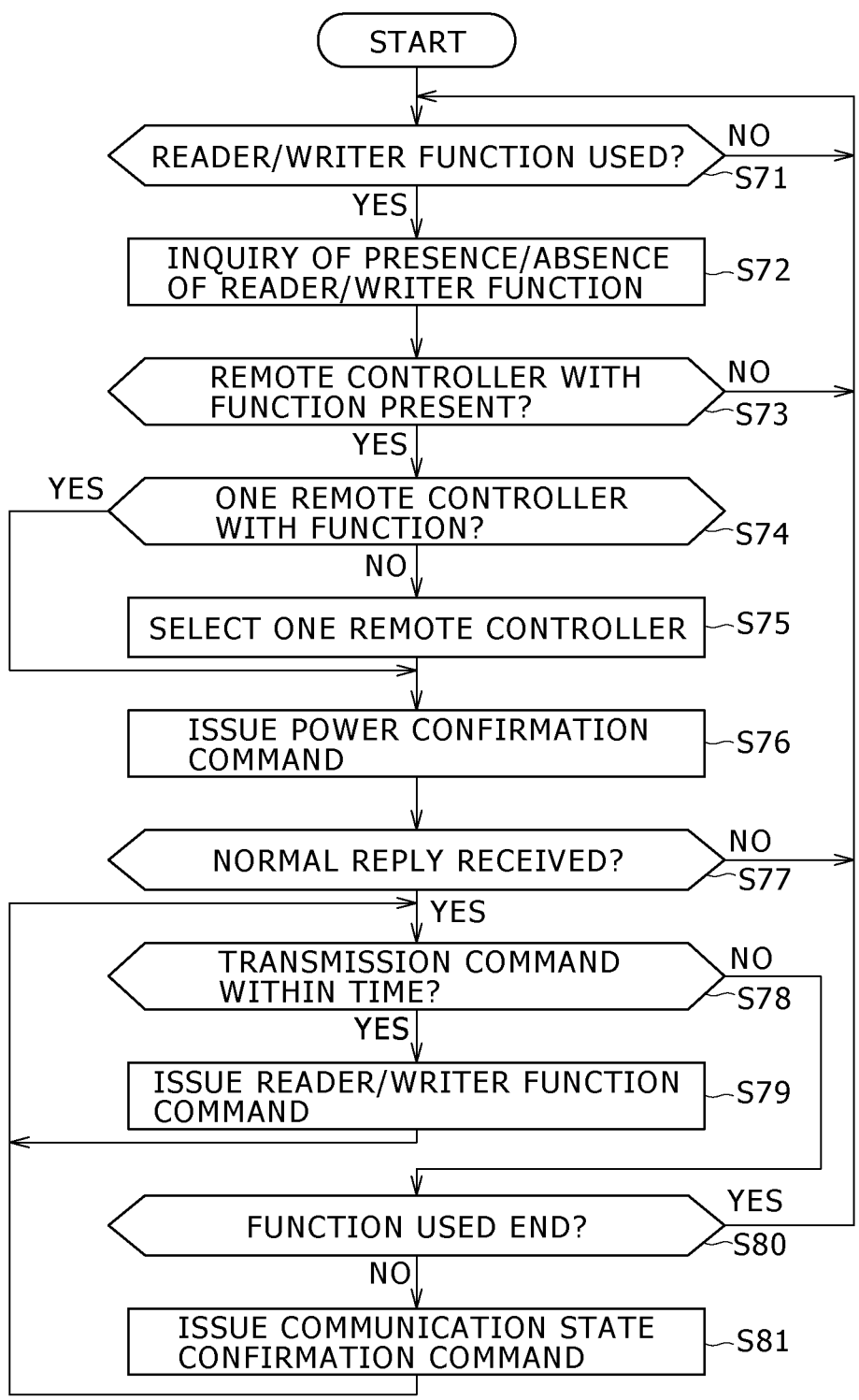
FIG. 23 is a flow chart illustrating processing operation of the television receiver in the low power consumption setting process.

In the following, processing operation for setting the reader/writer 106 to the low power consumption state is described with reference to FIGS. 22 and 23. In particular, FIG. 22 illustrates processing operation of the remote controller 100 and FIG. 23 illustrates processing operation of the television receiver 200 in the low power consumption setting process.

For example, when the power supply is made available, the remote controller 100 and the television receiver 200 start the low power consumption setting process for the reader/writer 106.

At step S51, the CPU 103 of the remote controller 100 issues a command for placing the reader/writer 106 into the low power consumption state thereby to set the reader/writer 106 to the low power consumption state. Consequently, the remote controller 100 can reduce the power consumption when the reader/writer 106 is not used.

The television receiver 200 receives a control instruction from the remote controller 100, and at step S71, the set CPU 205 of the television receiver 200 decides whether or not the function of reading out and writing information from and into an information recording medium like the reader/writer 106 should be used based on a program stored in the ROM of the set memory 206. The function mentioned is hereinafter referred to as reader/writer function.

If the set CPU 205 decides at step S71 that the reader/writer function is required, then the processing advances to step S72, at which the set CPU 205 issues a command for confirming whether or not a remote controller has the reader/writer function, that is, a reader/writer confirmation command, based on the program stored in the set memory 206 and sends the reader/writer confirmation command to all remote controllers which can communicate with the television receiver 200. Then, the remote controller controlling CPU 203 sends the reader/writer confirmation command to all remote controllers which can communicate with the television receiver 200 to inquire about whether or not they have the reader/writer function. On the other hand, if the set CPU 205 decides at step S71 that the reader/writer function is not required, then the process at step S71 is carried out again. It is to be noted that not such a command for inquiring only of the reader/writer function but such a function confirmation for collectively inquiring about various functions which a remote controller has may be used so that various functions including the reader/writer function can be confirmed.

The CPU 103 of the remote controller 100 decides at step S52 whether or not the reader/writer confirmation command is received from the television receiver 200. If the CPU 103 of the remote controller 100 decides at step S52 that the reader/writer confirmation command is received from the television receiver 200, then the processing advances to step S53. At step S53, the remote controller CPU 103 sends a reply that the remote controller 100 has the reader/writer function to the television receiver 200 and issues a command for ending the low power consumption state, that is, the low power consumption state ending command, to the reader/writer 106 in order to receive a later command for the reader/writer 106 thereby to set the reader/writer 106 to end the low power consumption state. On the other hand, if the CPU 103 of the remote controller 100 decides at step S52 that the reader/writer confirmation command is not received from the television receiver 200, then the remote controller CPU 103 carries out the process at step S52 again. It is to be noted that not the remote controller 100 but another remote controller which does not have the reader/writer function may be used. In this instance, the remote controller sends no reply or sends a reply that it does not have the reader/writer function in response to the reader/writer confirmation command.

At step S53, the CPU 103 of the remote controller 100 carries out setting for ending the low power consumption state of the reader/writer 106.

The set CPU 205 of the television receiver 200 decides at step S73 whether or not a remote controller having the reader/writer function is available. If the set CPU 205 decides at step S73 that a remote controller having the reader/writer function is available, then the processing advances to step S74. On the other hand, if it is decided at step S73 that a remote controller having the reader/writer function is not available, then the processing returns to step S71.

At step S74, the set CPU 205 of the television receiver 200 decides whether only one remote controller or a plurality of remote controllers from among those remote controllers which can communicate with the television receiver 200 exist. If the set CPU 205 decides at step S74 that only one remote controller from among those remote controllers which can communicate with the television receiver 200 has the reader/writer function, then the processing advances to step S76. Such one remote controller is hereinafter referred to as remote controller 100. On the other hand, if the set CPU 205 decides at step 74 that a plurality of ones of those remote controllers which can communicate with the television receiver 200 have the reader/writer function, then the processing advances to step S75, at which a remote controller which should communicate with the television receiver 200 is arbitrarily selected from among the plural remote controllers. In the following description, the selected remote controller is referred to as remote controller 100.

Since the reader/writer 106 consumes a great amount of power, if it becomes impossible to use the reader/writer function continually as in a case wherein the communication between the remote controller 100 and the television receiver 200 is interrupted, the reader/writer 106 should stop the outputting of the reader/writer function as quickly as possible. However, for example, when the CPU 103 of the remote controller 100 receives an outputting instruction of a command from the program of the television receiver 200, if the communication with the remote controller 100 is interrupted immediately after then, then the reader/writer 106 cannot drop the outputting thereof. Therefore, the CPU 103 of the remote controller 100 includes a timer not shown for counting a period of time set in advance and resetting the counting after lapse of the preset time period. Thus, where the reader/writer 106 is not in the low power consumption state, the predetermined period of time is normally counted, and if the count value reaches the preset time interval, then the remote controller CPU 103 issues a command for placing the remote controller CPU 103 itself into the low power consumption state.

Where the reader/writer 106 is not in the low power consumption state but in a normal sate, the CPU 103 of the remote controller 100 resets the timer so as to start counting newly at step S54.

If the count value reaches the preset time, then the CPU 103 of the remote controller 100 issues a command for placing the reader/writer 106 into the low power consumption state. However, it is necessary to prevent the remote controller 100 from entering the low power consumption state while the remote controller 100 is operating normally. At step S55, the CPU 103 of the remote controller 100 continues the counting, and in the meantime, the CPU 103 decides whether or not an effective command to the remote controller 100 is received as an RF signal or whether or not a normal command is received from the reader/writer 106. If the CPU 103 of the remote controller 100 decides that an effective command to the remote controller 100 is received as an RF signal or a normal command is received from the reader/writer 106, then the processing advances to step S56. On the other hand, if the CPU 103 of the remote controller 100 decides at step S55 that the preset time period counted by the timer elapses before one of such commands as described above is received, then the processing returns to step S51.

Where, at step S55, the CPU 103 of the remote controller 100 issues a command for setting the reader/writer 106 to the low power consumption state based on the program thereof or where the set CPU 205 of the television receiver 200 issues a command for setting the reader/writer 106 to the low power consumption state based on the program and the remote controller 100 receives the command, the processing may advance to step S56.

At step S76, the set CPU 205 of the television receiver 200 issues a power confirmation command for confirming whether or not the remote controller 100 has sufficient power to carry out processing using the reader/writer 106 and instructs the remote controller controlling CPU 203 to send this power confirmation command to the remote controller 100. The remote controller controlling CPU 203 sends this power confirmation command to the remote controller 100 to confirm whether or not the remote controller 100 has sufficient power to carry out processing using the reader/writer 106.

At step S56, the CPU 103 of the remote controller 100 decides whether or not the power confirmation command is received from the television receiver 200. If the CPU 103 of the remote controller 100 decides at step S56 that the power confirmation command is received from the television receiver 200, then the processing advances to step S57.

At step S57, the CPU 103 of the remote controller 100 issues a power confirmation command for carrying out power confirmation to the reader/writer 106.

If the CPU 103 of the remote controller 100 decides that the power confirmation command is received from the television receiver 200, then it decides at step S58 whether or not it has sufficient power to carry out processing using the reader/writer 106. At this step S58, the CPU 103 of the remote controller 100 controls the reader/writer 106 to output an electromagnetic wave necessary for reading out and writing of data from and into an IC card once and then stop the outputting of an electromagnetic wave immediately. Within a predetermined period of time after starting till ending of outputting of an electromagnetic wave, the CPU 103 of the remote controller 100 measures the battery remaining amount, power and so forth of the reader/writer 106 and decides whether or not the reader/writer 106 has sufficient electric power to carry out reading out and writing of data from and into an IC card regularly. If the CPU 103 of the remote controller 100 decides at step S58 that the reader/writer 106 has sufficient power to carry out reading out and writing of data from and into an IC card regularly, then the processing advances to step S59, but if the remote controller CPU 103 decides that the reader/writer 106 does not have sufficient power to carry out reading out and writing of data from and into an IC card regularly, then the processing returns to step S51.

At step S59, the CPU 103 of the remote controller 100 sends a power confirmation command for replying that the reader/writer 106 has sufficient power to the television receiver 200. Thereafter, the processing returns to step S54.

At step S77, the remote controller controlling CPU 203 of the television receiver 200 decides whether or not the power confirmation command is received. If the remote controller controlling CPU 203 decides that the power confirmation command is received, then the processing advances to step S78, but if the remote controller controlling CPU 203 decides that the power confirmation command is not received, then the processing returns to step S71.

At step S78, the set CPU 205 of the television receiver 200 decides whether or not there is a command to be sent to the reader/writer 106 within a fixed period of time defined by counting of the timer. If the set CPU 205 decides at step S78 that there is a command to be sent to the reader/writer 106, then the processing advances to step S79, but if the set CPU 205 decides that there is no command to be sent to the reader/writer 106, then the processing advances to step S80.

At step S79, the set CPU 205 of the television receiver 200 issues a command for causing the function of the reader/writer 106 to be exhibited to instruct the remote controller controlling CPU 203 to send the command to the remote controller 100. The remote controller controlling CPU 203 sends the command to the remote controller 100, and the processing returns to step S78.

At step S80, the set CPU 205 of the television receiver 200 decides whether or not the use of the reader/writer 106 should be ended, and if it is decided that the use of the reader/writer 106 should be ended, then the processing returns to step S71, but if it is decided that the use of the reader/writer 106 should not be ended, then the processing advances to step S81.

It is necessary for the set CPU 205 of the television receiver 200 to prevent the function of the reader/writer 106 from automatically turning off within a period of waiting time for accessing to a network or the like through the screen display section 207 or the Internet connection section 208.

Therefore, the set CPU 205 of the television receiver 200 issues, at step S81, a command for confirming whether or not the communication state is regular, that is, a communication state confirmation command, to the remote controller 100 at time intervals shorter than the period of counting carried out by the counter provided in the remote controller 100. Then, the set CPU 205 instructs the remote controller controlling CPU 203 to send the communication state confirmation command to the remote controller 100, and the remote controller controlling CPU 203 sends the communication state confirmation command to the remote controller 100.

Consequently, even if the communication situation does not have any problem, such a situation that use of the function of the reader/writer 106 is disabled on the remote controller 100 side can be prevented. Further, since the necessity for the remote controller 100 to output an RF signal for confirmation of the communication situation is eliminated, power consumption of the remote controller 100 can be suppressed.

At step S60, the CPU 103 of the remote controller 100 decides whether or not the communication state confirmation command is received from the television receiver 200. If it is decided that the communication state confirmation command is received, then the processing returns to step S54, but if it is decided that the communication state confirmation command is not received, then the processing advances to step S61.

At step S61, the CPU 103 of the remote controller 100 decides whether or not a command for carrying out reading out and writing of information from and into the reader/writer 106 is received from the television receiver 200. If it is decided that the command is received, then the processing advances to step S62, but if it is decided that the command is not received, then the processing returns to step S55.

At step S62, the CPU 103 of the remote controller 100 carries out data processing based on the command received from the television receiver 200, for example, reading out and writing of information from and into the reader/writer 106. Then, the processing returns to step S54.

In this manner, in the communication system 1, a changing command into the low power consumption state is issued to the reader/writer 106 when the power supply to the remote controller 100 is made available. Consequently, lower power consumption than that when the power supply is made available with a conventional remote controller can be implemented.

Further, in the communication system 1, in order that the low power consumption state may not be established while the remote controller 100 is operating regularly, when an effective command to the remote controller 100 is received in the form of an RF signal, or when a regular command is received from the reader/writer 106, the remote controller 100 resets the counting of the counter. On the other hand, when the remote controller 100 receives a command issued by itself of based on the program of the television receiver 200 for setting the reader/writer 106 to the low power consumption state and successfully executes a command process, by resetting and stopping the counting of the timer, the situation that the reader/writer function is kept in an effective state in vain by the reader/writer 106 can be prevented.

Further, in the communication system 1, when a command for confirming the presence of the reader/writer function is received from the television receiver 200, the reader/writer 106 can immediately reply to the command from the television receiver 200 by issuing a command for ending the low power consumption state to the reader/writer 106. Consequently, even where the reader/writer 106 is set to the low power consumption state, a high speed response can be implemented.

Further, in the communication system 1, if the remote controller 100 receives a command for making the reader/writer 106 effective from the television receiver 200 which is controlled by the remote controller 100, then the remote controller 100 outputs the function of the reader/writer 106 once to measure the power state and then stops the outputting of the function of the reader/writer 106. By this, not in the course of processing of a command, but at a point of time at which processing of the command is started, it is possible to confirm that the power of the remote controller 100 is insufficient.

Further, in the communication system 1, where a power confirmation command of the reader/writer 106 is received from the television receiver 200 which is controlled by the remote controller 100, the timer of the remote controller 100 starts counting, but where an effective command is not received from the television receiver 200 or the reader/writer 106 for a fixed period of time, a changing command into the low power consumption state is issued to the reader/writer 106. Consequently, where the communication with the television receiver 200 is interrupted, such a situation that the function of the reader/writer 106 of the remote controller 100 continues to be outputted thereby to consume the power in vain can be prevented.

Further, in the communication system 1, since a command for instructing the reader/writer 106 to reset the timer for changing the reader/writer 106 into the low power consumption state is issued, the television receiver 200 which knows a timing at which outputting of the function of the reader/writer 106 of the remote controller 100 is required can instruct the reader/writer 106 to continue the outputting of the function. Consequently, the timing at which the reader/writer function is outputted can be controlled accurately.

While, in the embodiments described hereinabove, the remote controller 100 carries out reading out and writing of information from and into an IC card of the contactless type using the RFID, another configuration may be employed wherein a remote controller carries out only reading out or writing of information from or into a magnetic card of the contact type. Further, the information recording medium of the contactless type is not limited to an IC card, but, for example, an electronic apparatus such as a portable telephone set having a function of a contactless IC card or the like may be used as described hereinabove.

Further, although the arrangement configuration of the components on the substrate of the remote controller 100 is shown in FIG. 6, the arrangement of the components is not limited to this.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A remote control apparatus which carries out radio communication with an electric apparatus, the remote control comprising:
a reader/writer configured to read out and write information from and into or on an information recording medium; and
transmission/reception means configured to transmit and receive a signal to and from the electric apparatus;
said transmission/reception means (i) receiving a reader/writer command from the electric apparatus causing said reader/writer to communicate with the information recording medium based on the reader/writer command, and (ii) transmitting a reply to the reader/writer command to the electric apparatus, the reader/writer command and the reply including packets of a same format,
wherein the reader/writer command is divided into a plurality of packets and received by the transmission/reception means divisionally using the packets, wherein a header of each of the packets includes continuity information representative of whether the divided reader/writer command is completed or continues to a next packet, and a footer of each of the packets includes error check information separate from the continuity information.

2. The remote control apparatus according to claim 1, wherein the information received using the packets is merged to restore the reader/writer command.

3. The remote control apparatus according to claim 1, wherein the control instruction to said remote control apparatus and the reader/writer command are received without carrying out retransmission management.

4. An electric apparatus which carries out radio communication with a remote control apparatus having a reader/writer configured to read out and write information from and into or on an information recording medium based on a reader/writer command, the electronic apparatus comprising:
transmission/reception means for transmitting and receiving a signal to and from the remote control apparatus by the radio communication,
said transmission/reception means (i) receiving a reader/writer command from the electric apparatus, (ii) transmitting the reader/writer command to said remote control apparatus causing the reader/writer to communicate with the information recording medium, and (iii) receiving a reply to the reader/writer command from the remote control apparatus, the reader/writer command and the reply using packets of a same format;

wherein the reader/writer command is divided into a plurality of packets and transmitted by the transmission/reception means divisionally using the packets, wherein a header of each of the packets includes continuity information representative of whether the divided reader/writer command is completed or continues to a next packet, and a footer of each of the packets includes error check information separate from the continuity information.

5. The electric apparatus according to claim 4, wherein the information transmitted using the packets is merged to restore the reader/writer command.

6. A communication system comprising:
an electric apparatus; and
a remote control apparatus which carries out radio communication with said electric apparatus, wherein:
said remote control apparatus includes
    a reader/writer configured to read out and write information from and into or on an information recording medium, and
    a first transmission/reception means configured to carry out transmission and reception of a signal to and from the electric apparatus, and
said electric apparatus includes
    a second transmission/reception means for transmitting and receiving a signal to and from the remote control apparatus by the radio communication;
said first and second transmission/reception means (i) transmitting and receiving a reader/writer command from said electric apparatus causing said reader/writer of the remote control apparatus to communicate with the information recording medium based on the reader/writer command, and (ii) transmitting and receiving a reply to the reader/writer command to and from said remote control apparatus using packets of a same format,
wherein the reader/writer command is divided into a plurality of packets and transmitted and received divisionally using the packets, wherein a header of each of the packets transmitted by the second transmission/reception means includes continuity information representative of whether the divided reader/writer command is completed or continues to a next packet, and a footer of each of the packets includes error check information separate from the continuity information.

7. The communication system according to claim 6, wherein the information transmitted using the packets is merged to restore the reader/writer command.

8. The remote control apparatus according to claim 1, wherein the reader/writer command includes at least one of information to be written into or on the information recording medium and information read out from the information recording medium.

9. The remote control apparatus according to claim 1, wherein the reader/writer command has a greater data length than a length of a packet received from the electric apparatus via the transmission/reception means.

10. The remote control apparatus according to claim 1, wherein the reader/writer is a non-contact type reader/writer that performs contactless reading out and writing of information from and into or on the information recording medium.

11. The remote control apparatus according to claim 1, further comprising:
    a key operation section including keys associated with a first set of functions; and
    a processor to associate a second set of functions to the keys based on said transmission/reception means communication with the information recording medium.

12. The remote control apparatus according to claim 11, wherein said transmission/reception means transmits a remote controller controlling command based on the second set of functions to the electronic apparatus.

13. The remote control apparatus according to claim 12, wherein said transmission/reception means causes the electronic apparatus to display a graphic or information corresponding to at least one function of the second set of functions after receiving the remote controller controlling command.

14. The remote control apparatus according to claim 11, further comprising an indicator, wherein the processor illuminates the indicator when the second set of functions is applied.

15. The remote control apparatus according to claim 14, wherein the key operation section includes the indicator such that the processor illuminates the keys corresponding to any one of the second set of functions.

16. The remote control apparatus according to claim 1, the continuity information is representative of only whether the divided reader/writer command is completed or continues to a next packet, and the header does not include a packet ID.

17. The remote control apparatus according to claim 1, wherein transmitting to the electric apparatus by the transmission/reception means is limited to transmitting only reply data.

* * * * *